United States Patent
Standley et al.

(10) Patent No.: US 10,558,435 B2
(45) Date of Patent: Feb. 11, 2020

(54) SYSTEM AND METHOD FOR A DEVELOPMENT ENVIRONMENT FOR BUILDING SERVICES FOR A PLATFORM INSTANCE

(71) Applicant: n.io Innovation, LLC, Broomfield, CO (US)

(72) Inventors: Douglas A. Standley, Boulder, CO (US); Randall E. Bye, Louisville, CO (US); Matthew R. Dodge, Dana Point, CA (US)

(73) Assignee: n.io Innovation, LLC, Broomfield, CO (US)

( * ) Notice: Subject to any disclaimer, the term of this patent is extended or adjusted under 35 U.S.C. 154(b) by 216 days.

(21) Appl. No.: 15/854,882

(22) Filed: Dec. 27, 2017

(65) Prior Publication Data

US 2018/0143810 A1    May 24, 2018

Related U.S. Application Data

(63) Continuation of application No. 15/085,486, filed on Mar. 30, 2016, now Pat. No. 9,891,893, which is a
(Continued)

(51) Int. Cl.
*G06F 9/46* (2006.01)
*G06F 8/34* (2018.01)
(Continued)

(52) U.S. Cl.
CPC ............ *G06F 8/34* (2013.01); *G06F 3/04842* (2013.01); *G06F 9/445* (2013.01); *G06F 9/4494* (2018.02);
(Continued)

(58) Field of Classification Search
CPC ...... G06F 8/34; G06F 9/4494; G06F 3/04442; G06F 9/445; G06F 9/44505; G06F 9/485; G06F 9/5072; G06F 9/54
See application file for complete search history.

(56) References Cited

U.S. PATENT DOCUMENTS 5,943,481 A * 8/1999 Wakeland ............... H04L 29/06
                                                                 370/466
6,401,081 B1   6/2002 Montgomery et al.
(Continued)

FOREIGN PATENT DOCUMENTS

CN    103513992 A    1/2014
CN    103530134 A    1/2014
(Continued)

OTHER PUBLICATIONS

Coulson, G., et al., The Design of a Configurable and Reconfigurable Middleware Platform, Distributed Computing, Apr. 2002, pp. 109-126, vol. 15, Issue 2.
(Continued)

*Primary Examiner* — Camquy Truong

(57) ABSTRACT

An improved system and method are disclosed for creating a configuration for a platform instance using a development environment that has a graphical user interface (GUI). The method includes creating a service to be run by the platform instance and providing a graphical representation of a block library containing available blocks that are available for use by the service. Input is received via the GUI identifying at least some of the available blocks as selected blocks, where the selected blocks are to be run by the service. Input is received via the GUI arranging the selected blocks into an order of execution. The development environment generates and stores at least one configuration file containing the order of execution for use by the platform instance.

26 Claims, 45 Drawing Sheets

Related U.S. Application Data continuation-in-part of application No. 14/885,629, filed on Oct. 16, 2015, now Pat. No. 9,454,385, which is a continuation of application No. PCT/IB2015/001288, filed on May 21, 2015.

(60) Provisional application No. 62/137,007, filed on Mar. 23, 2015, provisional application No. 62/041,566, filed on Aug. 25, 2014, provisional application No. 62/028,145, filed on Jul. 23, 2014, provisional application No. 62/001,457, filed on May 21, 2014, provisional application No. 62/141,107, filed on Mar. 31, 2015.

(51) Int. Cl.

| | | |
|---|---|---|
| *G06F 3/0484* | (2013.01) | |
| *G06F 9/445* | (2018.01) | |
| *G06F 9/448* | (2018.01) | |
| *G06F 9/48* | (2006.01) | |
| *G06F 9/50* | (2006.01) | |
| *G06F 9/54* | (2006.01) | |

(52) U.S. Cl.
CPC .......... *G06F 9/44505* (2013.01); *G06F 9/485* (2013.01); *G06F 9/5072* (2013.01); *G06F 9/54* (2013.01)

(56) References Cited

U.S. PATENT DOCUMENTS

| | | |
|---|---|---|
| 7,028,162 B2 | 4/2006 | Arnold et al. |
| 7,222,349 B1 | 5/2007 | Krinke, II et al. |
| 7,337,436 B2 | 2/2008 | Chu et al. |
| 7,653,008 B2 | 1/2010 | Patrick et al. |
| 7,836,458 B1 | 11/2010 | Gwozdz et al. |
| 7,844,803 B2 | 11/2010 | De Oliveira Kastrup Pereira et al. |
| 7,899,160 B2 | 3/2011 | Corcoran |
| 7,926,030 B1 | 4/2011 | Harmon |
| 7,953,767 B2 | 5/2011 | Shaburov |
| 7,958,340 B2 | 6/2011 | Hoover et al. |
| 7,971,187 B2 | 6/2011 | Sanghvi et al. |
| 8,099,583 B2 | 1/2012 | Wang |
| 8,161,500 B2 | 4/2012 | Tan et al. |
| 8,260,479 B2 | 9/2012 | Christenson et al. |
| 8,261,295 B1 | 9/2012 | Risbood et al. |
| 8,325,228 B2 | 12/2012 | Mariadoss |
| 8,589,873 B2 | 11/2013 | Baek |
| 8,869,095 B2 | 10/2014 | Long et al. |
| 8,880,524 B2 | 11/2014 | Pandey et al. |
| 9,069,375 B2 | 6/2015 | Padmavilasom |
| 2003/0126584 A1 | 7/2003 | Creamer et al. |
| 2003/0135842 A1 | 7/2003 | Frey et al. |
| 2003/0149608 A1 | 8/2003 | Kall et al. |
| 2003/0200532 A1 | 10/2003 | Gensel |
| 2006/0116138 A1 | 6/2006 | Simsek et al. |
| 2007/0025351 A1 | 2/2007 | Cohen |
| 2007/0233717 A1 | 10/2007 | Prabhakar et al. |
| 2008/0188963 A1 | 8/2008 | McCoy |
| 2009/0037875 A1 | 2/2009 | Jones et al. |
| 2009/0091442 A1 | 4/2009 | Howarth et al. |
| 2010/0138825 A1 | 6/2010 | Harrop |
| 2011/0021142 A1 | 1/2011 | Desai et al. |
| 2011/0072441 A1 | 3/2011 | Parks et al. |
| 2011/0131557 A1 | 6/2011 | Bouillet et al. |
| 2013/0061231 A1 | 3/2013 | Zhang et al. |
| 2013/0083843 A1 | 4/2013 | Bennett |
| 2013/0262330 A1 | 10/2013 | Sannier et al. |
| 2013/0290450 A1 | 10/2013 | Butler et al. |
| 2014/0040861 A1 | 2/2014 | Kim et al. |
| 2014/0118153 A1 | 5/2014 | Li et al. |
| 2014/0351800 A1 | 11/2014 | Jao et al. |
| 2015/0169302 A1 | 6/2015 | DeAnna et al. |
| 2015/0300887 A1 | 10/2015 | Mandava et al. |

FOREIGN PATENT DOCUMENTS

| | | |
|---|---|---|
| EP | 01372071 A2 | 12/2003 |
| WO | 2006135726 A2 | 12/2006 |
| WO | 2011001347 A1 | 1/2011 |
| WO | 2015177639 A1 | 11/2015 |

OTHER PUBLICATIONS

Wheater, S., etal.; The Design and Implementation of a Framework for Configurable Software; IEEE Computer Society, ICCDS '96 Proceedings of the IEEE Third International Conference on Configurable Distributed Systems, May 6, 1996, p. 136.

SAS Event Stream Processing Engine; SAS Institute Inc., 2014, downloaded Jul. 2, 2014.

Carney, D., et al.; Monitoring Streams—A New Class of Data Management Applications; VLDB '02: Proceedings of the 28th International Conference on Very Large Databases, 2002, pp. 215-226.

Michelson, B.; Event-Driven Architecture Overview; Elemental Links, Inc., 5th Anniversary Edition, Feb. 2, 2011, originally published Feb. 2, 2006.

Zaharia, J.; An Architecture for Fast and General Data Processing on Large Clusters; Technical Report No. UCB/ EECS-2014-12, Feb. 3, 2014.

Leclercq, M., et al.; DREAM: A Component Framework for Constructing Resource-Aware, Configurable Middleware; IEEE Computer Society, Distributed Systems Online, Sep. 2005, vol. 6, No. 9.

Zhang, Y., et al.; Configurable Middleware for Distributed Real-Time Systems with Aperiodic and Periodic Tasks; IEEE Computer Society, IEEE Transactions on Parallel and Distributed Systems, Mar. 2010, vol. 21., No. 3; published online Apr. 17, 2009.

Shattacharya, D., et al.; Analytics on Big Fast Data Using Real Time Stream Data Processing Architecture; EMC Corporation, Jul. 5, 2013.

Coulson, G.; A Configurable Multimedia Middleware Platform; IEEE Press, IEEE Multimedia, Jan.-Mar. 1999, pp. 62-76, vol. 6, No. 1.

Nogiec, J., et al.; A Configurable Component-Based Software System for Magnetic Field Measurements; Sep. 1, 2005, FERMILAB-CONF-05-395-TD; Presented at MT-19: 19th International Conference on Magnet Technology, Genoa, Italy, Sep. 18-23, 2005.

Hsueh, N., et al.; A Configurable and Extensible Middleware Design for Mobile Application Integration Journal of Software Engineering 8, Mar. 8, 2014, pp. 1-13.

Moxey, CL.; et al.; A Conceptual Model for Event Processing Systems; IBM Corporation, an IBM Redguide publication, Mar. 23, 2010, downloaded Dec. 1, 2015, from http://www.redbooks.ibm.com/redpapers/pdfs/redp4642.pdf.

The Ultimate IFTTT Guide: Use The Web's Most Powerful Tool Like a Pro; Oct. 8, 2013, downloaded Oct. 19, 2015, from http://www.makeuseof.com/tag/the-ultimate-ifttt-guide-use-the-webs-most-powerful-tool-like-a-pro/.

D'Orazio, D.; A recipe for news: IFTTT adds new York Times support, more publications coming; The Verge, Aug. 12, 2013, downloaded Oct. 19, 2015, from http://www.theverge.com/2013/8/12/4607076/ifttt-adds-new-york-times-channel-to-service.

Madden, S., et al.; Fjording the Stream: An Architecture for Queries over Streaming Sensor Data; "Draft submitted for Publication, Jun. 26, 2001." Downloaded on Dec. 1, 2015, from http://www.cs.berkeley.edu/~franklin/Papers/fjords0601.pdf.

Abadi, D., et al.; The Design of the Borealis Stream Processing Engine; Proceedings of the Second Biennial Conf. Innovative Data Systems Research (CIDR '05), 2005.

Hwang, J., et al.; A Cooperative, Self-Configuring High-Availability Solution for Stream Processing; IEEE 23rd International Conference on Data Engineering, 2007.

Stefanov, T., et al.; System Design Using Kahn Process Networks: The Compaan/Laura Approach; IEEE, Proceedings of the Design, Automation, and Test in Europe Conference and Exhibition (DATE '04), pp. 340-345, vol. 1, 2004.

(56) References Cited

OTHER PUBLICATIONS

Kamburugamuve, S.; Survey of Distributed Stream Processing for Large Stream Sources; For the PhD Qualifying Exam, Dec. 14, 2013.
Standley, D., et al; U.S. Appl. No. 13/973,342 (non-published); filed Aug. 22, 2013.
Cetintemel, U., et al.; The Aurora and Borealis Stream Processing Engines; Downloaded Jul. 2, 2014, from http://homes.cs.washington.edu/~magda/borealis-book.pdf.
Riehle, D.; Framework Design: A Role Modeling Approach; Ph.D. Thesis, No. 13509 Zurich, Switzerland, ETH Zurich, 2000.
PCT: International Search Report and Written Opinoin of PCT/IB15/01288 (related application), dated Nov. 10, 2015, 15 pgs.
Guinard, Dominique, et al. Cloud Computing, REST and Mashups to Simplify RFID Application Development and Deployment, Jun. 2011, 6 pages.
PCT International Search Report and Written Opinion of PCT/IB2015/000427 (related application). 16 pages, dated Jun. 27, 2016.
Calmant T., et al.; Database Compendex [online]; A dynamic and service-oriented component model for python long-lived applications, XP002758638, Database accession No. E20123015277520 abstract 2012.
Van Der Hoek C., et al.; Composition Environments for Deployable Software Components (Technical Report UCI-ICS-02-18 Department of Information and Computer Science, University of California); Internet Citation; Aug. 22, 2002; XP007901280.
PCT International Search Report and Written Opinion of PCT/IB2016/000467 (related application), 15 pages, dated Jul. 13, 2016.
Anonymous: "Docker storage 101: How storage works in Docker", XP55294909, Retrieved from the Internet: URL: http://www.computerweekly.com/feature/Docker-storage-101-How-storage-works-in-Docker [retrieved on Aug. 10, 2016] the whole document; Apr. 30, 2015.
PCT: International Search Report and Written Opinion of PCT/IB16/00554 (related application), 13 pages, Aug. 26, 2016.
PCT: International Search Report and Written Opinion of PCT/IB16/00839 (related application), 11 pages, dated Aug. 30, 2016.

\* cited by examiner

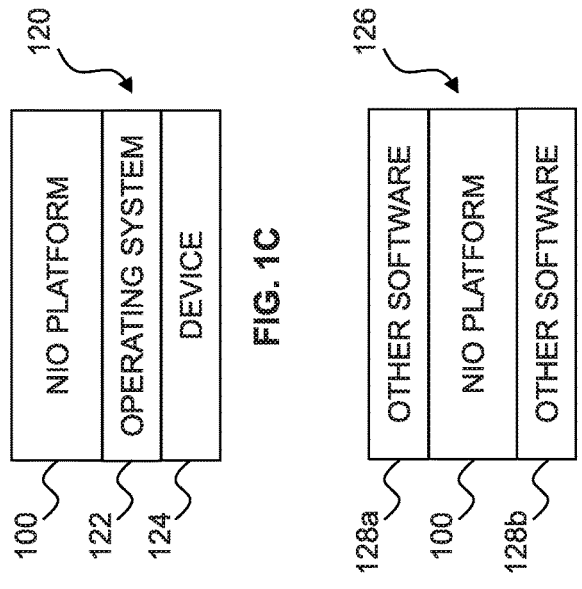
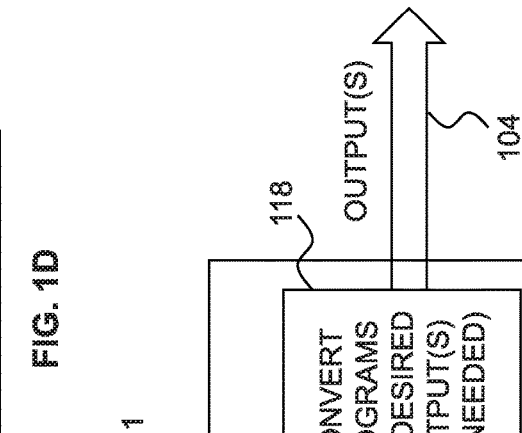
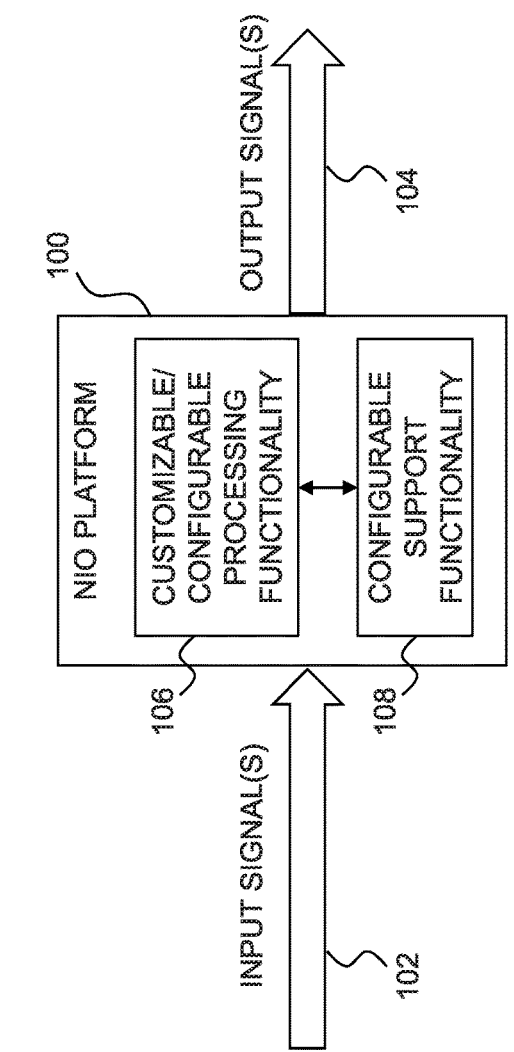
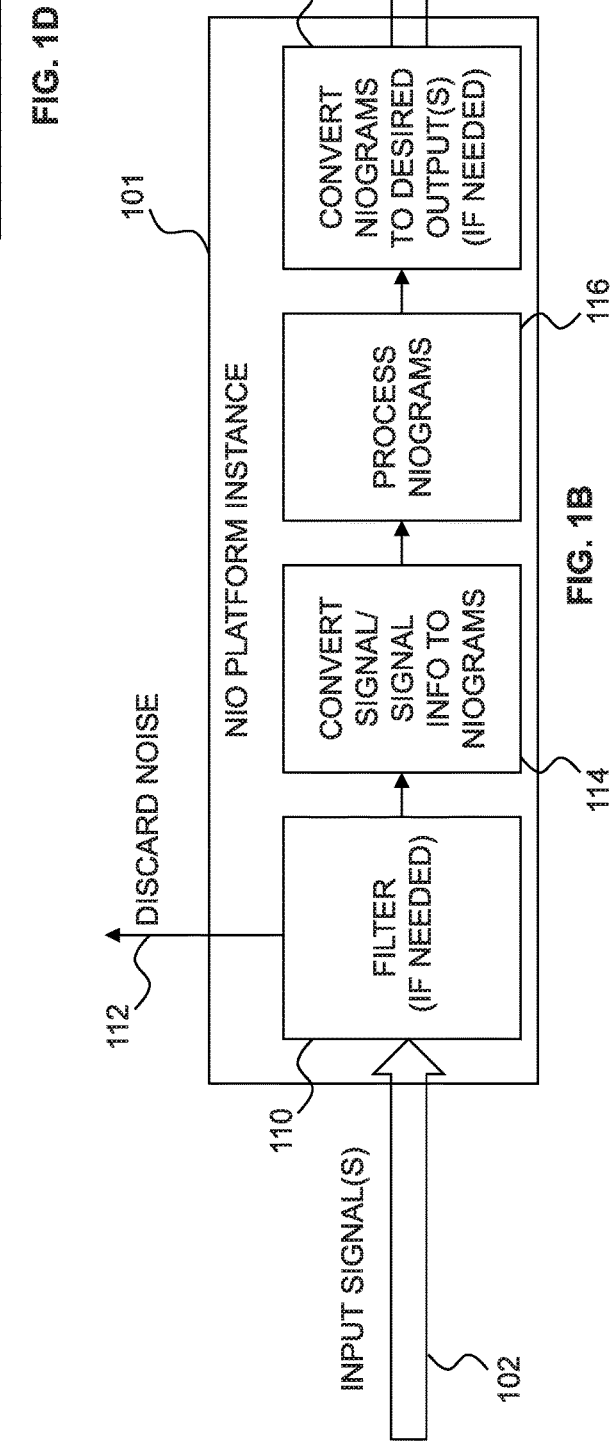

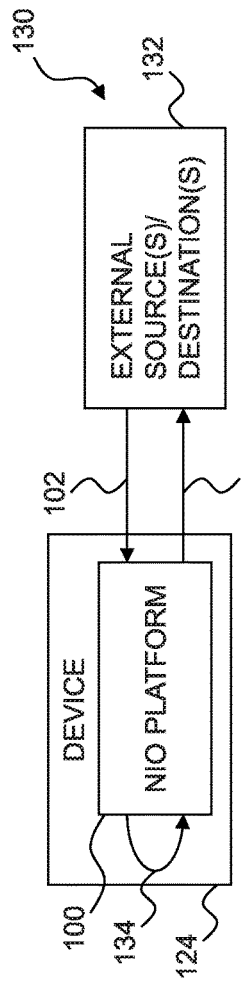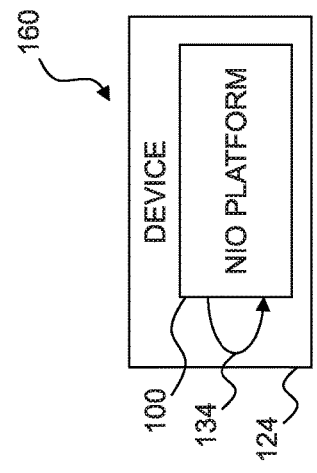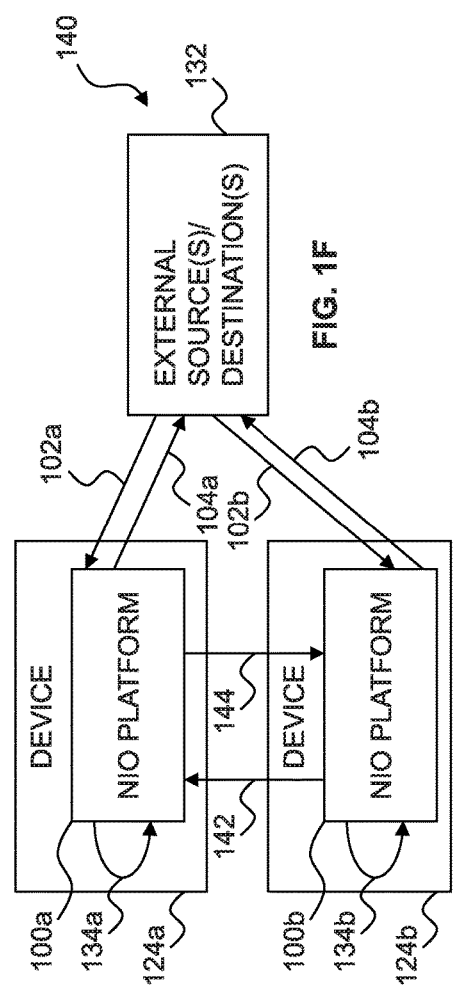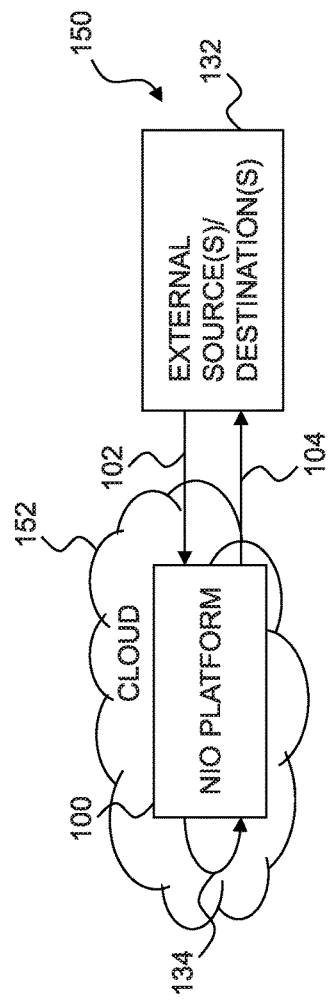

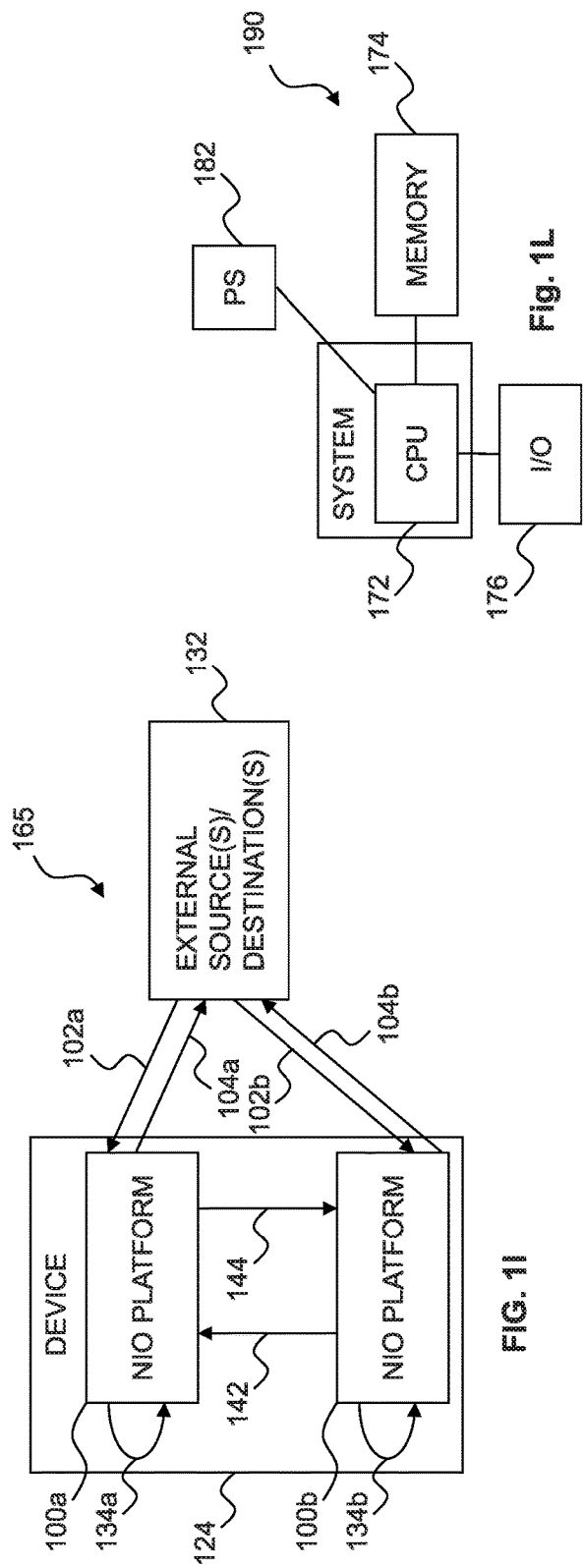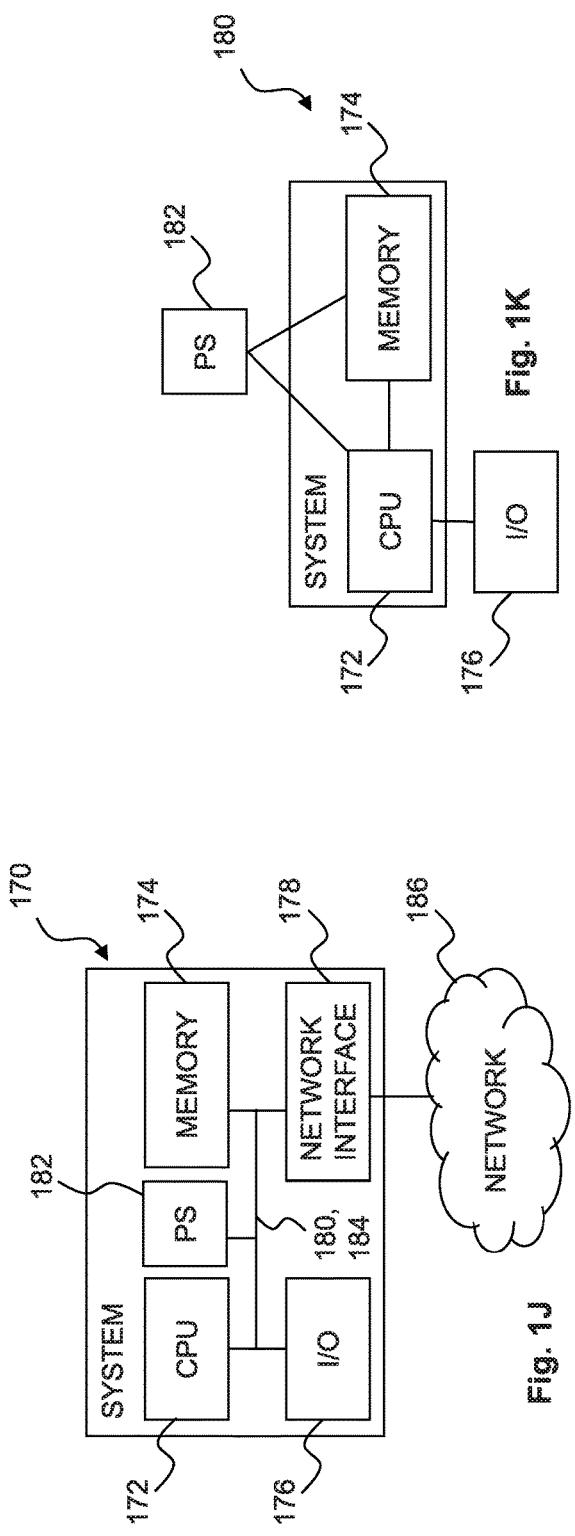

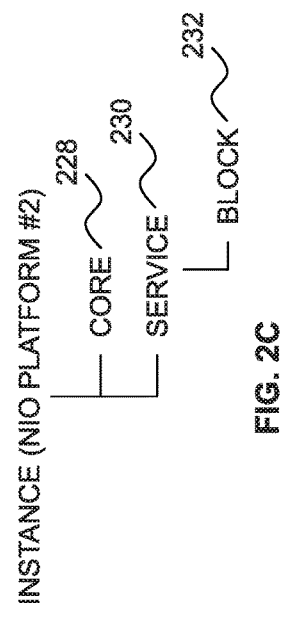
FIG. 2B
FIG. 2C
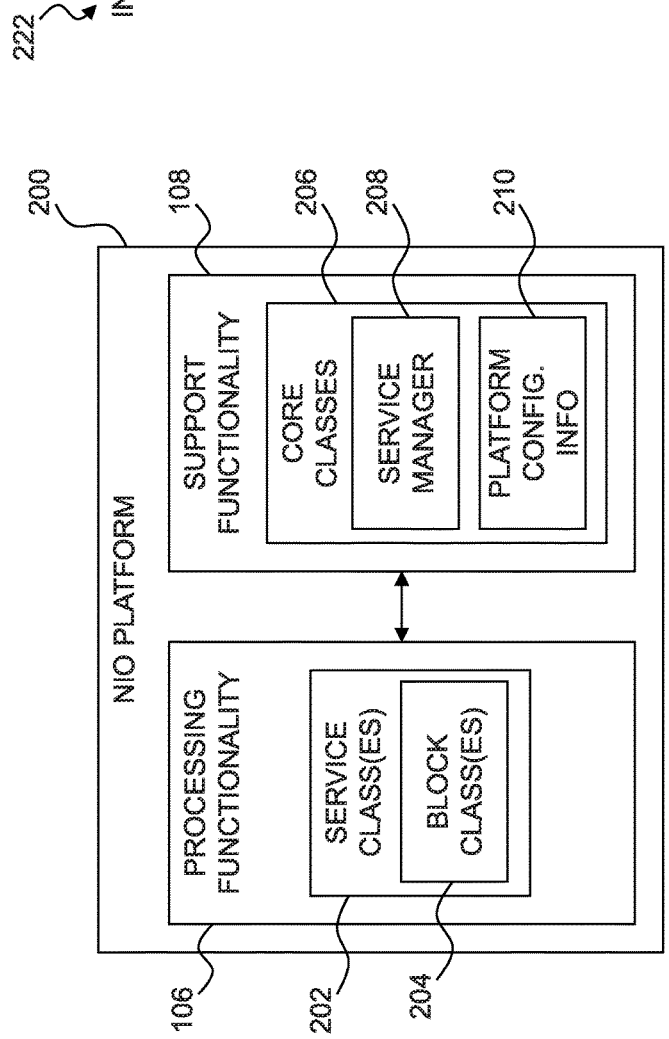
FIG. 2A
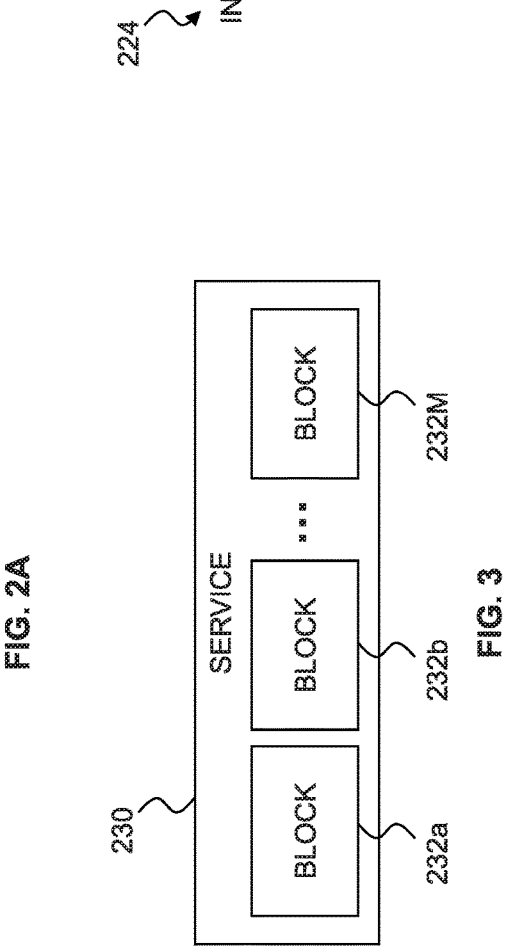
FIG. 3

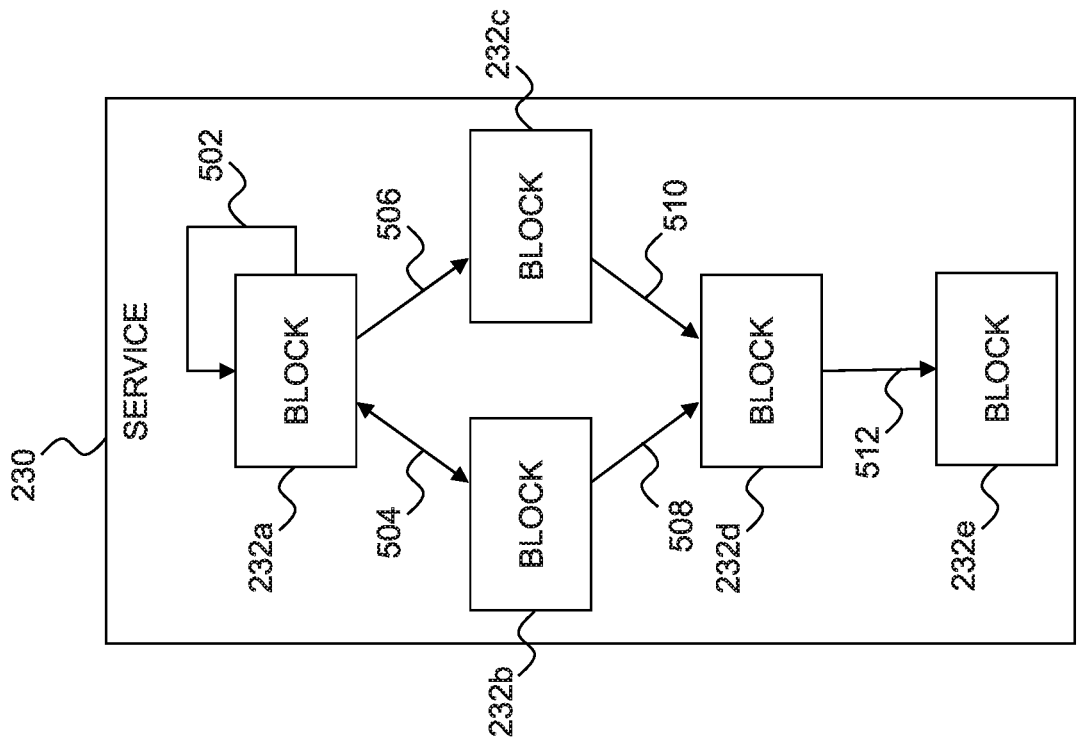
FIG. 5C
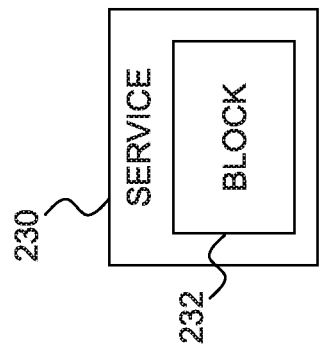
FIG. 5A
FIG. 5B

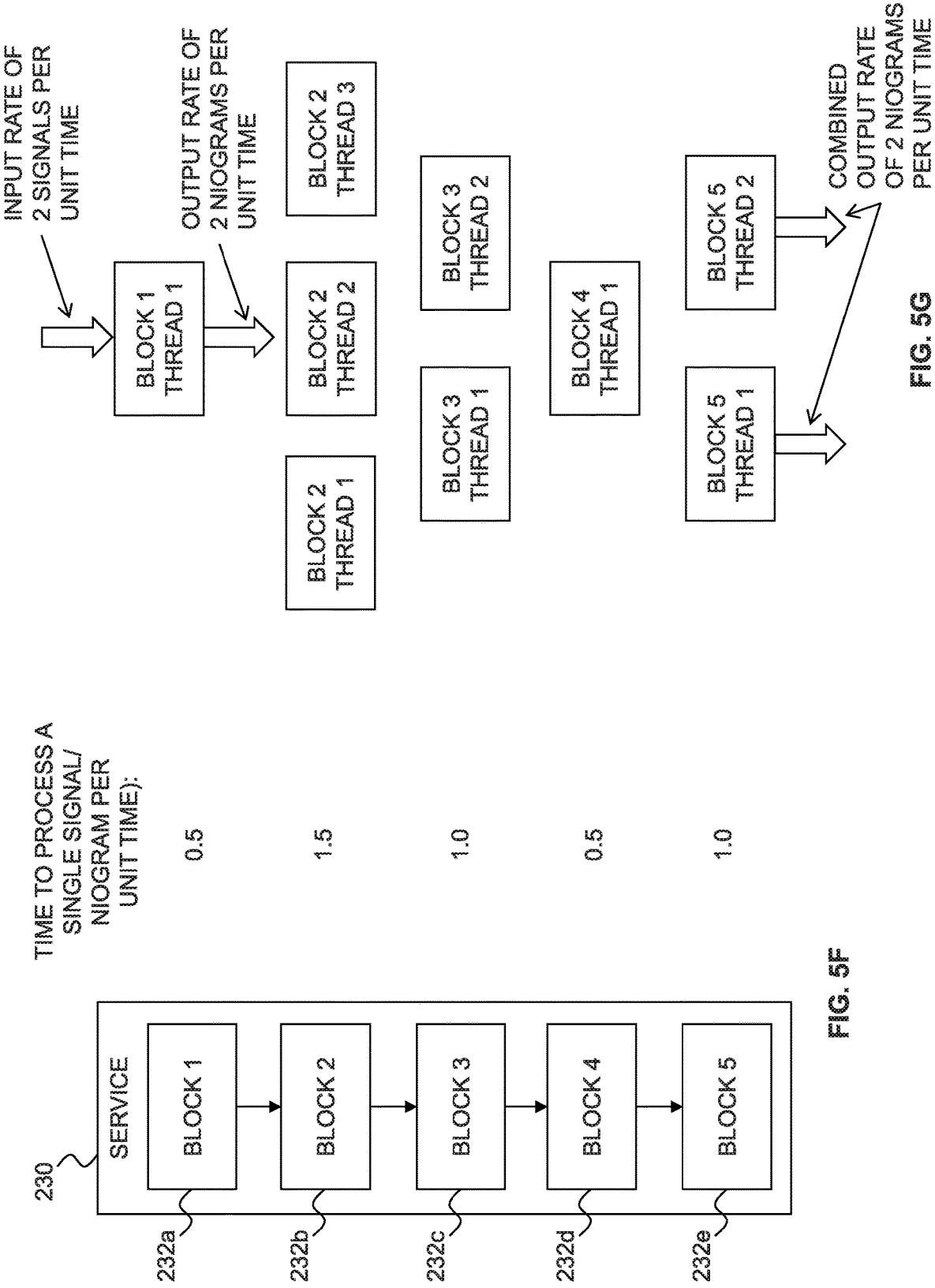

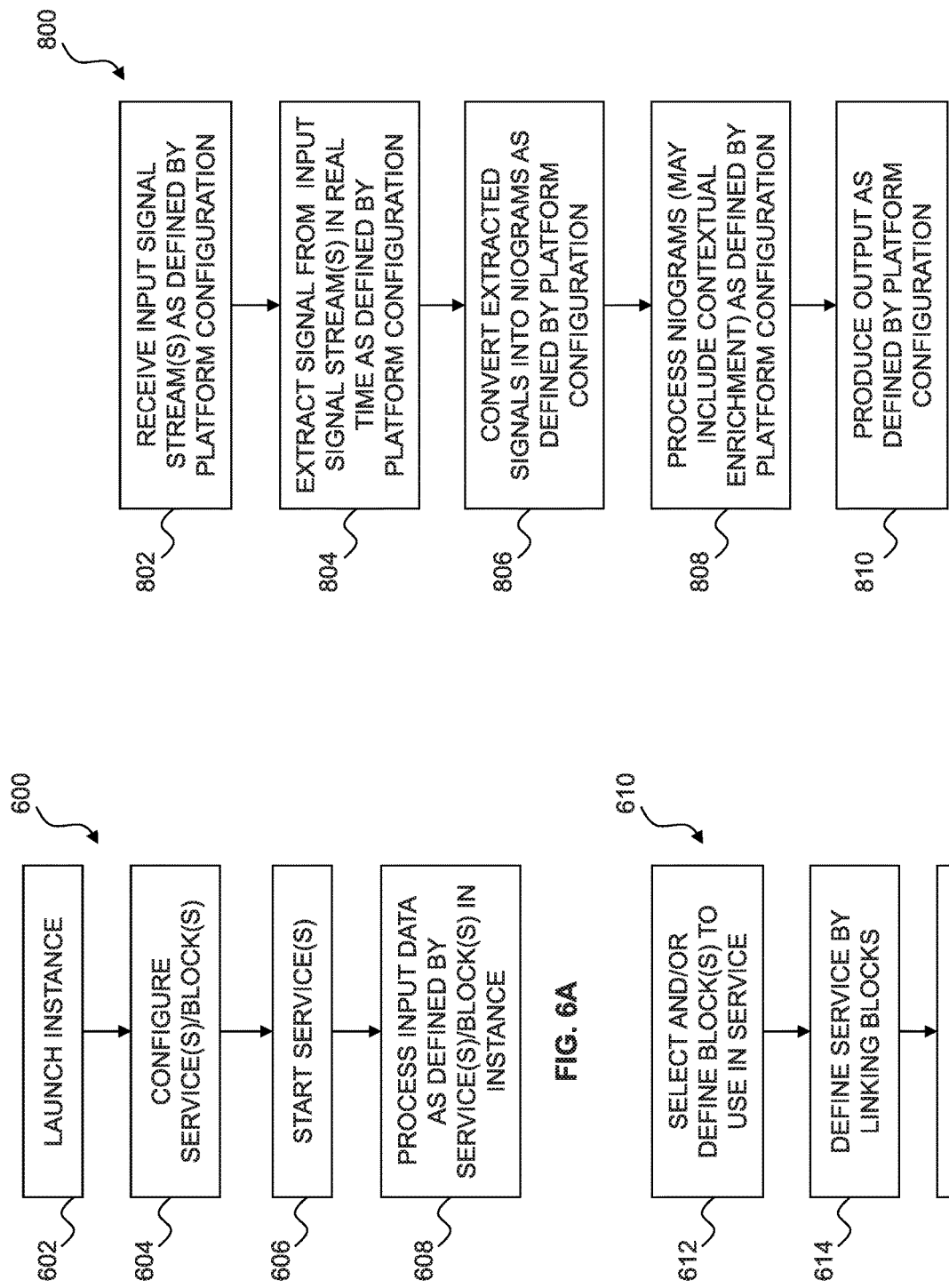

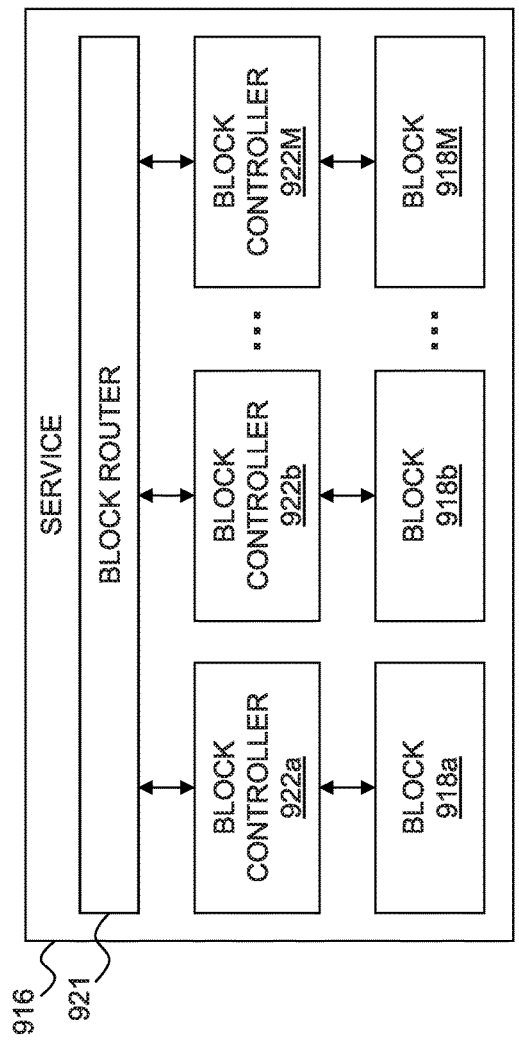
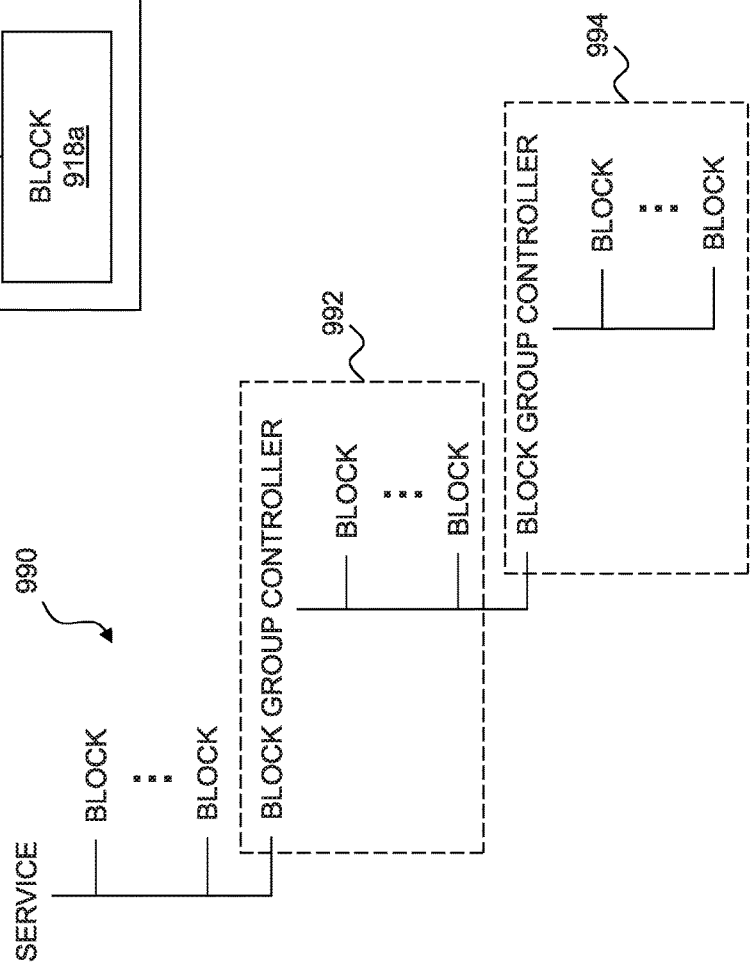
FIG. 9D
FIG. 9C

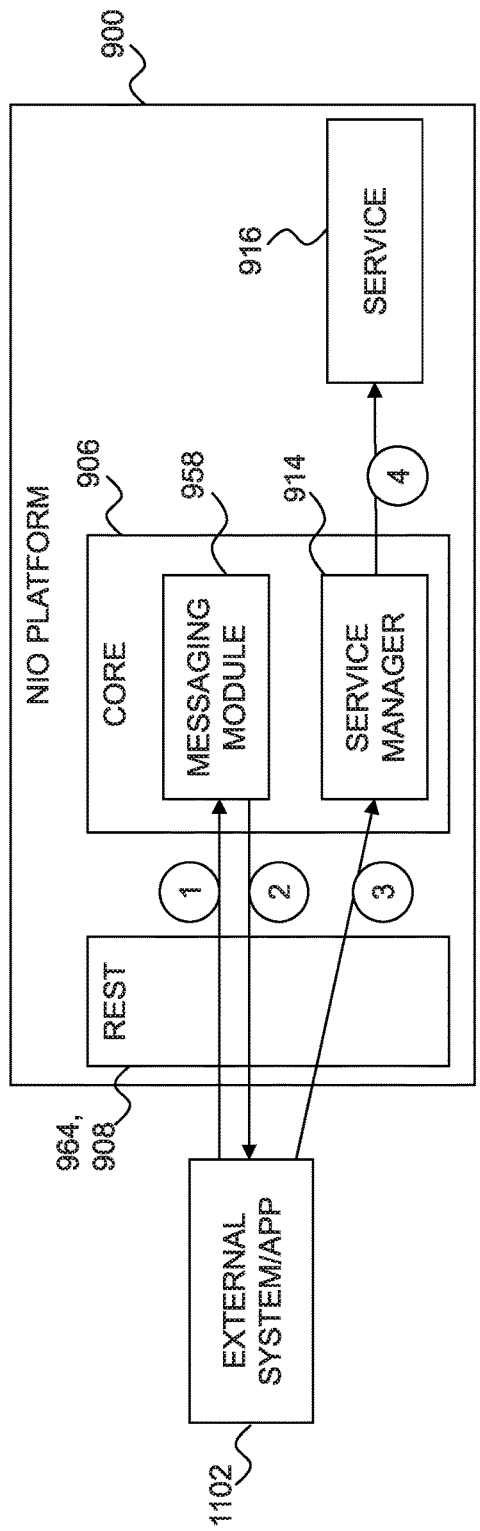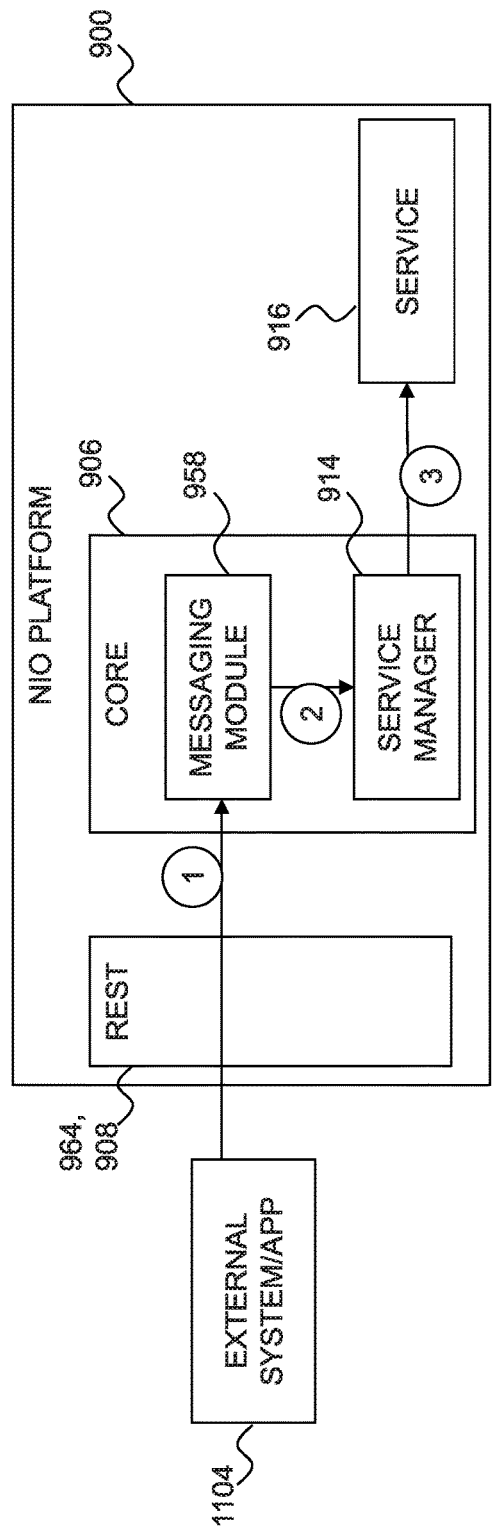

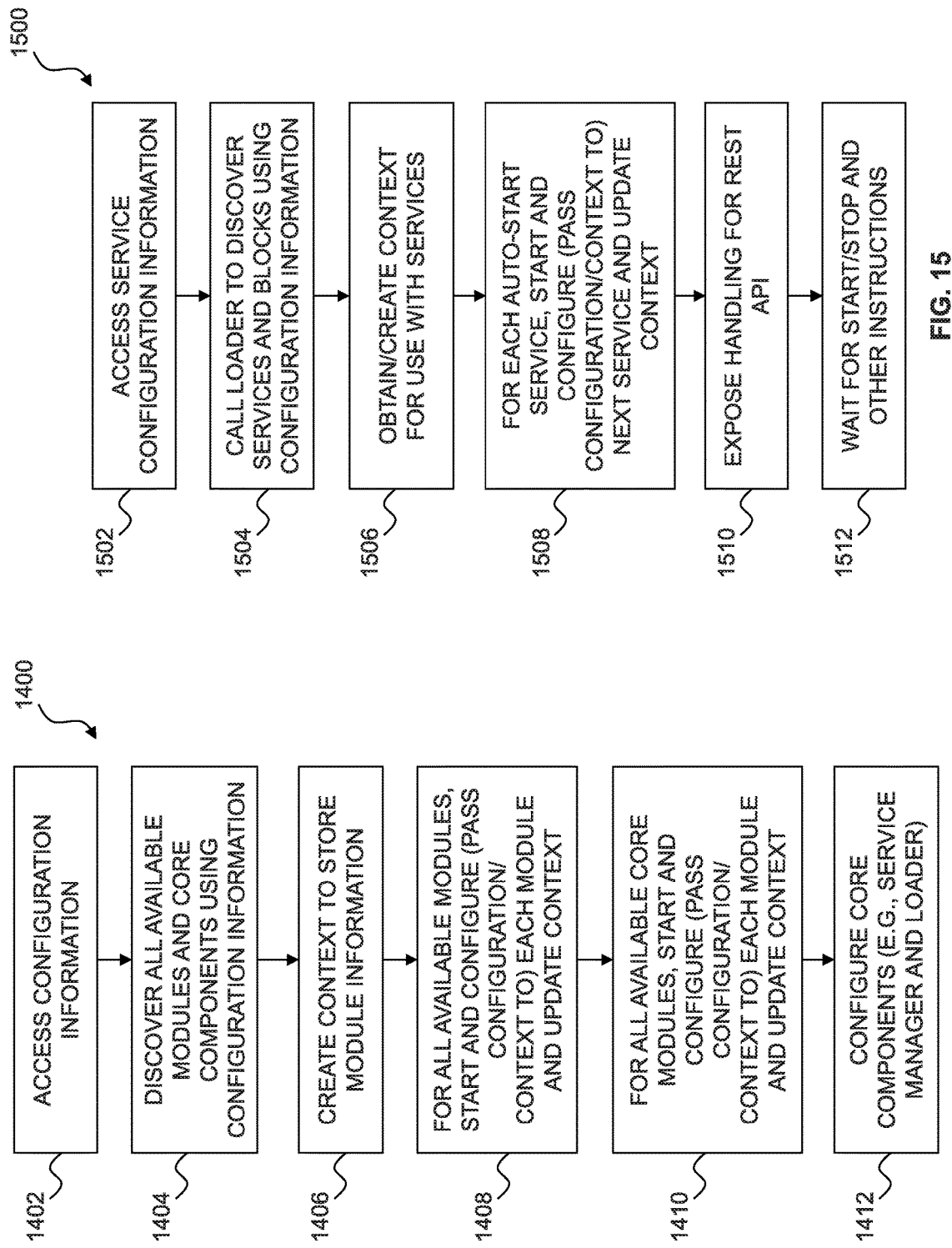

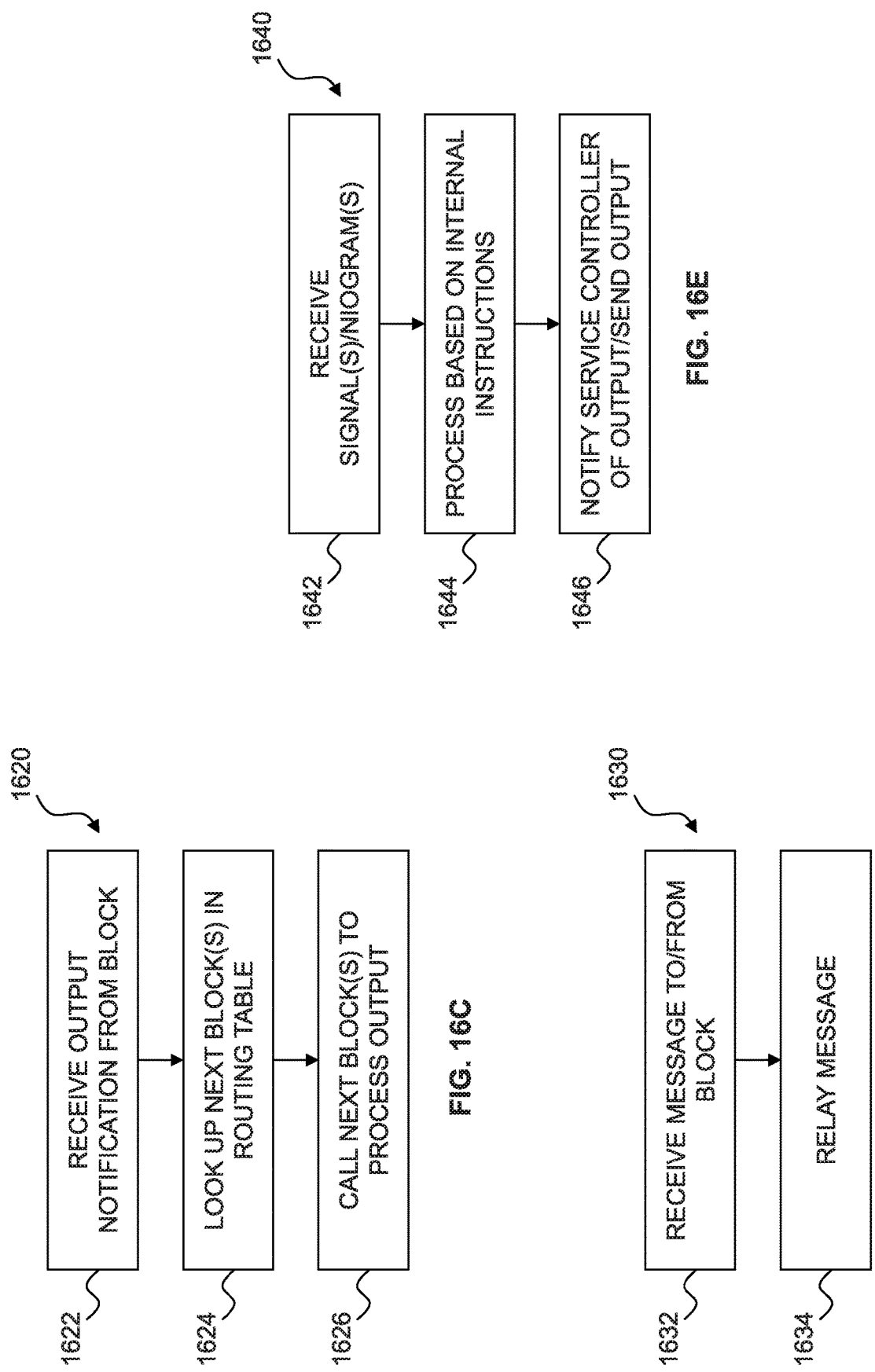

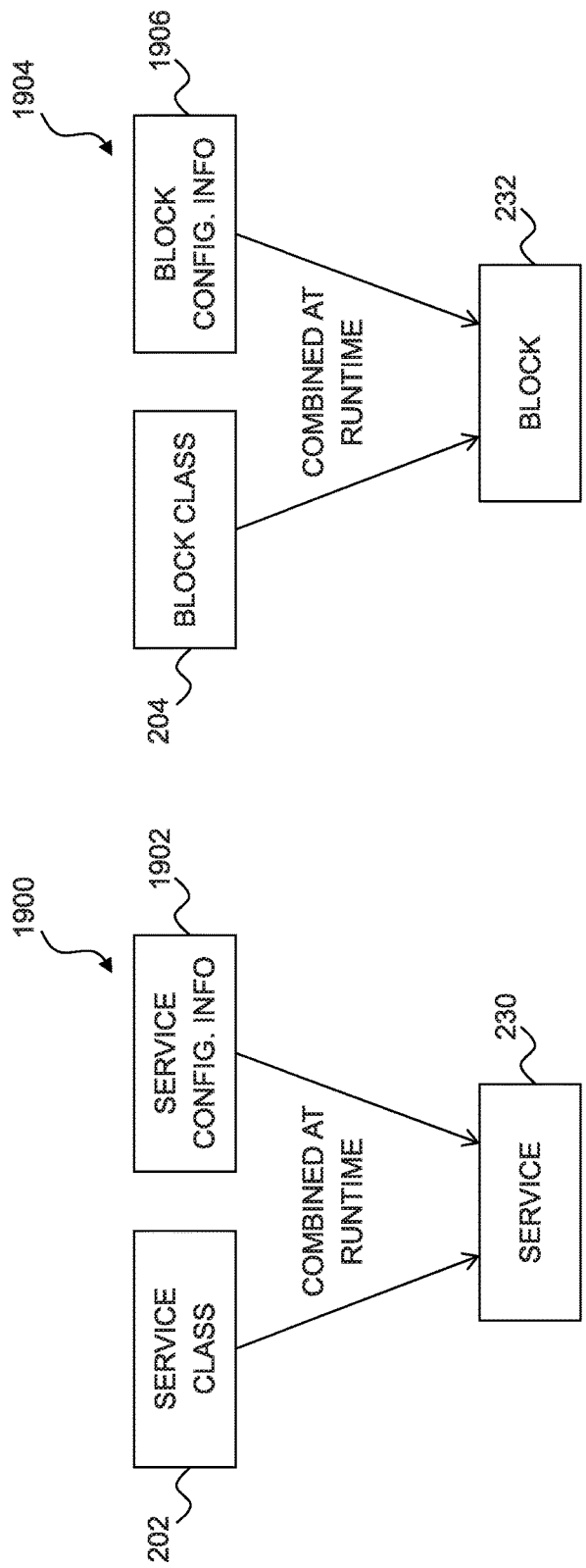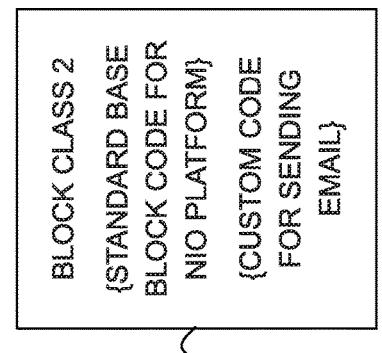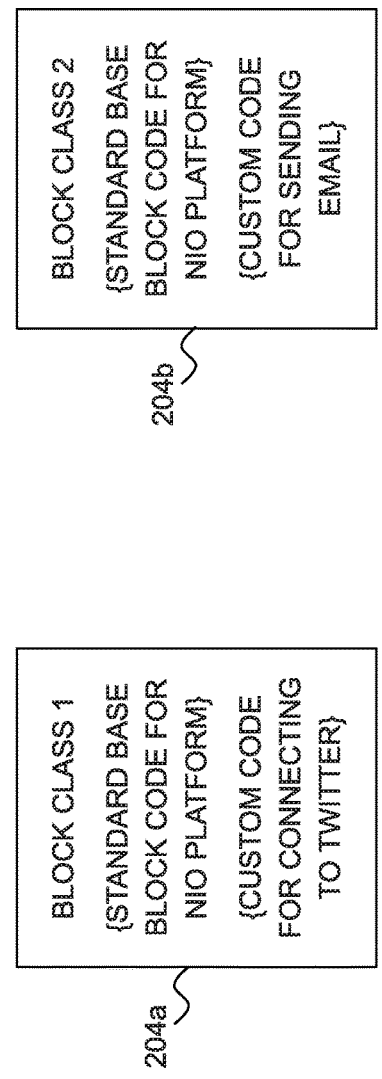

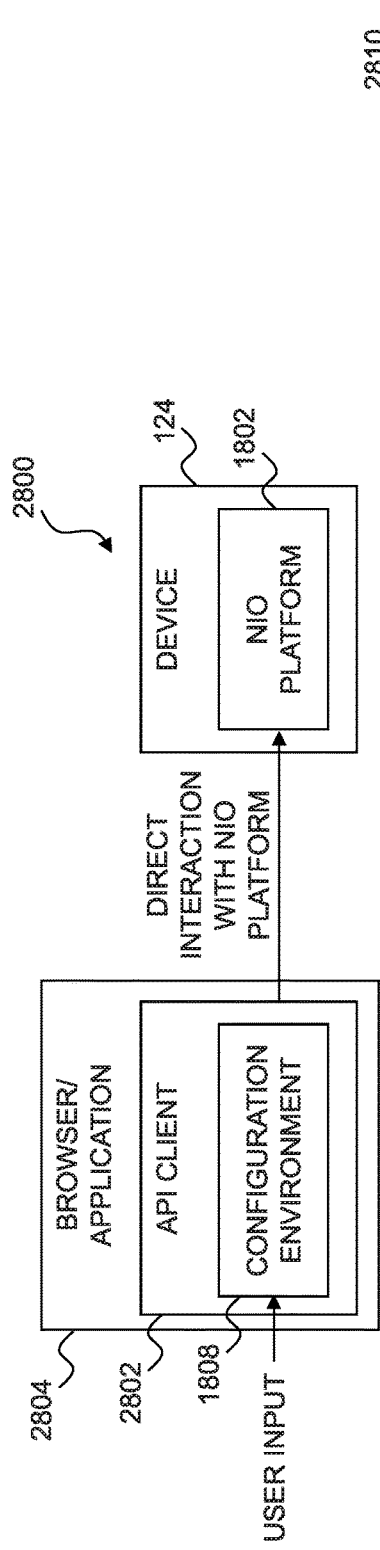
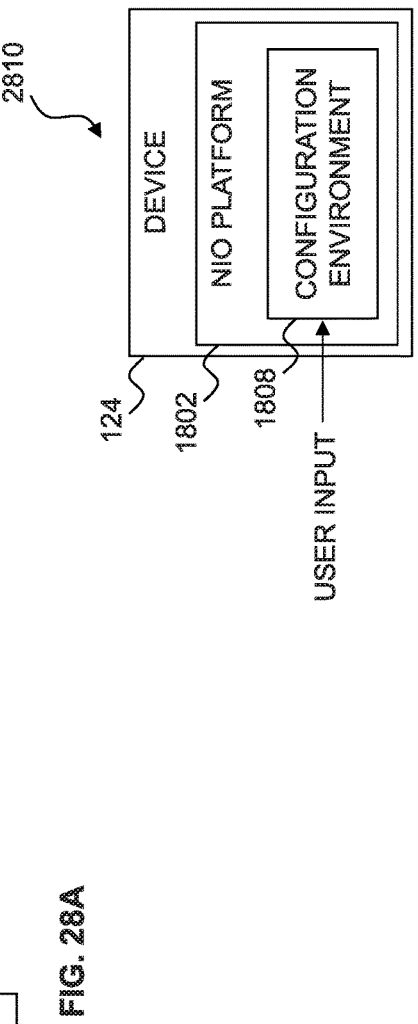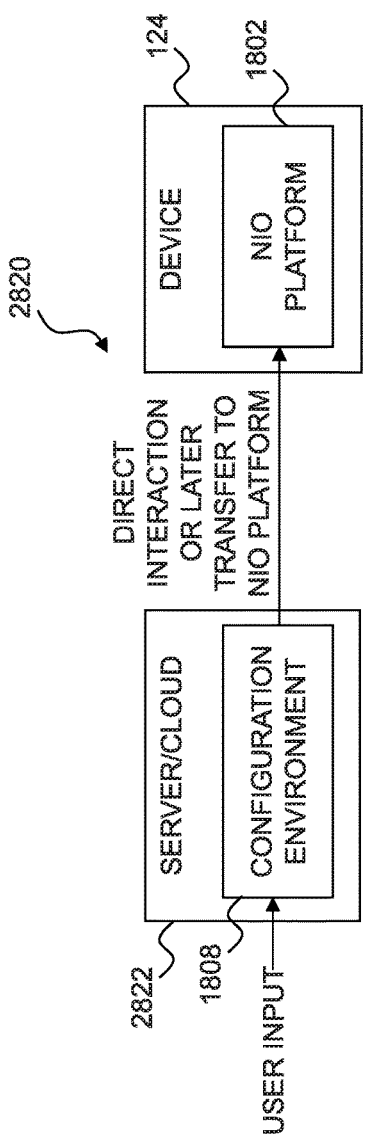

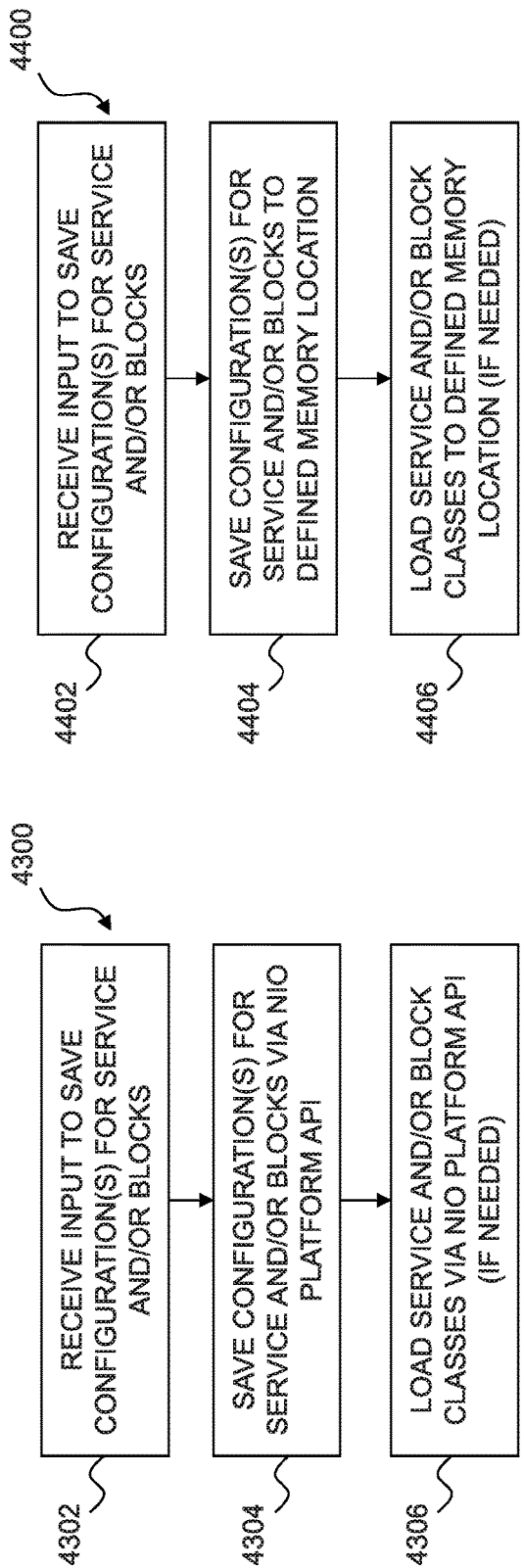
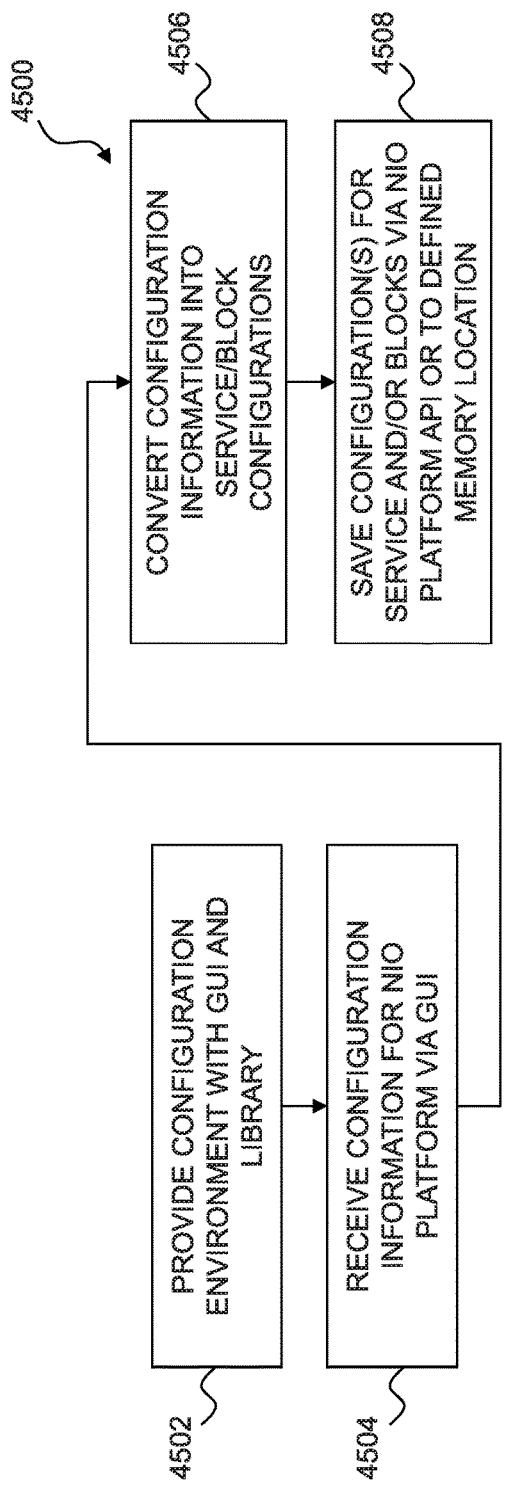
FIG. 44
FIG. 43
FIG. 45

SYSTEM AND METHOD FOR A DEVELOPMENT ENVIRONMENT FOR BUILDING SERVICES FOR A PLATFORM INSTANCE

CLAIM OF PRIORITY AND CROSS-REFERENCE TO RELATED APPLICATIONS

This application claims benefit of U.S. Provisional Application No. 62/141,107, filed Mar. 31, 2015, entitled SYSTEM AND METHOD FOR A DEVELOPMENT ENVIRONMENT FOR BUILDING SERVICES FOR A PLATFORM INSTANCE, and is a Continuation-in-Part of U.S. patent application Ser. No. 14/885,629, filed on Oct. 16, 2015, which is a Continuation of International PCT Application No. PCT/IB15/01288, filed on May 21, 2015, entitled SYSTEM AND METHOD FOR FULLY CONFIGURABLE REAL TIME PROCESSING. PCT Application No. PCT/IB15/01288 claims the benefit of U.S. Provisional Application No. 62/001,457, filed on May 21, 2014, entitled SYSTEM AND METHOD FOR ASYNCHRONOUSLY CAPTURING. PROCESSING, AND PUBLISHING DATA STREAMS IN REAL TIME, U.S. Provisional Application No. 62/028,145, filed on Jul. 23, 2014, entitled SYSTEM AND METHOD FOR FULLY CONFIGURABLE ASYNCHRONOUS REAL TIME PROCESSING, U.S. Provisional Application No. 62/041,566, filed on Aug. 25, 2014, entitled SYSTEM AND METHOD FOR AGGREGATING AND PUBLISHING DATA FROM MULTIPLE SOURCES IN REAL TIME OR NEAR REAL TIME, and U.S. Provisional Application No. 62/137,007, filed on Mar. 23, 2015, entitled SYSTEM AND METHOD FOR CONFIGURING SERVICES AND BLOCKS IN A PLATFORM INSTANCE. International PCT Application No. PCT/IB15/01288, U.S. patent application Ser. No. 14/885,629, and U.S. Provisional Application Nos. 62/001,457, 62/028,145, 62/041,566 and 62/137,007 are incorporated by reference herein in their entirety.

BACKGROUND

The proliferation of devices has resulted in the production of a tremendous amount of data that is continuously increasing. Current processing methods are unsuitable for processing this data. Accordingly, what is needed are systems and methods that address this issue.

BRIEF DESCRIPTION OF THE DRAWINGS

For a more complete understanding, reference is now made to the following description taken in conjunction with the accompanying Drawings in which:

FIG. 1A illustrates one embodiment of a neutral input/output (NIO) platform with customizable and configurable processing functionality and configurable support functionality;

FIG. 1B illustrates one embodiment of a data path that may exist within a NIO platform instance based on the NIO platform of FIG. 1A;

FIGS. 1C and 1D illustrate embodiments of the NIO platform of FIG. 1A as part of a stack:

FIGS. 1E-1I illustrate embodiments of environments in which the NIO platform of FIG. 1A may be deployed;

FIGS. 1J-1L illustrate embodiments of systems on which the NIO platform of FIG. 1A may be run;

FIG. 2A illustrates a more detailed embodiment of the NIO platform of FIG. 1A;

FIGS. 2B and 2C illustrate embodiments of hierarchical arrangements that may exist within NIO platform instances;

FIG. 3 illustrates one embodiment of a service that may exist within a NIO platform instance;

FIGS. 5A-5C illustrate various embodiments of the service of FIG. 3;

FIG. 5F illustrates an embodiment of the service of FIG. 3;

FIG. 5G illustrates an embodiment of multiple block threads corresponding to blocks within the service of FIG. 5F;

FIG. 6A illustrates one embodiment of a method that may be used with the NIO platform of FIGS. 1A, 2A, and 4A;

FIGS. 6B-8 illustrate more detailed embodiments of various steps of FIG. 6A;

FIG. 9C illustrates one embodiment of a hierarchy that may exist within the NIO platform of FIGS. 9A and 9B;

FIG. 9D illustrates one embodiment of a service that may exist within the NIO platform of FIGS. 9A and 9B;

FIGS. 11A and 11B illustrate embodiments of a messaging module that may be used in the NIO platform of FIGS. 9A and 9B;

FIGS. 14 and 15 illustrate embodiments of methods that may be used during the interactions of FIG. 13;

FIGS. 16A-16D illustrate embodiments of methods that may be used by a service of the NIO platform of FIGS. 9A and 9B;

FIG. 16E illustrates one embodiment of a method that may be used by a block within the NIO platform of FIGS. 9A and 9B;

FIG. 19A illustrates one embodiment of a service configuration environment within which a service is configured at runtime;

FIG. 19B illustrates one embodiment of a block configuration environment within which a block is configured at runtime;

FIGS. 20A and 20B illustrate embodiments of block classes that may be used within the block configuration environment of FIG. 19B;

FIGS. 28A-28C illustrate embodiments of a development environment within which configuration of the NIO platform of FIG. 18 may occur;

FIGS. 41-45 illustrate embodiments of methods that maybe executed within the development environment of FIGS. 28A-28C. FIG. 2 illustrates

DETAILED DESCRIPTION

Figure 4B:
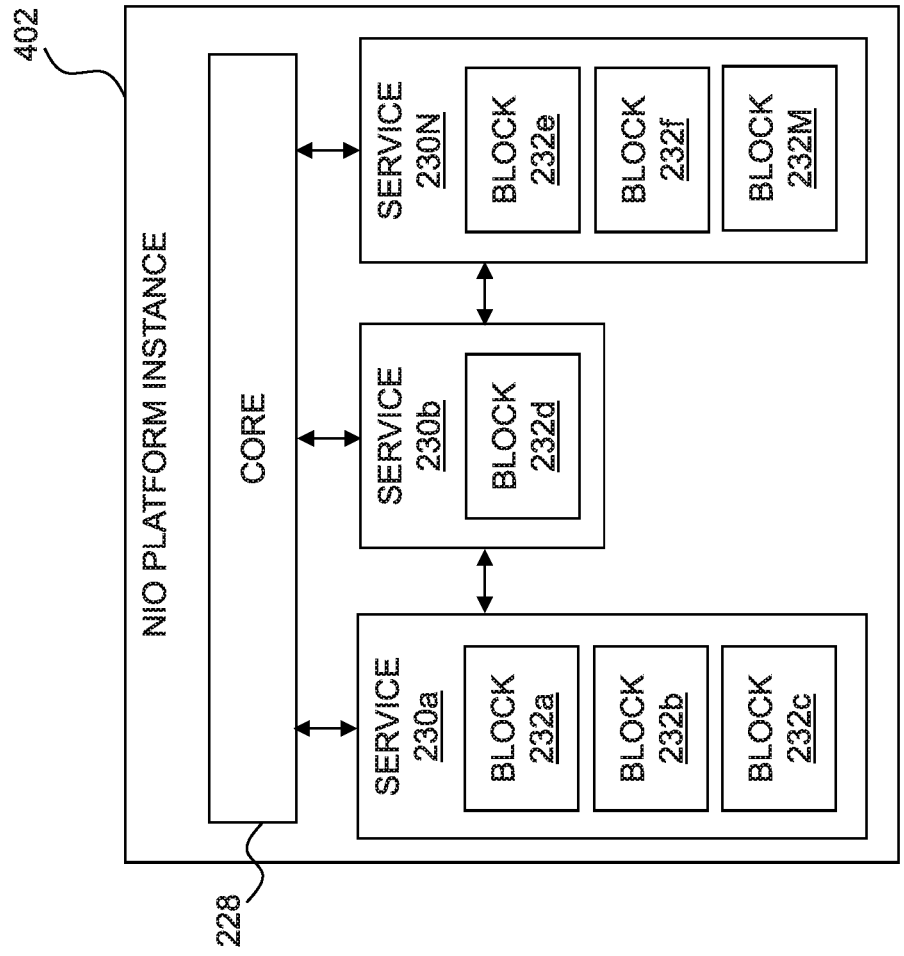
FIG. 4B illustrates one embodiment of a NIO platform instance based on the NIO platform of FIG. 4A.

The present disclosure is directed to a system and method for a development environment for creating services for a neutral input/output platform instance. It is understood that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The present disclosure describes various embodiments of a neutral input/output (NIO) platform that includes a core that supports one or more services. While the platform itself may technically be viewed as an executable application in some embodiments, the core may be thought of as an application engine that runs task specific applications called services. The services are constructed using defined templates that are recognized by the core, although the templates can be customized to a certain extent. The core is designed to manage and support the services, and the services in turn manage blocks that provide processing functionality to their respective service. Due to the structure and flexibility of the runtime environment provided by the NIO platform's core, services, and blocks, the platform is able to asynchronously process any input signal from one or more sources in real time.

Referring to FIG. 1A, one embodiment of a NIO platform 100 is illustrated. The NIO platform 100 is configurable to receive any type of signal (including data) as input, process those signals, and produce any type of output. The NIO platform 100 is able to support this process of receiving, processing, and producing in real time or near real time. The input signals can be streaming or any other type of continuous or non-continuous input.

When referring to the NIO platform 100 as performing processing in real time and near real time, it means that there is no storage other than possible queuing between the NIO platform instance's input and output. In other words, only processing time exists between the NIO platform instance's input and output as there is no storage read and write time, even for streaming data entering the NIO platform 100.

It is noted that this means there is no way to recover an original signal that has entered the NIO platform 100 and been processed unless the original signal is part of the output or the NIO platform 100 has been configured to save the original signal. The original signal is received by the NIO platform 100, processed (which may involve changing and/or destroying the original signal), and output is generated. The receipt, processing, and generation of output occurs without any storage other than possible queuing. The original signal is not stored and deleted, it is simply never stored. The original signal generally becomes irrelevant as it is the output based on the original signal that is important, although the output may contain some or all of the original signal. The original signal may be available elsewhere (e.g., at the original signal's source), but it may not be recoverable from the NIO platform 100.

It is understood that the NIO platform 100 can be configured to store the original signal at receipt or during processing, but that is separate from the NIO platform's ability to perform real time and near real time processing. For example, although no long term (e.g., longer than any necessary buffering) memory storage is needed by the NIO platform 100 during real time and near real time processing, storage to and retrieval from memory (e.g., a hard drive, a removable memory, and/or a remote memory) is supported if required for particular applications.

The internal operation of the NIO platform 100 uses a NIO data object (referred to herein as a niogram). Incoming signals 102 are converted into niograms at the edge of the NIO platform 100 and used in intra-platform communications and processing. This allows the NIO platform 100 to handle any type of input signal without needing changes to the platform's core functionality. In embodiments where multiple NIO platforms are deployed, niograms may be used in inter-platform communications.

The use of niograms allows the core functionality of the NIO platform 100 to operate in a standardized manner regardless of the specific type of information contained in the niograms. From a general system perspective, the same core operations are executed in the same way regardless of the input data type. This means that the NIO platform 100 can be optimized for the niogram, which may itself be optimized for a particular type of input for a specific application.

The basic structure of a niogram is designed to allow the information within the niogram to change as it moves through the NIO platform 100. For example, different types of information can be added to or removed from a niogram (e.g., a niogram containing a radio frequency identifier (RFID) value from an RFID tag can be modified to include an expiration date of a corresponding product from which the tag was read). Furthermore, multiple niograms can be merged into a single niogram and a single niogram can be divided into multiple niograms. The NIO platform 100 can also create and destroy niograms as needed. The ability to create niograms, destroy niograms, and change the internal information of a niogram enables information to be enriched contextually in many different ways by the NIO platform 100 without changing the niogram's basic structure and this enrichment can occur in real time or near real time.

The NIO platform 100 is designed to process niograms in a customizable and configurable manner using processing functionality 106 and support functionality 108. The processing functionality 106 is generally both customizable and configurable by a user. Customizable means that at least a portion of the source code providing the processing functionality 106 can be modified by a user. In other words, the task specific software instructions that determine how an input signal that has been converted into one or more niograms will be processed can be directly accessed at the code level and modified. Configurable means that the processing functionality 106 can be modified by such actions as selecting or deselecting functionality and/or defining values for configuration parameters. These modifications do not require direct access or changes to the underlying source code and may be performed at different times (e.g., before runtime or at runtime) using configuration files, commands issued through an interface, and/or in other defined ways.

The support functionality 108 is generally only configurable by a user, with modifications limited to such actions as selecting or deselecting functionality and/or defining values for configuration parameters. In other embodiments, the support functionality 108 may also be customizable. It is understood that the ability to modify the processing functionality 106 and/or the support functionality 108 may be limited or non-existent in some embodiments.

The support functionality 108 supports the processing functionality 106 by handling general configuration of the NIO platform 100 at runtime and providing management functions for starting and stopping the processing functionality. The resulting niograms can be converted into any signal type(s) for output(s) 104.

Referring to FIG. 1B, one embodiment of a NIO platform instance 101 illustrates a data path that starts when the input signal(s) 102 are received and continues through the generation of the output(s) 104. The NIO platform instance 101 is created when the NIO platform 100 of FIG. 1A is launched. A NIO platform may be referred to herein as a "NIO platform" before being launched and as a "NIO platform instance" after being launched, although the terms may be used interchangeably for the NIO platform after launch. As described above, niograms are used internally by the NIO platform instance 101 along the data path.

In the present example, the input signal(s) 102 may be filtered in block 110 to remove noise, which can include irrelevant data, undesirable characteristics in a signal (e.g., ambient noise or interference), and/or any other unwanted part of an input signal. Filtered noise may be discarded at the edge of the NIO platform instance 101 (as indicated by arrow 112) and not introduced into the more complex processing functionality of the NIO platform instance 101. The filtering may also be used to discard some of the signal's information while keeping other information from the signal. The filtering saves processing time because core functionality of the NIO platform instance 101 can be focused on relevant data having a known structure for post-filtering processing. In embodiments where the entire input signal is processed, such filtering may not occur. In addition to or as alternative to filtering occurring at the edge, filtering may occur inside the NIO platform instance 101 after the signal is converted to a niogram.

Non-discarded signals and/or the remaining signal information are converted into niograms for internal use in block 114 and the niograms are processed in block 116. The niograms may be converted into one or more other formats for the output(s) 104 in block 118, including actions (e.g., actuation signals). In embodiments where niograms are the output, the conversion step of block 118 would not occur.

Referring to FIG. 1C, one embodiment of a stack 120 is illustrated. In the present example, the NIO platform 100 interacts with an operating system (OS) 122 that in turn interacts with a device 124. The interaction may be direct or may be through one or more other layers, such as an interpreter or a virtual machine. The device 124 can be a virtual device or a physical device, and may be standalone or coupled to a network.

Referring to FIG. 1D, another embodiment of a stack 126 is illustrated. In the present example, the NIO platform 100 interacts with a higher layer of software 128a and/or a lower layer of software 128b. In other words, the NIO platform 100 may provide part of the functionality of the stack 126, while the software layers 128a and/or 128b provide other parts of the stack's functionality. Although not shown, it is understood that the OS 122 and device 124 of FIG. 1C may be positioned under the software layer 128b if the software 128b is present or directly under the NIO platform 100 (as in FIG. 1C) if the software layer 128b is not present.

Referring to FIG. 1E, in one embodiment, an environment 130 is illustrated with the NIO platform 100 of FIG. 1A. As illustrated, the NIO platform 100 supports instance to instance or device and system, which enables a NIO platform 100 to subscribe from and publish to one or more other platforms broadly or specifically to a single application logic/context requirement. The NIO platform 100 provides functionality needed to receive, process, and/or act on any input signal received from one or more external sources 132 (as represented by arrow 102) and/or from the NIO platform 100 itself (as represented by arrow 134). Once the input signal is handled as defined by the configuration of the NIO platform 100, the input signal and/or other signals that may result from processing may be output to one or more external destinations 132 (as represented by arrow 104) and/or to the NIO platform 100 itself (as represented by arrow 134).

In the present embodiment, the input signals are not stored except for queuing (if needed), and no database or other permanent storage mechanism need be used for information handled by the NIO platform 100. Queuing may be handled in a variety of ways, including the use of memory/random access memory (RAM) and/or other mechanisms such as a persistence layer (e.g., an SQLite persistence layer). As the received input signals are handled in real time or near real time and the NIO platform 100 is not constrained by database access limitations, throughput can occur at a much higher rate than can be achieved in systems that rely on database access or that require storing data prior to processing.

In some embodiments, the NIO platform 100 allocates and de-allocates functionality as needed, thereby minimizing the platform's footprint.

The NIO platform 100 provides its functionality via a generic architecture that may be configured to address specific needs. Although the architecture may be implemented as an application specific integrated circuit (ASIC) or as another application specific embodiment, the architecture itself is configurable and, accordingly, highly flexible. Furthermore, the architecture is able to process signals in one platform instance and then pass the processed signals back to itself for further processing in the same or another platform instance. This ability to internally link to itself enables the architecture to take advantage of multiple concurrently executing related platform instances. With each platform instance being fully configurable, the architecture is able to rapidly process large amounts of information while also providing highly customizable outputs.

The NIO platform 100 may be implemented in a manner that is relatively OS independent. For example, the NIO platform 100 may be implemented using a language such as Python. To provide additional OS neutrality, design decisions may include avoiding the use of library calls that are OS specific and/or may avoid the inclusion of modules that are OS specific.

The NIO platform 100 may provide self-awareness functional capability through services configured to support platform instances, advanced dynamic context artificial intelligence, and/or system monitoring. With respect to instances, pre-configured services may be based on specific indices relating to signal type and source, level of awareness function, and actions. The services may be utilized for device and/or system diagnostics and quality control. With respect to advanced dynamic context artificial intelligence, custom developed composite context within a process resident within the NIO platform 100 may be specific to a use case, business process, system of devices or signal producers, or a single device specification.

With respect to system monitoring, the NIO platform 100 may be used to monitor the state or condition of itself (i.e., the NIO platform 100) as a self-aware system. To accomplish this monitoring, niograms may be generated that correspond to the current state of the NIO platform 100. Details contained in such niograms may range from the amount of central processing unit (CPU) usage of the NIO platform 100 to an error generated from one aspect of the NIO platform 100. These niograms can then be processed by services and combined with internal actions to create a self-aware and proactive system monitoring solution. Additionally, a separate instance of the NIO platform 100 can be set up to apply this system monitoring logic and the niograms from the internal monitoring service can be sent there.

The NIO platform 100 may be stored and executed on the device 124. The NIO platform 100 may be an application residing on the device 124 and/or may be embedded in the device 124. Examples of the device 124 include single-board computing (SBC) and onboard computing (OBC) platforms, cellular telephones (including smart phones), personal digital assistants (PDAs), netbooks, tablets, laptops, desktops, workstations, servers, equipment (e.g., manufacturing equipment, monitoring equipment, and security equipment), home appliances (e.g., refrigerators, stoves, ovens, coffee makers, stereos, and televisions), vehicles and other mobile systems (e.g., air, land, sea, and/or space vehicles, whether manned or autonomous), and any other device that is able to execute instructions and support some or all of the architecture of the NIO platform 100.

Communications to and from the NIO platform 100 may be direct (e.g., via a peer-to-peer network, an ad hoc network, or using a direct connection), indirect, such as through a server or other proxy (e.g., in a client-server model or a wireless network), or may use a combination of direct and indirect communications.

Referring to FIG. 1F, one embodiment of an environment 140 is illustrated where the functionality provided by the NIO platform 100 is distributed as represented by NIO platforms 100a and 100b on devices 124a and 124b, respectively. Although only two NIO platforms 100a and 100b are shown, it is understood that the functionality may be distributed across many devices. The distributed NIO platforms 100a and 100b may communicate with one another (as represented by arrows 142 and 144). Each distributed NIO platform 100a and 100b may communicate with the external source/destination 132, only a particular one of the NIO platforms 100a and 100b may be configured for communication with the external source/destination 132, or one NIO platform 100a or 100b may be configured to receive communications from the external source 132, while the other of the NIO platforms may be configured to send communications to the external destination 132.

In another embodiment of FIG. 1F, each NIO platform 100a and 100b may be a complete platform with full functionality, and may be configured to communicate with one another and/or with the external source/destination 132 in order to accomplish designated tasks. In such embodiments, one NIO platform 100a or 100b may be offline unless needed (e.g., if the other platform fails or becomes overloaded). In other embodiments, although each NIO platform 100a and 100b provides full functionality, some functionality on one or both platforms may not be used. This enables the same NIO platform to be used on multiple devices while still allocating particular functionality to one or more specific devices.

Referring to FIG. 1G, one embodiment of an environment 150 is illustrated where some or all of the functionality provided by the NIO platform 100 is provided by one or more storage and/or processing systems 152 that provides services from one or more remote locations, such as is provided by cloud computing. It is understood that the storage and/or processing systems 152 may have distributed control, with functionality provided by different entities and combined within the NIO platform 100. It is further understood that the system(s) 152 may be formed by multiple networked devices 124.

Referring to FIG. 1H, one embodiment of an environment 160 is illustrated where some or all of the functionality provided by the NIO platform 100 is used only within the device 124. In the present embodiment, the device 124 does not communicate with external source/destinations 132 unless needed for purposes such as installation, maintenance, and/or configuration.

Referring to FIG. 1I, one embodiment of an environment 165 is illustrated where multiple NIO platforms 100a and 100b are running on a single device 124. Although only two NIO platforms 100a and 100b are shown, it is understood that many instances of the NIO platform 100 may be deployed on a single device. The NIO platforms 100a and 100b may communicate with one another (as represented by arrows 142 and 144). Each distributed NIO platform 100a and 100b may communicate with the external source/destination 132, only a particular one of the NIO platforms 100a and 100b may be configured for communication with the external source/destination 132, or one NIO platform 100a or 100b may be configured to receive communications from the external source 132, while the other of the NIO platforms may be configured to send communications to the external destination 132.

It is understood that the environments of FIGS. 1E-1I may be combined in various ways. For example, the functionality of the NIO platform 100 may be distributed between the device 124a of FIG. 1F and the cloud 152 of FIG. 1G.

Referring to FIG. 1J, one embodiment of a system 170 is illustrated. The system 170 is one possible example of a portion or all of the device 124 of FIGS. 1D-1F, 1H, and 1I, and/or the external source(s)/destinations 132 of FIGS. 1E-1G and 1I. The system 170 may include a controller (e.g., a processor/central processing unit ("CPU")) 172, a memory unit 174, an input/output ("/O") device 176, and a network interface 178. The components 172, 174, 176, and 178 are interconnected by a data transport system (e.g., a bus) 180. A power supply (PS) 182 may provide power to components of the system 170 via a power transport system 184 (shown with data transport system 180, although the power and data transport systems may be separate).

It is understood that the system 170 may be differently configured and that each of the listed components may actually represent several different components. For example, the CPU 172 may actually represent a multi-processor or a distributed processing system; the memory unit 174 may include different levels of cache memory, main memory, hard disks, and remote storage locations; the I/O device 176 may include monitors, keyboards, and the like; and the network interface 178 may include one or more network cards providing one or more wired and/or wireless connections to a network 186. Therefore, a wide range of flexibility is anticipated in the configuration of the system 170, which may range from a single physical platform configured primarily for a single user or autonomous operation to a distributed multi-user platform such as a cloud computing system.

The system 170 may use any operating system (or multiple operating systems), including various versions of operating systems provided by Microsoft (such as WINDOWS), Apple (such as Mac OS X), UNIX, and LINUX, and may include operating systems specifically developed for handheld devices (e.g., iOS, Android, Blackberry, and/or Windows Phone), personal computers, servers, and other computing platforms depending on the use of the system 170. The operating system, as well as other instructions (e.g., for telecommunications and/or other functions provided by the device 124), may be stored in the memory unit 174 and executed by the processor 172. For example, if the system 170 is the device 124, the memory unit 174 may include instructions for providing the NIO platform 100 and for performing some or all of the methods described herein.

The network 186 may be a single network or may represent multiple networks, including networks of different types, whether wireless or wireline. For example, the device 124 may be coupled to external devices via a network that includes a cellular link coupled to a data packet network, or may be coupled via a data packet link such as a wide local area network (WLAN) coupled to a data packet network or a Public Switched Telephone Network (PSTN). Accordingly, many different network types and configurations may be used to couple the device 124 with external devices.

Referring to FIG. 1K, one embodiment of a system 180 is illustrated. The system 180 is another possible example of a portion or all of the device 124 of FIGS. 1D-1F, 1H, and 1I, and/or the external source(s)/destinations 132 of FIGS. 1E-1G and 1I. The system 180 may be similar to the system 170 of FIG. 1J, but may contain only the CPU 172 and memory 174. Other components, such as the power supply 182 and I/O 176, may be external. In the present example, the system 180 may have no network capability. In other embodiments, the system 180 may access a network such as the network 186 using a network interface such as the network interface 178.

Referring to FIG. 1L, one embodiment of a system 190 is illustrated. The system 190 is another possible example of a portion or all of the device 124 of FIGS. 1D-1F, 1H, and 1L and/or the external source(s)/destinations 132 of FIGS. 1E-1G and 1I. The system 190 may be similar to the system 170 of FIG. 1J, but may contain only the CPU 172. The memory 174 and other components, such as the power supply 182 and I/O 176, may be external. For example, the system 190 may rely on an external drive. In the present example, the system 190 may have no network capability. In other embodiments, the system 190 may access the memory 174 via a network such as the network 186 using a network interface such as the network interface 178.

Referring to FIG. 2A, a NIO platform 200 illustrates a more detailed embodiment of the NIO platform 100 of FIG. 1A. In the present example, the NIO platform 200 includes two main components: service classes 202 for one or more services that are to provide the configurable processing functionality 106 and core classes 206 for a core that is to provide the support functionality 108 for the services. Each service corresponds to block classes 204 for one or more blocks that contain defined task specific functionality for processing niograms. The core includes a service manager 208 that will manage the services (e.g., starting and stopping a service) and platform configuration information 210 that defines how the NIO platform 200 is to be configured, such as what services are available when the instance is launched.

When the NIO platform 200 is launched, a core and the corresponding services form a single instance of the NIO platform 200. It is understood that multiple concurrent instances of the NIO platform 200 can run on a single device (e.g., the device 124 of FIG. 1D). Each NIO platform instance has its own core and services. The most basic NIO platform instance is a core with no services. The functionality provided by the core would exist, but there would be no services on which the functionality could operate. Because the processing functionality of a NIO platform instance is defined by the executable code present in the blocks and the services are configured as collections of one or more blocks, a single service containing a single block is the minimum configuration required for any processing of a niogram to occur.

It is understood that FIG. 2A illustrates the relationship between the various classes and other components. For example, the block classes are not actually part of the service classes, but the blocks are related to the services. Furthermore, while the service manager is considered to be part of the core for purposes of this example (and so created using the core classes), the core configuration information is not part of the core classes but is used to configure the core and other parts of the NIO platform 200.

With additional reference to FIGS. 2B and 2C, embodiments of two NIO platform instances 222 and 224, respectively, are illustrated as hierarchies that are created when a NIO platform, such as the NIO platform 200 of FIG. 2A, is launched. The NIO platform instance 222 is an instance of a NIO platform #1 and the NIO platform instance 224 is an instance of a NIO platform #2. The NIO platforms #1 and #2 may be different platforms or may be different configurations of the same platform. Multiple NIO platform instances can be launched and executed concurrently, either on a single device or on separate devices, and each instance can be separately closed. The NIO platform instances can be based on the same NIO platform, in which case the instances will have identical functionality when launched. Alternatively, the NIO platform instances can be based on different NIO platform configurations, in which case the instances will have different functionality when launched with the functionality of a particular instance being based on the particular configuration of the underlying NIO platform.

Each NIO platform instance 222 and 224 contains a core 228 and one or more services 230, and each service 230 contains one or more blocks 232. Each NIO platform instance 222 and 224 may have different numbers of services 230 running and those services 230 may use different numbers of blocks 232. The services 230 running within a single NIO platform instance 222 or 224 can be identical in functionality, different in functionality, related (e.g., one service may perform one task in a series of tasks and then another service may perform the next task), and/or unrelated.

This hierarchical structure enables the configurability of the NIO platform 200 to be accessed at different levels, each of which offers a different level of granularity in the configuration process. Each NIO platform instance 222 and 224 can be configured by adding, removing, and/or modifying the services 230 that form the instance. A service 230 can be configured by adding, removing, and/or modifying the blocks 232 that form the service 230, by modifying the arrangement of the blocks 232 to change the data path through the blocks 232, by setting various configuration parameters corresponding to the service, and/or by enabling the service 230 to use functionality provided by the core 228. In some embodiments, a service 230 can also be customized by adding, removing, and/or modifying the instructions (e.g., the source code) contained in the corresponding service class 202. A block 232 can be customized by adding, removing, and/or modifying the instructions (e.g., the source code) contained in the corresponding block class 204. A block 232 can also be configured by setting various configuration parameters corresponding to the block.

It is understood that, once configured using the platform configuration information 210, the NIO platform 200 may be reduced to a minimal footprint. This may, in some embodiments, involve removing or otherwise limiting the configurable and/or customizable functionality, with only defined service classes 202 and/or block classes 204 remaining with respect to the processing functionality 106. Similarly, unused modules and/or core components (discussed later) may also be removed from the support functionality 108. Even if the NIO platform 200 is made to be no longer customizable or configurable by a user, it is understood that updates and other changes may still be made to existing service classes 202 and/or block classes 204 in some embodiments.

Removing and/or otherwise limiting the configurability and/or customizability may be used to ensure that the existing functionality is not changed once defined as desired. It is understood that the support functionality 108 would still remain in the NIO platform 100 to manage the services 230 and/or blocks 232 in a running instance. Accordingly, the NIO platform 200 may be reduced to a more conventional application-style format for distribution, installation, and/or use for a targeted purpose, although services 230 and/or blocks 232 would still run via the core environment provided by the NIO platform 200.

With additional reference to FIG. 3, one embodiment of a service 230 (based on one of the service classes 202 of FIG. 2A as launched in one of the instances 222 of FIG. 2B or 224 of FIG. 2C) is illustrated with multiple blocks 232a, 232b, . . . , and 232M (based on block classes 204), with M being the total number of blocks contained by the service 230. The service 230 may be viewed as the framework that is responsible for assembling the contained group of blocks (e.g., blocks 232a-232M) into a workflow to define the logical path that a niogram within the service 230 will follow. While the blocks 232a-232M may not be literally linked within the service 230, the service 230 may manage the order in which blocks 232 are called for processing and, in so doing, direct a niogram within the service 230 to the appropriate next block. Starting the service 230 enables an instance of the NIO platform 200 to use the blocks' functionality to process niograms. Accordingly, the value of M is greater or equal to one, as a service 230 that has no blocks 232 would provide no functionality. It is understood that the service 230 may include blocks that are not always used, such as blocks that are only executed if a particular conditional branch occurs.

While entirely custom service classes 202 and block classes 204 may be created and used with the NIO platform 200 for custom services 230 and blocks 232, the functionality of some or all services 230 and/or blocks 232 may be predefined, either in whole or in part. For example, a service 230 directed to receiving and forwarding a particular type of message may be defined in the corresponding service class 202 with the exception of configuration parameters for source and destination. Starting the service 230 would automatically start the blocks 232 to be used with the service and provide an instance of the NIO platform 200 with the service's receive and forward functionality. The source and destination can be added via the platform configuration information 210 or in another way, such as through the use of commands issued to the service 230 and/or blocks 232 through an interface.

In a more complex example, a largely pre-defined service 230 may be modifiable by defining the behavior of one or more blocks classes 204 for the blocks 232 within the service 230, either by providing original code for the block class 204 or by selecting a predefined block class 204. For example, the service 230 may process the received message and forward the message to one of various different destinations depending on the message's contents. This conditional functionality may be achieved by writing instructions for inclusion in a new block class 204 for a new block to be used in the service 230, by writing instructions for inclusion in one of the block classes 204 for a block 232 that is already part of the service 230, and/or by configuring an existing block class 204 that already enables such conditional functionality.

A single defined service 230 may be used in multiple platform instances and a single defined block 232 may be used in multiple services. It is understood that modifying a service 230 by customizing and/or reconfiguring the service class 202/service 230 may require a restart of any platform instances currently using that service 230 for the modification to take effect, as the platform instances may otherwise continue running the previous version of the service 230 that was instantiated when launched. Similarly, modifying a block 232 by customizing and/or reconfiguring the block class 204/service 230 may require a restart of any services 230 currently using that block 232 for the modification to take effect, as the services 230 may otherwise continue running the previous version of the block 232 that was instantiated when launched.

Figure 4A:
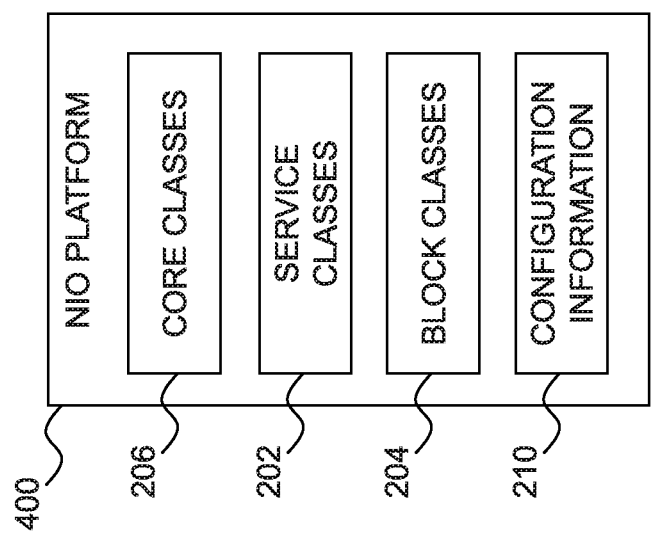
FIG. 4A illustrates another embodiment of the NIO platform of FIG. 2A.

With additional reference to FIGS. 4A and 4B, another embodiment of the NIO platform 200 of FIG. 2A is illustrated as a NIO platform 400 prior to being launched (FIG. 4A) and as a NIO platform instance 402 after being launched (FIG. 4B). FIG. 4A illustrates the NIO platform 400 with core classes 206, service classes 202, block classes 204, and configuration information 210 that are used to create and configure the core 228, services 230a-230N, and blocks 232a-232M of the NIO platform instance 402. It is understood that, although not shown in FIG. 4B, the core classes 206, service classes 202, block classes 204, and configuration information 210 generally continue to exist as part of the NIO platform instance 402.

Referring specifically to FIG. 4B, the NIO platform instance 402 may be viewed as a runtime environment within which the core 228 creates and runs the services 230a, 230b, . . . , and 230N. Each service 230a-230N may have a different number of blocks. For example, service 230a includes blocks 232a, 232b, and 232c. Service 230b includes a single block 232d. Service 230N includes blocks 232e, 232f, . . . , and 232M.

One or more of the services 230a-230N may be stopped or started by the core 228. When stopped, the functionality provided by that service will not be available until the service is started by the core 228. Communication may occur between the core 228 and the services 230a-230N, as well as between the services 230a-230N themselves.

In the present example, the core 228 and each service 230a-230N is a separate process from an operating system/hardware perspective. Accordingly, the NIO platform instance 402 of FIG. 4B would have N+1 processes running, and the operating system may distribute those across multicore devices as with any other processes. It is understood that the configuration of particular services may depend in part on a design decision that takes into account the number of processes that will be created. For example, it may be desirable from a process standpoint to have numerous but smaller services in some embodiments, while it may be desirable to have fewer but larger services in other embodiments. The configurability of the NIO platform 400 enables such decisions to be implemented relatively easily by modifying the functionality of each service 230a-230N.

In other embodiments, the NIO platform instance 402 may be structured to run the core 228 and/or services 230a-230N as threads rather than processes. For example, the core 228 may be a process and the services 230a-230N may run as threads of the core process.

Figure 4C:
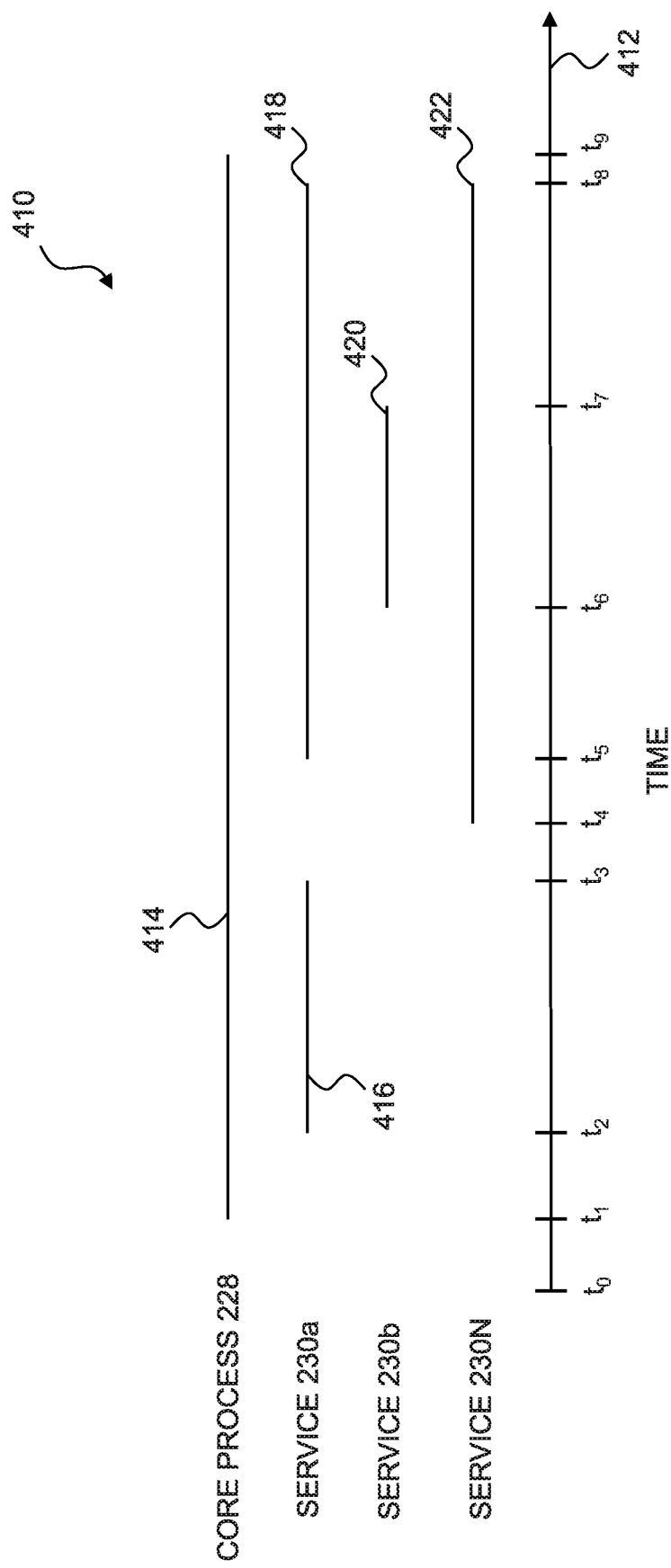
FIG. 4C illustrates one embodiment of a diagram showing the operation of a core process and multiple services of the NIO platform instance of FIG. 4B plotted against time.

Referring to FIG. 4C, one embodiment of a diagram 410 illustrates the core process 228 and the services 230a. 230b, and 230N of FIG. 4B plotted against an axis 412 representing time. More specifically, the diagram 410 illustrates examples of stop and start times for the core process 228 and services 230a, 230b, and 230N relative to one another, with multiple services running simultaneously at some times and with no services running at other times.

At time t0, the NIO platform instance 402 is not running. At time t1, the NIO platform instance 402 is started with the core process 228 as indicated by line 414. The core process 228 generally remains running the entire time the NIO platform instance 402 is running, as the core process 228 is needed for the NIO platform instance 402 to exist. It is understood that, if the core process 228 crashes, the services 230a, 230b, and 230N may continue to run as long as they are separate processes from the core process 228. However, the core process 228 can no longer be used to communicate with the service processes or otherwise control them, and so the NIO platform instance 402 no longer exists when the core process ends even if the service processes continue to run. If the services 230a, 230b, and 230N are threads of the core process 228, then the services 230a. 230b, and 230N will typically end if the core process 228 crashes.

At time t2, the service 230a is started as indicated by line 416. At time t3, the service 230a is stopped, but the core process 228 continues running even though no services are running at this time. At time $t_4$, the service 230N is started as indicated by line 422. At time $t_5$, the service 230a is restarted as indicated by line 418. At time $t_6$, the service 230b is started as indicated by line 420. At time $t_7$, the service 230b is stopped. At time t8, the services 230a and 230N are stopped. At time $t_9$, the core process 228 is stopped, which shuts down the NIO platform instance 402. If the core process 228 is stopped while services are still running, the core process 228 may shut down the running services before stopping.

Referring to FIGS. 5A-5C, embodiments of the service 230 of FIG. 3 are illustrated. Any service 230 defined in the processing functionality 106 of FIG. 2A may be altered by adding, removing, and/or modifying one or more of the blocks 232 that form that service. Each block 232 within the service 230 contains instructions. The instructions within a particular block 232 may be simple or complex. Accordingly, a particular service 230 that is configured to provide a particular function may be implemented in many different ways depending on the blocks 232 used and the instructions contained within each block 232. In this respect, the service 230 may be viewed as an executable program that can be written in many different ways and then executed by the NIO platform instance 402.

Referring specifically to FIG. 5A, one embodiment of the service 230 is formed from a single block 232. This is the minimal requirement for a service 230 having functionality. Referring specifically to FIG. 5B, another embodiment of the service 230 is formed from two blocks 232a and 232b that are linked together to form a "chain" of blocks. In this embodiment, block 232a feeds into block 232b. It is understood that the blocks 232a and 232b may not be literally linked within the service 230, but that the service 230 "links" the blocks from an operational perspective by directing that a niogram that is an output of block 232a becomes an input to block 232b.

Referring specifically to FIG. 5C, yet another embodiment of the service 230 is illustrated with a more complicated block structure. Although the service 230 is made up of a "chain" of blocks 232a-232e, it is understood that the blocks 232a-232e may not be executed in a linear manner. In other words, the blocks 232a-232e may include instructions that vary the execution order within the service 230. For example, a block may contain an instruction that is conditional, with the next block being selected and executed depending on how the condition is met. Furthermore, it is understood that the blocks 232a-232e need not be literally arranged in an order of execution, and that the platform configuration information 210 is used to define the service 230 and, in some embodiments, the various dependencies between the blocks 232a-232e.

The blocks 232a-232e and the arrangement of those blocks may be optimized for use with a particular service 230. For example, the blocks 232a-232e may be optimized for a particular pattern of execution that corresponds to the service's processing needs.

The blocks 232a-232e of FIG. 5C serve to illustrate various possible combinations that may occur within the service 230, although it is understood that other combinations may be used that are not illustrated. In the present embodiment, block 232a is able to call or otherwise return to itself (as indicated by arrow 502). Block 232a feeds into block 232b (as indicated by arrow 504) and/or block 232c (as indicated by arrow 506). For example, block 232a may split a niogram into two niograms. One niogram may be passed to block 232b and the other niogram may be passed to block 232c. In another example, the block 232a may contain instructions for a conditional branch and an evaluation of the niogram may determine whether the niogram is sent to block 232b or block 232c. Alternatively, the block 232a may send the niogram to both block 232b and block 232c. One or both of the blocks 232b and 232c may then filter the niogram after receiving it or another block (not shown) may be added before one or both of the blocks 232b or 232c to filter the niogram before it reaches the block.

One or both blocks 232b and 232c may feed into block 232d (as indicated by arrows 508 and 510, respectively), which illustrates how multiple blocks can feed into a single block. For example, a niogram from each of blocks 232b and 232c may be passed to block 232d, where the niograms are combined or otherwise processed. In another example, a niogram may be received from only one of blocks 232b and 232c, depending on factors such as the processing within those blocks and whether a conditional statement executed in block 232a passed a niogram to only one of the blocks 232b and 232c. Block 232d feeds into block 232e (as indicated by arrow 512).

It is understood that a block may be called without being a link in the overall chain. For example, block 232a may use block 232b to obtain a value (e.g., perform a calculation and return a value) and then continue execution with block 232c after the value is returned. In this case, arrow 508 would not exist. The manner in which the block 232b returns the value depends on the particular implementation of the blocks. As will be described below, the blocks may be implemented so that the output of a block is routed to another block by the service, may be implemented to support direct calls between blocks, or may be implemented with one or more commands used to access a block. Regardless of the implementation, from this perspective, the blocks 232a-232e may be viewed as modular components of a program that can be called within the program based on the desired functionality provided by a particular block.

It is understood that, although complex arrangements of blocks 232 may be used to create the service 230, it may be desirable in some embodiments to arrange the blocks in a single chain to create an optimized execution path. Furthermore, the service 230 of FIG. 5C may be created as a single block in some embodiments.

While input to the service 230 is often fed first to the initial block in a chain (e.g., block 232a), input may be handled by any block within the service 230 based on how the service 230 and/or the blocks 232a-232e are configured. For example, input may enter block 232b, and be passed to block 232a and/or 232d. In turn, block 232b may remain as part of the output path for block 232a. This allows a great deal of flexibility within a particular service 230.

It is understood that when the present disclosure refers to a service 230 receiving input, the input is actually being received by a block 232 within the service 230. Similarly, output is produced by a block 232 within the service 230. However, as the service 230 includes the blocks 232 used within the service 230, the service 230 may be described generally as receiving input and producing output.

Accordingly, a single service 230 may be configured in many different ways. While optimizations may indicate a particular desirable service configuration for a particular use, a service 230 can be fine-tuned based on factors such as the desired functionality of the service and the characteristics of the device 124 on which the NIO platform 200 is to run (e.g., memory limitations such as cache size and throughput, processor speed, number of processor cores, and/or data rates of input data streams). This configurability enables the NIO platform 200 to be optimized for many different environments if needed by changing the structure of the services 230 and blocks 232 when possible, rather than the core 228.

Figure 5E:
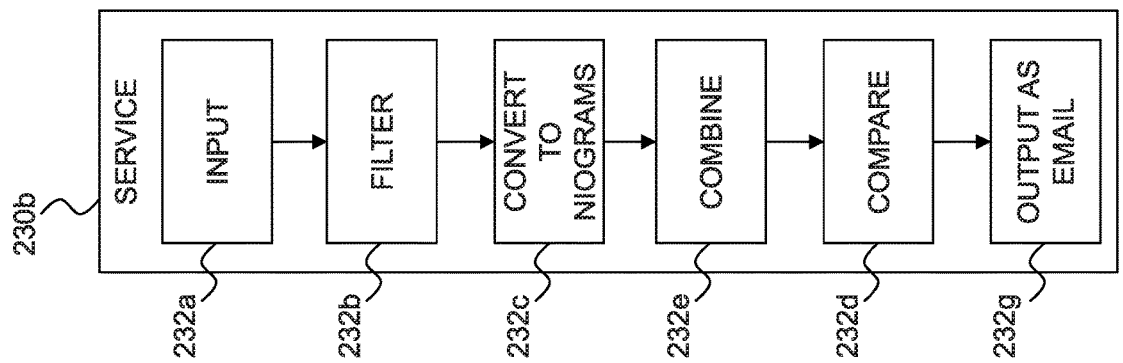
FIGS. 5D and 5E illustrate embodiments of how blocks within the service of FIG. 3 are decoupled from the service and other blocks within the service.
Figure 5D:
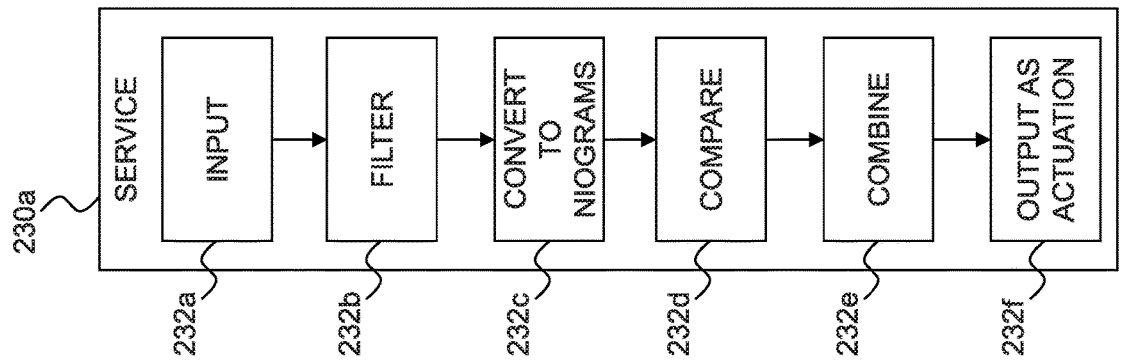

Referring to FIGS. 5D and 5E, embodiments of services 230a and 230b, respectively, are illustrated. In the present embodiments, each block 232 is decoupled from both the service 230 by which it is being used and from the other blocks 232 that are used by the service 230. Each block 232 is a self-contained entity that asynchronously receives input, processes that input in a manner defined by the block's internal code, and produces an output. The block's asynchronicity is possible because the block 232 has no awareness that it is part of a service 230 or that it is associated with other blocks as part of a functional chain. The block 232 simply handles data as it arrives and creates an output.

This decoupling of the block's functionality from other blocks 232 in the service 230 enables each block 232 to be reused without having to alter the code within the block 232 itself. For example, if a block 232 was configured to call a specific destination block after finishing its own processing, this call would likely have to be modified for each service 230 in which the block 232 was used and also if the block 232 was moved to a different location of the functional path within the same service 230. Instead, because the block 232 is decoupled and the service 230 is configured to manage the block's output, the block 232 can remain unchanged for different services or during moves within the same service even though its output may be routed differently.

By making the service 230 responsible for the data flow path between blocks 232, the actual block structure is simplified and need not be concerned with anything except its own processing and, at the end, notifying the service 230 that output is available. Decoupling the block's functionality from the service 230 and other blocks 232 in this manner also enables the block to be swapped out for another block with different functionality, which makes service modification easier.

This decoupling is illustrated in FIGS. 5D and 5E, which represent embodiments of services 230a and 230b, respectively. Each service 230a and 230b has the same number of blocks 232. However, the order of the blocks is different and the final output is different. For example, the service 230a of FIG. 5D has the following functional chain: block 232a (input), block 232b (filter), block 232c (convert to niograms), block 232d (compare niograms), block 232e (combine niograms), and block 232f (output as actuation). In contrast, the service 230b of FIG. 5E has the following functional chain: block 232a (input), block 232b (filter), block 232c (convert to niograms), block 232e (combine niograms), block 232d (compare niograms), and block 232g (output as email).

These functional chains are illustrated below in Table 1 (for service 230a) and Table 2 (for service 230b) in the form of source and destination information. For example, each service 230a and 230b may manage a list, table, or other data storage structure with such information. It is understood that the actual order of the blocks in the data storage structure may vary as long as the services 230a and 230b can tell which destination block(s) are to be serviced with output from a particular source block.

TABLE 1

| Source Block | Destination Block |
|---|---|
| Block 232a | Block 232b |
| Block 232b | Block 232c |
| Block 232c | Block 232d |

TABLE 1-continued

| Source Block | Destination Block |
| --- | --- |
| Block 232d | Block 232e |
| Block 232e | Block 232f |

TABLE 2

| Source Block | Destination Block |
| --- | --- |
| Block 232a | Block 232b |
| Block 232b | Block 232c |
| Block 232c | Block 232e |
| Block 232e | Block 232d |
| Block 232d | Block 232g |

As can be seen, the order of execution of blocks 232d and 232e in the service 230a has been altered in the service 230b. Because the blocks are decoupled, the alteration can be accomplished simply by modifying the order of blocks (e.g., the source/destination pairs) in the service 230b and requires no changes to the blocks themselves or to the blocks preceding or succeeding the blocks 232d and 232e.

Another difference between the two services 230a and 230b is that the output block of FIG. 5E sends an email rather than the actuation of FIG. 5D. One way to perform this change in functionality is to swap out the block 232f of FIG. 5D for the block 232g of FIG. 5E. This may be done when the blocks 232f and 232g contain only the specific functionality required for their purpose. Another way to perform this change in functionality would be to modify the block 232f to give it the desired functionality of the block 232g or to create a new block with the desired functionality. Yet another way would be to set configuration parameters for the block 232f to select the desired functionality, assuming that the block 232f already contains the functionality for producing both actuations and email as outputs. Regardless of the way in which the functionality is implemented for the blocks 232f and 232g, the decoupled aspect of the blocks means that the preceding block 232e (FIG. 5D) or 232d (FIG. 5E) is unaware of the changes and is not affected.

With additional reference to FIGS. 5F and 5G, embodiments of a service 230 (FIG. 5F) and multiple block threads (FIG. 5G) are illustrated. In the present example, the service 230 includes five blocks 232a-232e, which may also be referred to as Blocks 1-5, respectively. Due to the asynchronous nature of the blocks 232a-232e, some or all of the blocks 232a-232e in the service 230 can process niograms concurrently. In other words, different niograms may be concurrently processed by the different blocks 232a-232e of the single service 230. Furthermore, a single block 232a-232e may process multiple niograms concurrently due to threading.

The ability to concurrently process multiple niograms may increase the throughput of the service 230. The ability to replicate one or more of the blocks 232a-232e by executing the block's functionality in multiple concurrent threads enables the service 230 to dynamically scale its processing capacity as needed. For example, this allows the service 230 to increase its processing capacity to handle input surges and then reduce its processing capacity once the surge subsides.

Each block 232a-232e takes a period of time (e.g., a second or a fraction of a second) to process a single signal or niogram, although it is understood that the actual rate of a particular block may vary depending on such factors as the complexity of the block, the content of the niograms, the processor speed of the device on which the service 230 is running, the number of processor cores, and/or the size of the cache. For purposes of example, the block 232a is able to process a signal and produce an output of a niogram in 0.5 seconds, the block 232b is able to process a niogram in 1.5 seconds, the block 232c is able to process a niogram in 1.0 seconds, the block 232d is able to process a niogram in 0.5 seconds, and the block 232e is able to process a niogram in 1.0 seconds.

If only one thread can exist for each block, the block that takes the longest time to process a signal or niogram would determine the throughput of the service 230, assuming that the input rate to the service 230 is higher than the slowest block's processing rate. In this case, the block 232b would be the bottleneck and would limit the service's throughput to one niogram every 1.5 seconds if only one thread exists for each block 232a-232e. The blocks 232c and 232e would be bottlenecks if not for the block 232b. The blocks 232a and 232d would not be bottlenecks as they can process more quickly than the other blocks. With only one thread for each block 232a-232e, the service 230 would be processing five niograms every 1.5 seconds (e.g., one niogram in each block 232a-232e) with an output of one niogram every 1.5 seconds, but this would not be efficient as four of the five blocks would spend time waiting on block 232b.

One way to address this problem would be to construct the blocks 232a-232e so that all of the blocks in the service 230 process niograms at approximately the same rate. However, this is a relatively inefficient way to handle the problem as any changes might affect the processing rate of one or more blocks and each new service would have to be balanced in this manner. This approach would complicate the design and implementation of services within the NIO platform 200.

Accordingly, as shown in FIG. 5G, the NIO platform 200 is designed so that the service 230 can make use of concurrent threads for a single block, which allows the service 230 to dynamically scale its processing capacity as needed. Continuing the previous example. Block 1 is executing at a speed of 0.5 seconds per niogram, so it is processing two signals per second and outputting two niograms per second. It is assumed that Block 1 outputs its niograms at a steady rate of one niogram every 0.5 seconds. This and other simplifications, such as a block execution speed measured in seconds, are used in the present example for purposes of illustration and it is understood that inputs may be irregular, processing may occur much more rapidly, and threading within an actual executing service may be far more complicated.

Block 2 has three threads 1, 2, and 3 running. It is noted that each thread of Block 2 is only processing one niogram and a total of three concurrent threads will be needed to process the three niograms output by Block 1 during the 1.5 second processing time required by Block 2. Block 3 has two threads 1 and 2 running. Block 4 has only thread 1 running. Block 5 has two threads 1 and 2 running.

If the input lessens, the number of threads may lessen. If the input rate drops to one signal or less every 1.5 seconds, only a single thread of each block would exist. If the input rate increases, the number of threads may increase, and Blocks 1 and 5 may also have additional threads. Accordingly, the NIO platform 200 is able to dynamically scale its processing capacity to handle scenarios such as varying input rates.

In cases where race conditions or similar thread collision issues may present a problem between concurrently executing threads, resource locking and unlocking may be used. For example, if the Block 5 threads 1 and 2 are to write to a file as output, it may be undesirable to allow them both to write to the file concurrently. Accordingly, one thread may acquire a lock, write to the file, and then release the lock. The other thread cannot write to the file until the lock is released. In other cases, race conditions or other thread collision issues may not be a concern.

It is noted that while intra-service interactions are decoupled in the present embodiment, certain blocks 232 may be aware of sources and/or destinations outside of the service 230. For example, the block 232a may be configured to poll or otherwise pull data from a data source and would need to be aware of the source (e.g., the source's network address) in order to accomplish its purpose. Likewise, the blocks 232e and 232f may be configured with an awareness of the destination.

It is understood that some embodiments may use blocks 232 that are implemented in such a way that the blocks are responsible for calling the next block. In other words, the blocks 232 may be coupled, with a block being aware of the next block to which it should pass its output. For example, a block 232 may contain instructions identifying another block to which output is to be sent. The block 232 may then execute those instructions when output is available and directly call the next block without needing the service 230 to handle the output. The blocks 232 may still execute in an asynchronous manner in such embodiments. While this implementation is within the scope of the present application, it is not used in this embodiment due to the additional complexity and lack of reusability that would result from such an implementation.

Referring to FIG. 6A, a method 600 illustrates one embodiment of a process that may be executed by the NIO platform instance 101 of FIG. 1B or the NIO platform instance 402 of FIG. 4B. In step 602, a platform instance is launched. In step 604, one or more services and/or blocks may be configured. For example, a block 232 may be configured with customized code and/or configuration parameters, and a service 230 may be configured by assigning various blocks to it and defining a data flow among those blocks, and/or by setting various configuration parameters. In step 606, one or more of the configured service(s) 230 and block(s) 232 are started. In step 608, input data is processed as defined by the service(s) 230 and block(s) 232 in the instance. In other embodiments, one or more services and/or blocks may be configured before the platform instance is launched.

Referring to FIG. 6B, a method 610 illustrates a more detailed embodiment of step 604 of FIG. 6A. In step 612, one or more blocks 232 are selected or defined for use in the service 230. For example, predefined blocks 232 may be selected for use in their current form or may be selected and modified. Custom blocks 232 may also be created by inserting instructions into a blank block and saving the block as a new block.

In step 614, the service 230 is defined by creating a new service and configuring it with information identifying the blocks 232 to be used and the arrangement (e.g., the data flow) of those blocks 232. Configuration parameters may also be set for the service 230. In other embodiments, an existing service 230 may be configured by setting configuration parameters associated with the service 230 and/or by adding, removing, and/or modifying blocks, as well as by modifying the data flow defined for the blocks 232. In step 616, the service 230 is saved.

It is understood that if an existing service 230 is to be used without modification, the method 610 would simply involve selecting that service 230 for use, as the corresponding blocks 232 would already be associated with the service 230. In some embodiments, the service 230 may be created before the blocks 232 are selected or defined, and the service may then be updated with blocks and other information.

Figure 7:
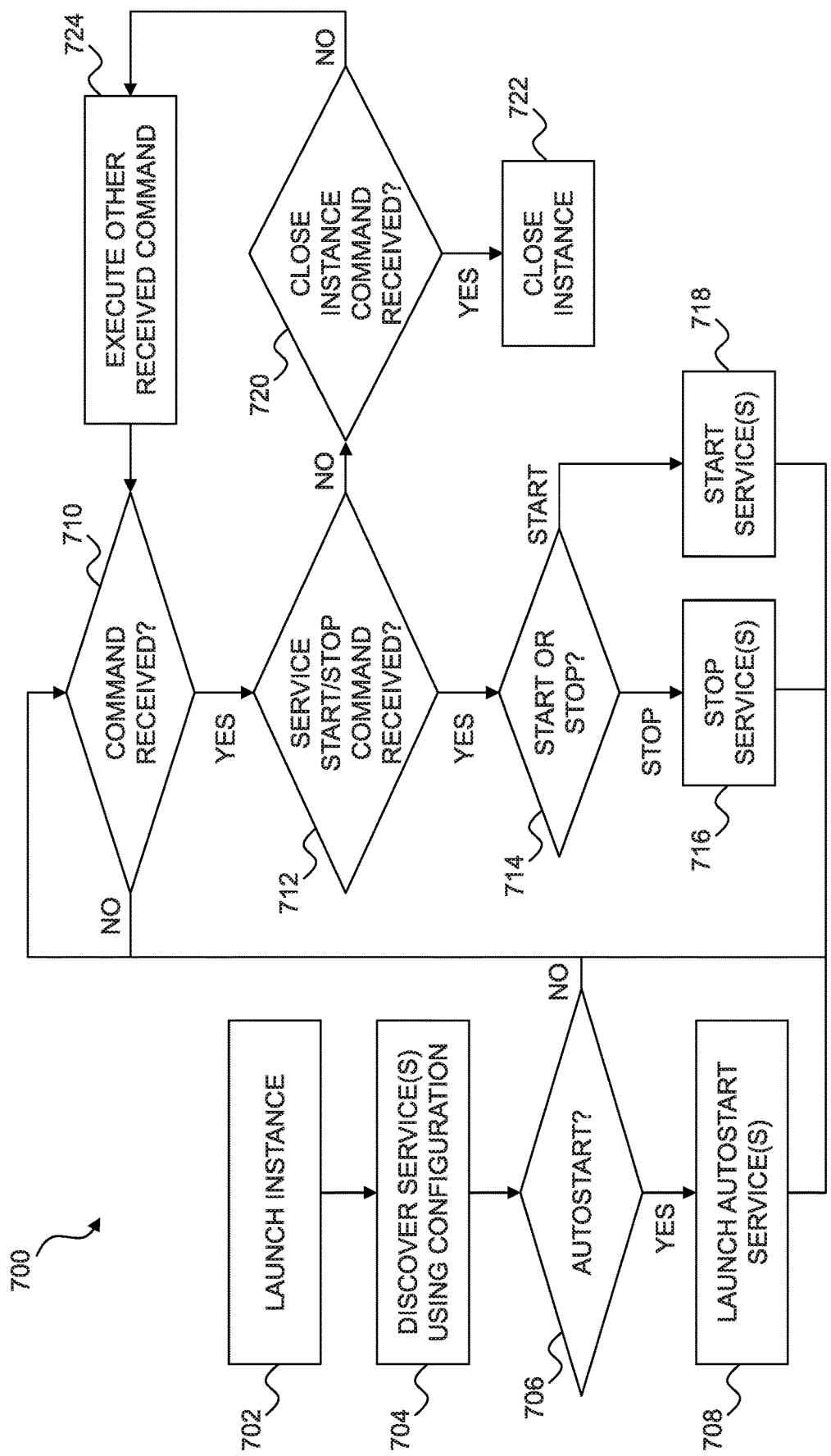

Referring to FIG. 7, a method 700 illustrates a more detailed embodiment of steps 602 and 606 of FIG. 6A. In step 702, a platform instance is launched, which includes launching a core process. In step 704, the core process discovers the platform instance's services 230 using the available configuration information. Among other items, the configuration information identifies whether any services 230 are configured to auto-start as represented by step 706.

If one or more services 230 are configured to auto-start, the method 700 moves to step 708. In step 708, the service or services are started without needing additional start commands and the method 700 then moves to step 710. If no services 230 are configured to auto-start, the method 700 moves from step 706 to step 710.

In step 710, a determination is made as to whether any commands have been received. If no command has been received, step 710 may repeat until a command is received. If a command has been received, the method 700 moves to step 712.

In step 712, a determination is made as to whether any service start/stop commands have been received. In other words, whether a command has been received to start a service 230 or to stop a currently running service 230. If the determination of step 712 indicates that a start or stop command has been received, the method 700 continues to step 714. In step 714, a determination is made as to whether the command was a start command or a stop command. If the determination of step 714 indicates that a stop command was received, the method 700 continues to step 716, where the service or services identified in the stop command are stopped. If the determination of step 714 indicates that a start command was received, the method 700 continues to step 718, where the service or services identified in the start command are started. Following the execution of either step 716 or step 718, the method 700 returns to step 710.

If the determination of step 712 indicates that a start or stop command has not been received, the method 700 continues to step 720. In step 720, a determination is made as to whether a command has been received to close the platform instance. If the determination of step 720 indicates that a close command was received, the method 700 continues to step 722, where the platform instance is closed. This may entail closing any running services 230 prior to closing the platform instance. If the determination of step 720 indicates that no close command was received, the method 700 continues to step 724.

In step 724, the command (which is not a service stop/start command or a close instance command) is executed. The method 700 then returns to step 710. The method 700 may repeat from step 710 multiple times, starting and stopping services and/or executing other commands if requested until the platform instance is closed. It is understood that the order of some steps in FIG. 7 may vary, such as the order of steps 712, 720, and 724. Furthermore, some steps, such as steps for handling errors (e.g., requests for invalid commands) are not shown.

Referring to FIG. 8, a method 800 illustrates a more detailed embodiment of step 608 of FIG. 6A. In step 802, one or more input signal streams are received as defined by the NIO platform instance's configuration. For example, the NIO platform instance 402 may be configured to pull and/or receive data from one or more streaming sources. These signal streams may contain any type of analog and/or digital signal and may contain data. In step 804, the signals are extracted from the signal stream in real time as defined by the NIO platform instances's configuration. This step may include filtering to separate noise from relevant signal information. In step 806, the extracted signals are converted into niograms for internal processing as defined by the NIO platform instance's configuration.

In step 808, the internal processing is performed, which may include real time context enrichment. The particular processing and context enrichment (if applicable) that occurs depends on the configuration of the NIO platform instance 402. In step 810, output is produced by the NIO platform instance 402 as defined by the platform instance's configuration. The output may be in the form of a niogram and/or any type of signal, including data of any format type and/or actuation signals.

Figure 9A:
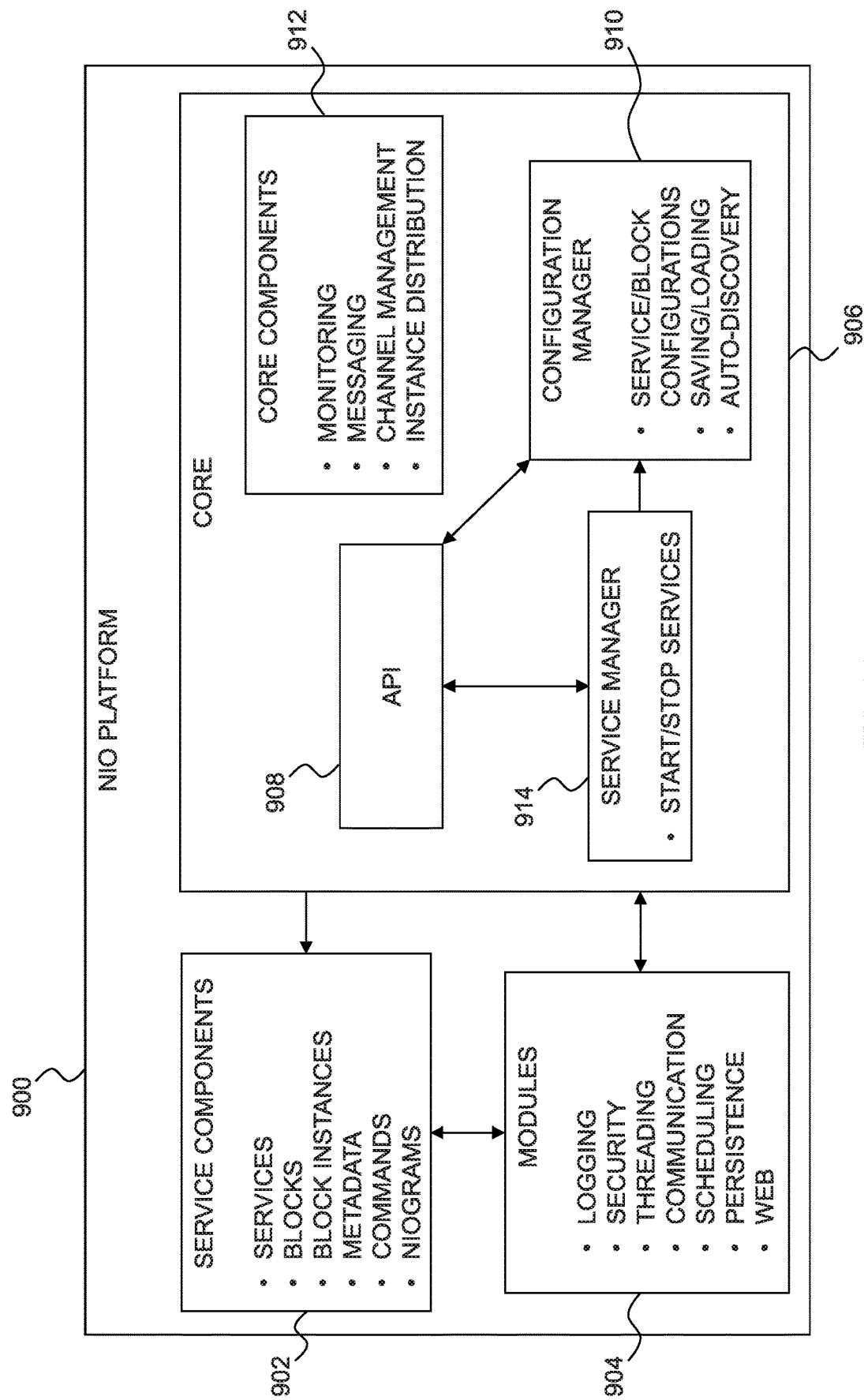
FIGS. 9A and 9B illustrate another embodiment of the NIO platform of FIG. 2A from a platform perspective and a stack perspective, respectively.
Figure 9B:
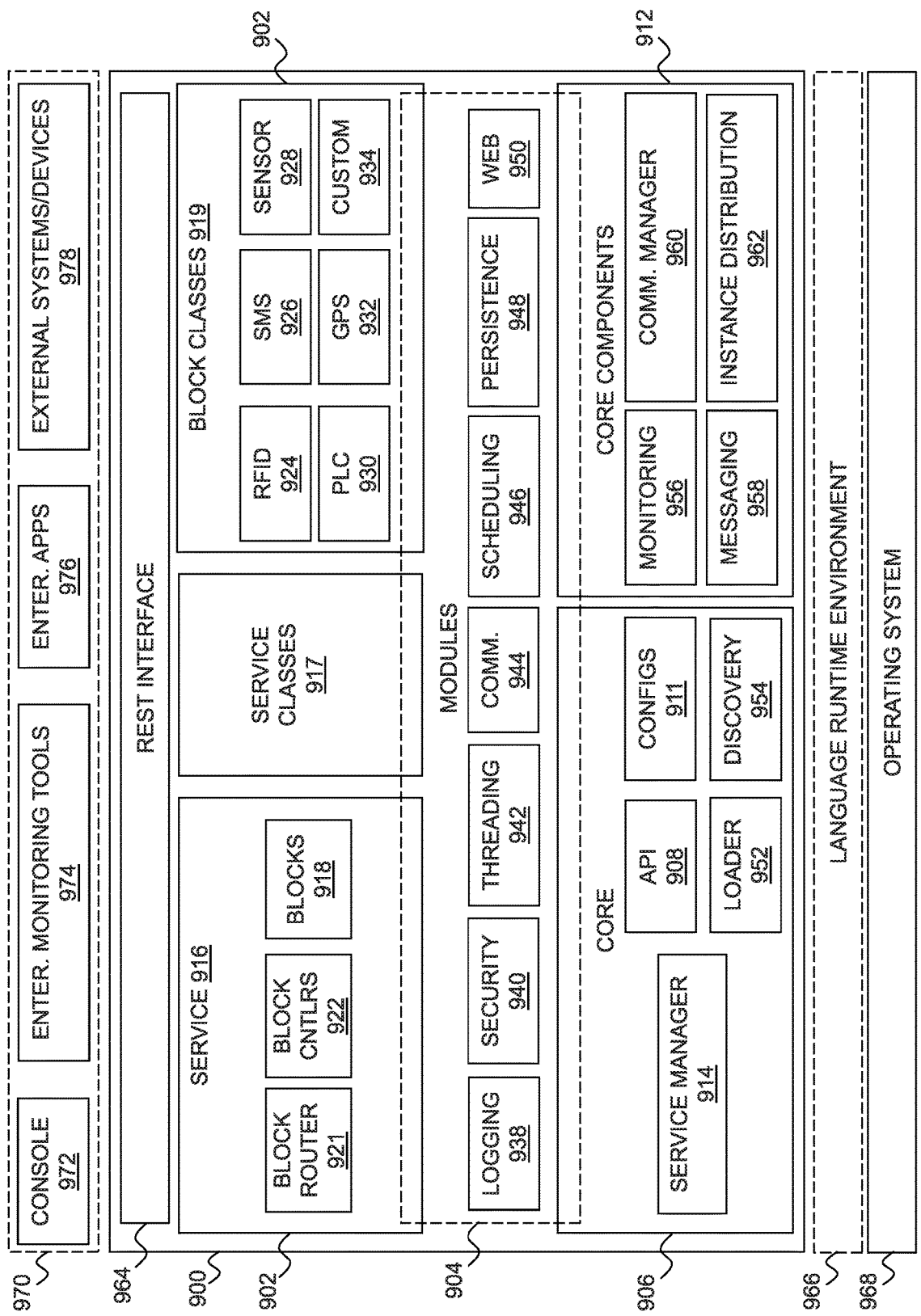

Referring to FIGS. 9A and 9B, a NIO platform 900 illustrates a more detailed embodiment of the NIO platform 100 of FIG. 1A, the NIO platform 200 of FIG. 2A, or the NIO platform 400 of FIG. 4A from a platform perspective (FIG. 9A) and a stack perspective (FIG. 9B). For purposes of example, the NIO platform 900 is written in the programming language Python, but it is understood that any suitable programming language can be used, including but not limited to languages such as C++. The NIO platform 900 is built on a core 906. When launched, a core process creates a core server (generally referred to herein as the core), which forms the underlying structure of the NIO platform 900.

Service components 902 include services 916 and blocks 918 from a functional perspective, even though the services 902 and blocks 918 are illustrated separately in the stack of FIG. 9B. As previously described, the service components 902 are responsible for user defined functionality by enabling block and service functionality to be defined and changed. Much of the functionality in a service component 902 can be user specific, which allows for a high level of customization.

In the present example, the service components 902 are provided as service classes 917 that define how services 916 are created and executed. The execution of services 916 includes routing signals, executing commands, and defining class structures. Some or all of the service classes 917 that form a service component 902 can be extended to define new functionality. This provides a large amount of flexibility in a neutral manner, as a user can define whatever functionality is desired through the service components 902 and that functionality will be executed by the NIO platform 900.

Generally, the service components 902 in one platform instance have no dependency or awareness of another platform instance's service components, which allows for each particular platform instance to be configured without having to take into account how the configuration would affect other platform instances. Furthermore, changing functionality in a service component 902 has no effect on the core 906. This ensures that the core 906 does not have to be modified to be compatible with the service components 902.

In the present example, from a functional perspective, the service components 902 include blocks 918, block classes 917, block instances (also referred to simply as "blocks"), block groups, commands, services 916, and niograms.

In the NIO platform 900, blocks classes 919 may include classes for both custom blocks 934 and blocks having predefined functionality such as RFID block(s) 924, short message service (SMS) block(s) 926, sensor block(s) 928, programmable logic controller (PLC) block(s) 930, and global positioning satellite (GPS) block(s) 932. Although not shown, it is understood that many other blocks 918 may be defined for use with systems using Electronic Product Codes (EPCs) (a trademark of EPCglobal Inc, of Lawrenceville, N.J.), Low Level Reader Protocol (LLRP) information, email (e.g., simple mail transfer protocol (SMTP)), hypertext transfer protocol (HTTP) documents, and/or any other protocols.

Blocks 919 are classes that specify the metadata template and computational functionality of block instances. In the present example, blocks 918 are built from block classes 919 that extend a BaseBlock class and can specify custom behavior by overriding any of the following five basic methods provided by the BaseBlock class: BaseBlock.initialize, BaseBlock.configure, BaseBlock.start, BaseBlock.stop, and BaseBlock.processSignals. These methods are used by the service 916 that corresponds to the blocks 918.

The BaseBlock.initialize method is called to instantiate the block 918 using the corresponding block class 919. The BaseBlock.configure method is called to configure the block 918 after initialization using a saved block configuration. The BaseBlock.start method is called to start the block 918 after instantiation and configuration. The BaseBlock.stop method is called to stop the block 918 (e.g., when the containing service 916 has been stopped). The BaseBlock.processSignals contains the main processing functionality provided by the block 918. The BaseBlock.processSignals method processes a (possibly empty) list of incoming signals and notifies the service 916 when done (e.g., via a notifySignals method, which is discussed below).

A block instance is created when a block 918 is instantiated from a block class 919. A block instance may be viewed as the fundamental unit of computation in the NIO platform 900 and may be customized and configured as prescribed by the block class 919 being instantiated. A block instance only exists inside a service 916. Accordingly, when a service 916 is started or stopped, the blocks 918 inside that service 916 are also started or stopped. In the present example of the NIO platform 900, there is no concept of a block 918 running outside a service 916.

Block configurations, which are used to configure blocks 918, can be reused in different services 916 and may be viewed as saved configurations of blocks 918. When the configuration of a block 918 is changed, it will be changed for all blocks 918 in all services 916 that contain it. However, if a service 916 is running, the configuration of the running block instance may only be updated after the service 916 is restarted.

In other embodiments, a block instance may be updated without restarting the service 916. For example, if the block instance is not currently in use by the service 916, the block instance may be stopped, reconfigured with the new block configuration, and restarted. Alternatively, if not in use, the block instance may be destroyed and a new block instance may be instantiated with the new block configuration. In such embodiments, the service 916 may continue running or may be paused, rather than stopped and restarted.

Outside agents (e.g., other services and/or external APIs) may modify the behavior of specific blocks 918 via a command API (discussed below). Within the command API, block instances may be referenced by a service level block alias and/or a block group level. For this reason, globally unique block identifiers are not necessary in the present example, although they may be used in some embodiments.

Block instances can directly receive and send signals without going through the service 916. In this respect, a block 918 can serve as an interface through which signals can enter the NIO platform 900 and be sent from the NIO platform 900.

With additional reference to FIG. 9C, one embodiment of a hierarchy 990 is illustrated with a single service 916, blocks 918, and block groups 992 and 994. Block groups provide re-usable assemblies of block configurations that can be dropped into a service 916 like other blocks. The configuration of a block group resembles a service 916 in that there is a list of blocks and block mappings to define the flow of niograms between the blocks 918. Whenever one of these inner blocks produces niograms, the block group's logic handles the routing of those niograms to the next blocks in the chain, similar to how a service 916 would handle such routing. For example, the block group may include one or more controllers (e.g., one or more blocks or other control mechanisms) containing the logic to handle routing within the block group to control the data flow within the block group. In such embodiments, the service 916 may treat the block group's control block as simply another block within the service 916 and may communicate with the control block just as with other non-grouped blocks.

In the present embodiment, the block groups 992 and 994 specifically define entry and exit points for niograms. In contrast, niograms may enter and leave the service 916 through any properly configured block 918. In other embodiments, the block groups 992 and 994 may not specifically define such entry and exit points.

Block groups can be nested in some embodiments, with a block group forming part of another block group. This is shown in FIG. 9C with block group 994 nested inside of block group 992. A nested block group may only communicate with the service 916 through the higher level block group. For example, block group 994 may only communicate with the service 916 through block group 992, rather than directly. In other embodiments, the service 916 may have direct access to nested block groups.

Since a block group is to be used inside a service 916, the service 916 may need to access commands (discussed later) of the inner blocks 918. In the present example of the NIO platform 900, this may be accomplished by defining command mappings inside the block group's configuration. After these mappings are defined, the block group knows to pass the command down to one of the inner blocks when a certain command is called on the block group. It is understood that not every inner block command may need to be exposed to the service 916 in the block group's command mappings. Accordingly, access may be provided based on such factors as the particular functionality of the block group and how that functionality is used by a service 916.

While blocks 918 have specific entry and exit points for niograms, block groups may have more than one entry and/or exit point. More specifically, a block 918 only has one possible entry point for use by previous blocks 918 in a service chain. In contrast, a block group has many blocks 918 that could be considered the starting point for niogram processing. As a result, one of the configuration options of the block group is defining one or more starting points for niogram processing. Then, when a service 916 passes niograms to the block group, those niograms will be forwarded to each block 918 in the list of starting points. Similarly, the block group can be configured to define a list of end points. When blocks 918 specified in this list produce niograms, the block group's logic handles the process of notifying the parent service 916 and/or the parent block group of those niograms.

For purposes of example, one embodiment of a block group may include various configuration options such as blocks, blockMappings, commandMappings, startPoints, and endPoints. An object "blocks" provides a mapping of the block names of all blocks 918 within a block group to the unique block alias of each block 918. An object "blockMappings" provides a mapping of the block aliases to a list of the next block aliases that fall in the chain of the block group (i.e., which block 918 feeds into which block). An object "commandMappings" provides a mapping of commands to inner-block commands.

An array "startPoints" is an array of strings that defines the block aliases that should be used as the starting points of the block group. When niograms are delivered from the service 916 to the block group, the blocks 918 listed in the startPoints array will receive the niograms for processing. An array endPoints is an array of strings that defines the block aliases that should be used as the ending points of the block group. When blocks 918 listed in the endPoints array produce niograms, a notification will propagate up outside of the block group.

With additional reference to FIG. 9D, as described previously, services 916 are the main organizational component of the NIO platform's configurable processing functionality. Each service 916 maintains a block router 921, a block controller 922 for each block 918a-918M, its own configuration parameters, a list of block instances for that service, and an associative list of block aliases. In the present embodiment where the service 916 is a process, the service process may handle all communications between the service 916 and the service manager 914. In other embodiments, the block router 921 or another component within the service 916 may handle such communications.

The block controllers 922a-922M serve as intermediaries between the block router 921 and their respective blocks 918a-918M. In performing this intermediary function, the block controllers 922a-922M mimic both the block router 921 and the blocks 918a-918M. For example, the block router 921 may instantiate the block controller 922a, which in turn instantiates the block instance 918a. In other embodiments, the block router 921 may instantiate the block controller 922a and the block instance 918a. After instantiation, the block router 921 communicates with the block controller 922a as though the block controller 922a is the block 918a. Similarly, the block 918a communicates with the block controller 922 as though the block controller 922 is the block router 921. Accordingly, removal of the block controllers 922a-922M would not prevent communications between the block router 921 and the blocks 918a-918M, but would remove the functionality provided by the block controllers 922a-922M from the service 916 unless that functionality was included elsewhere in the service (e.g., in the block router 921 and/or the blocks 918a-918M).

The block controllers 922a-922M may be configured to perform error handling and/or other functions for their respective blocks 918a-918c. Generally, only functions that are likely needed by many or all blocks may be provided by the block controllers 922a-922M. This enables a generic block controller to be used for a block 918 regardless of the functionality of that particular block. Accordingly, each block controller 922a-922M is identical in the present example. In other embodiments, block controllers having different configurations may be used for different blocks based on the need of a particular block and/or other criteria.

The block controllers 922a-922M may be configured to make certain decisions about whether to pass information to the block router 921. For example, when the block 918a throws an error, the error is caught by the block controller 922a. The block controller 922a may then decide how to handle the error, including passing the error up to the block router 921, ignoring the error, and/or taking other action. For example, if the error indicates that the block instance 918a has stopped working, the block controller 922a may proactively notify the block router 921 or may wait to notify the block router 921 until the block router 921 attempts to use the block instance. Removal of the block controller 922a would remove this error handling functionality so that when the block 918a throws the error, the block router 921 would catch it.

The block router 921 handles data flow among the blocks 918a-918M by defining the flow of niograms between blocks 918a-918M within the service 916. More specifically, communication between block instances within the service 916 is managed by the block router 921 via a Blockrouter.notifySignals( ) method and a processSignals( ) method. The Blockrouter.notifySignals( ) call is issued by a block 918 that has output ready. The Blockrouter.notifySignals( ) method identifies the source block and contains the niogram(s) forming the output. For example, the Blockrouter.notifySignals( ) may be implemented as Blockrouter.notifySignals(source block identifier, niogram(s)).

In the current embodiment, this call is made whenever a block 918 within the service 916 has output and the block need not be aware of the service at all. In other words, the block 918 receives input, processes, the input, calls Blockrouter.notifySignals( ), and is done without even knowing that it is part of a service. In other embodiments, the block 918 may know the service 916 of which it is a part, which enables the block 918 to notify the signal to the particular service 916. Although the output itself is passed as a parameter in the method call in the present embodiment, it is understood that other processes may be used to transfer the output. For example, a pointer to the output may be passed rather than the output itself.

When Blockrouter.notifySignals( ) is invoked, the block router 921 looks up the source block 918 in the routing table to determine the destination block(s) 918 to which the output should be directed. The block router 921 then calls processSignals( ) on each of the next blocks in succession. The processSignals( ) method identifies the destination block and contains the niogram(s) to be processed (e.g., the niograms that were the output of the source block). For example, the processSignals( ) method may be implemented as processSignals(destination block identifier, niogram(s)). Although the niogram(s) themselves are passed as a parameter in the method call in the present embodiment, it is understood that other processes may be used to transfer the niogram(s). For example, a pointer to the niogram(s) may be passed rather than the niogram(s) themselves. The block router 921 may, with each call for processSignals( ), launch the called block instance in a new thread of the service process.

In the present example, the blocks 918 operate asynchronously (i.e., each block 918 executes independently of other blocks). When a block 918 publishes a niogram to another block 918, the receiving block executes immediately. This means that there is no buffering of niograms between blocks 918 except as needed (e.g., buffering may occur if a thread pool is used and there is no currently available thread for the receiving block) and data passes through the service 916 as quickly as the blocks 918 can process the data. The processing speed for a given block 918 may depend on the complexity of the block's instructions, as well as on factors outside of a block's control, such as the speed of the device's processor and the amount of processor time allocated to the block's thread.

Services 916 are started and stopped by commands issued through a service API. When a service 916 receives the start command, it "starts" all blocks 918 contained by the service 916. Similarly, when a service 916 receives the stop command, it stops all blocks 918 contained by the service 916. It is noted that the blocks 918 may not actually be "started," but simply notified that the service 916 encapsulating them has been started. If desired, the blocks 918 can then use the notification hook to execute some functionality (e.g., a block 918 that polls an external API and needs to know when to start polling could use the notification as the polling trigger).

In some embodiments, stopping a service 916 may result in the loss of any information (e.g., the local state) in any corresponding block instances. For example, in the current example that uses Python objects for block instances, block objects can be wiped out by calling the Blockinstance.destroy( ) method. In other embodiments, it may be desirable to maintain the local state after a service 916 is stopped. For example, instead of wiping out the local state of instantiated blocks when a service 916 is stopped, the service 916 can instead be paused to stop the service's execution temporarily without losing potentially valuable data. This may be accomplished by issuing the stop command to all the blocks 918 in the service 916 without doing the normally associated cleanup (e.g., without calling Blockinstance.destroy( )) and/or in other ways.

Commands are used to interact with blocks 918 and must be reachable from outside the blocks 918. Accordingly, how a block 918 defines and exposes a command needs to be known. For example, a block 918 may be used to provide SMS functionality. To accomplish this, the block 918 may be configured to expose a command "sendSMS." For the block 918 to function within the NIO platform 900, the method for actually sending an SMS would be written in the block 918 in executable instructions, and then the method would have to be declared as a command to make it reachable through, for example, a REST API. A command to call the method may be formatted in various ways depending on the particular implementation of the block structure, such as a name (e.g., the block's method name), title (e.g., a descriptive name), and arguments. It is noted that this may be the same command structure used to start/stop services.

As previously described, the niogram is the primary mechanism for intra-service data transmission (e.g., between blocks/block groups). All blocks 918 may accept and emit generic niograms of a base niogram class. The base niogram class generally has no required fields and does not require validation. The base niogram class simply exposes a way to add or remove attributes, and serialize/de-serialize the niogram into different forms (e.g., JavaScript Object Notation (JSON)). In the present example, an instance of the base niogram can add or remove attributes freely.

The base niogram can be subclassed for use in a block 918. However, in the present embodiment, the NIO platform 900 will not maintain any awareness of these subclasses and other blocks 918 will expect base niograms. In general, blocks 918 should not rely on processing a sub-class of the base niogram unless it is mandatory. Using only the base niogram class ensures that blocks 918 can be reused in different services with minimal impact. Filtering of blocks 918 should generally be done via a type attribute of the niogram, rather than the class type. Accordingly, while the generic niogram class can be extended for convenience and/or encapsulation, only the attributes of an incoming niogram should be taken into account by a receiving block 918.

Another benefit of using the base class of niograms is to enable real-time cross referencing. For example, a niogram could start out containing data from one source and then have its information enriched using data from another source. The resulting niogram would contain information from both sources, rather than having to carry around multiple niogram types.

With continued reference to FIG. 9B, the modules 904 are modules containing predefined code that the NIO platform 900 may use itself and that blocks 918 may also use. The modules 904 may provide functionality defined with respect to each module, such as a logging module 938, a security module 940, a threading module 942, a communication module 944, a scheduler module 946, a persistence module 948, and/or a web server module 950. Some or all of the modules 904 are designed so that they can be exchanged for different implementations of the same functionality without affecting existing blocks or platform functionality. A role of the modules 904 within the NIO platform 900 is to provide swappable functionality for different platform instances without affecting the blocks 918 and the core 906. The modules 904 provide APIs that can be called by blocks 918 and the core 906. The result of the API call is defined by the functionality of the called module 904.

The functionality defined in the modules 904 spans an entire platform instance. Accordingly, when the functionality within a module 904 is changed, the entire platform instance will use the new version of the module. For example, if the logging module 938 is changed to log to a remote database instead of a local file, all logging calls (in the core 906 and in the services 916) will start logging accordingly. However, such changes may require a platform instance restart to take effect.

The modules 904 support the ability of the NIO platform 900 to run within different environments without having to modify the core design of the NIO platform 900. For example, if a particular environment does not support some needed feature, the module 904 responsible for that feature can be reconfigured or replaced with functionality that is supported by the environment. Accordingly, by changing modules 904 as needed, platform instances may be run in varied environments that have different needs.

Depending on the functionality of the particular module 904, a module 904 may need to initialize its functionality based on variable data. For example, the logging module 938 may need a file name where the information is saved, while the communication module 944 may need a list of current publishers in the platform instance. In order to accomplish this, both the core 906 and the services 916 initialize the modules 904 by calling a setup method and passing context information with this data.

For services 916, the module's initialization data may come directly or indirectly as part of the service's initialization data. For example, the data may be provided indirectly by providing the name of the configuration file where the data for the module 904 resides. For the core 906, the data may reside in a system wide configuration file that can be read during start up and then used for initializing the module 904.

The logging module 938 is used to provide logging functionality and, like all of the modules 904, may provide a customized solution or may use an existing solution, such as Python's built-in logging module. At initialization, the logging module 938 receives parameters detailing adapters that are active in the NIO platform 900, which may include adapters for logging to a local file, for logging to a shared database (e.g., MySQL), and/or for creating a niogram and publishing the niogram through the NIO platform 900. In the present example, the logging module 938 exposes two classes, one for logging and one to retrieve logged information. This enables the core 906 and services 916, which may be separate processes, to log to a single environment.

The security module 940 enables blocks 918 to interface with internal or external security applications. In the present example, the security module 940 provides an authentication method and an authorization method, both of which may be overridden. The authentication method enables the security module 940 to authenticate a user. This method can take arguments and will return an instance of the SecureUser class (see below). Examples of authentication include username/password, OAuth Secure Token, and MAC Address. The authorization method enables a consumer of the security module 940 to be able to authorize an authenticated user (e.g., a SecureUser) against a certain set of SecureTasks. The existing forms of authentication include access control lists, role based security, and User/Group/Other Permissions (e.g., 755). This enables the blocks 918 to use the same security implementation as the core 906 without being concerned about how the security is actually implemented.

In addition to overriding the methods of the security module 940, a secure implementation may also override two objects that can be secure, which are SecureUser and SecureTask. SecureUser is a class that represents a user. There are no required fields and these objects will be returned by the authentication method. When implementing the security module 940, this class should be overridden to map to users in the secure system. SecureTask is a class that represents something to be done. In general, a SecureUser either can or cannot perform a SecureTask. These tasks will be passed to the authentication method and SecureUsers will be authenticated against them. The security module 940 should override this class with tasks that it wishes to secure.

The threading module 942 provides threading support and may provide one or more threading options. For example, two threading modules may be available, with non-native threading used only when needed. In the present embodiment, the main NIO platform process may not need any thread customization and can run under Python's regular threading module. Services 916 and blocks 918, however, may benefit from having a large number of light threads and the ability to launch asynchronous tasks in a short amount of time. Accordingly, the NIO platform 900 can provide a wrapper for Python's threading functionality with the objective of making it transparent to a developer and allowing switching from one threading mode to another. The threading module that will be in effect for a particular service 916 may be specified through a setting.

The communication module 944 enables services 916 within a platform to subscribe and publish niograms. The niograms can be transported within the platform instance or between platform instances. The communication module 944 may use ZeroMQ or a similar library as a publish and subscribe mechanism. It is noted that queuing may occur between services 916 if needed and such queuing may be handled by the communication module 944 via ZeroMQ or another selected library.

The communication module 944 exposes two classes, a publisher class and a subscriber class. Each class may include a list of arguments that are treated as flags, and a subscriber matches a publisher when all flags are matched. All functionality handling the subscription/publication mechanism is controlled within the individual communication module 944 that the NIO platform 900 is running. When a service 916 wants to publish, it simply publishes to the communication module 944 and the communication module 944 determines where the published niograms will go.

For example, assume there are four publishers A-D as follows: (A) publisher (type=RFID, source=Dock Door); (B) publisher (type=RFID, source-Conveyor); (C) publisher (type=BarCode, source=Conveyor); and (D) publisher (type=RFID, source=Shelf). A subscriber may designate the publishers to which it is subscribing as follows. A subscriber (type=[RFID]) would receive publications from A, B, and D. A subscriber (type=[RFID], source=[Dock Door, Conveyor]) would receive publications from A and B. A subscriber (source=[Conveyor]) would receive publications from B and C.

The scheduler module 946 facilitates the execution of tasks at scheduled intervals or at a single point in the future. The scheduler module 946 may be included in the NIO platform 900 so that the scheduler can be replaced if issues arise with a particular scheduler in a given environment. The scheduler module 946 operates via instances of a "job" class, which will be needed only to cancel the job at the end. The implementation of the scheduler module 946 is responsible for initializing and terminating the underlying scheduler.

The persistence module 948 enables blocks 918 and core components to "persist" certain information relevant to them that will survive through a platform instance restart. The persistence module 948 can choose to save wherever and however it wants (e.g., in a flat text file or a local database). It exposes several methods that can be used within a block 918 to access this functionality, such as save, load, and clear.

The web server module 950 enables services 916 and/or blocks 918 to expose a web server for interacting on an isolated port. In addition, the core 906 may use the web server module 950 to expose a web server that hosts the API 908. The web server module 950 provides an interface for each to do so using several methods, such as open, handle, and close. The web server module 950 may use a library such as the CherryPy library in Python. This removes the core dependency of CherryPy and allows block writers to utilize the same web server functionality as the core 906. This not only allows other libraries to be substituted, but also allows block writers to easily expose web servers without having to worry about conflicting with the core's API 908.

Services 916, which operate as different processes in the present example, can ease the load on the core process by receiving data directly through their own web server. Without this, blocks/services use commands to receive data through HTTP, but those commands are regulated and passed through the core 906. By using the web server module 950, the blocks 918 can listen directly to a port for incoming HTTP requests and handle the requests accordingly without loading the core process.

In the present example, the core 906 includes an API 908, a service manager 914, and a configuration manager 910. The configuration manager 910 includes configurations 911, a loader 952, and discovery functionality 954, which may be part of the loader 952 in some embodiments. In other embodiments, the configuration manager 910 may not exist as a component, but the loader/discovery functionality and the configurations may continue to exist within the core 906 (e.g., as part of the service manager 914 or elsewhere). The core 906 may also include core components 912 in some embodiments. The core 906 maintains the services 916 provided by the NIO platform 900. The core 906 is not directly exposed to the service components 902 and can use the modules 904.

The API 908 represents multiple APIs, but it is understood that blocks 918 and block groups may be able to receive and/or send information without passing through the API 908 in the core 906. For example, a block may be able to send and receive SMS messages without using the API 908. It is understood that many different APIs and API calls may be defined, and that the examples described below are only for the purpose of illustrating how various components of the NIO platform 900 may be accessed and managed. In the present example, the API 908 includes a block API, a block configuration API, a command API, a mechanism for providing custom APIs, and a service API.

The block API enables a user to alter the state of the blocks 918 loaded in the NIO platform 900. For example, the block API enables a user to add, reload, and/or remove blocks 918 without having to restart the instance in which the blocks 918 are located. For purposes of example, the block API follows the create, read, update, delete (CRUD) model, exposing four methods to interact with blocks 918, as well as an instances endpoint to interact with a block's instances.

A create method adds a new block 918 to an instance and may be accomplished in multiple ways. For example, a file, module, and/or package may be attached for use as the block 918, a file name where the block code is loaded may be referenced, a remotely hosted block may be referenced, and/or a class may be specified and the NIO platform 900 may be configured to locate and retrieve the class's code.

A read method returns a list of blocks 918 and therefore exposes the functionality of the NIO platform 900. In addition to the list of blocks 918, the read method may return other block meta information, such as version, dependencies, and install time.

An update method refreshes a block 918 in the NIO platform 900. This may include reloading the block's code, re-validating, and updating references. The update method may not update the block code for block instances that are currently in running services 916. In such cases, the service 916 may have to be restarted to realize the block code. In other embodiments, a block instance may be updated without having to restart the service 916.

A delete method enables a block 918 to be deleted from the NIO platform 900. Any block instances of the block 918 will also be deleted. Any blocks 918 that are in running services 916 will continue to run, but when the service 916 is restarted, an error will be thrown and the service 916 will not be able to start unless the service 916 is updated to reflect the deletion.

An instances method enables interaction with the instances of a block 918. For example, "instances" may be viewed as a custom endpoint that is essentially an alias for /instances?block=BlockName. The instances method allows a user to modify the block instances associated with a given block 918. This will be discussed in greater detail below with respect to the block instance API.

The block configuration API enables a user to alter the state of the block instances loaded in the NIO platform 900. Because block configurations are configured instances of blocks 918, some API calls can happen through the previously described block API. For purposes of example, the block configuration API follows the CRUD model, but may also define some alternative methods.

A create method adds a new block configuration. To create a block configuration, a relevant block 918 must exist for the configuration. As a result, configuration creation can go through the specified block's API endpoint within the block API. Configuration creation can also go through the NIO platform's block configuration API as long as a valid block 918 is specified.

A read method returns a list of block configurations, although there may be multiple ways to see the block configurations that are configured within the NIO platform 900. For example, by hitting the main block configurations endpoint, all configurations in the NIO platform 900 will be returned. Further refinement can be achieved by specifying a block name as a parameter or issuing the GET to the block configuration's endpoint. The GET calls will return the configuration's name as well as the configuration defined within the block 918.

An update method updates the configuration of a block configuration on the NIO platform 900. Blocks 918 that are part of a currently running service 916 will not have their configuration updates realized until the service 916 is restarted.

A delete method enables a block configuration to be deleted from the NIO platform 900. This removes a block configuration from the NIO platform 900, but not the block 918 itself. If the block 918 is part of a running service 916, the service 916 will continue to run with the original block code. When the service 916 is restarted, an error will be thrown indicating the block 918 cannot be found.

The command API enables a user to interact with previously described command handlers that have been defined to expose commands for blocks 918. Services 916 and blocks 918 can both be commanded. However, in the present embodiment, because blocks 918 do not stand alone but exist within a service 916, the caller must go through the service 916 to command a block 918. Depending on the particular implementation, a command may be called in many different ways, including hypertext transfer protocol (HTTP) methods such as GET and POST. The block 918 being called should define the proper handling for each type of allowed call.

A command method can be used to command a block 918 inside a service 916. For example, the method may be structured as/services/ServiceName/BlockAlias/commandName. The root of this API call is the service 916, since the block 918 inside of that service 916 is what will be commanded. If the specified service 916 does not exist, an error will be thrown. The next component in the method is the BlockAlias. By default, this will be the block configuration name. However, if a service builder wishes to include more than one of the same blocks 918 within a service 916, a block alias can be defined for each configuration of that block 918. The final component is the command name. This command must be a valid command as defined by the block 918 connected to BlockAlias.

The mechanism for defining custom APIs leverages the ability of blocks 918 to define custom command handlers. Because of this, custom APIs can be written as blocks 918 and implemented as block configurations within a service 916. For example, a service builder can drop an API block 918 into any point in a service 916. The API block 918 does not affect the operation of the service 916, but does provide a new API endpoint that can be used to leverage attributes of the service 916 at the point where the block 918 is inserted.

The service API enables a user to alter the state of the services 916 in the NIO platform 900. For purposes of example, the service API follows the CRUD model, as well as a command model that allows a user to start/stop a service 916.

A create method adds a new service 916 to the NIO platform 900. The specification of the service 916 (e.g., blocks and block mappings) may be included in the body of the call.

A read method returns a list of services 916 and their configuration. This information may include the blocks 918 within a service 916, the state of the service 916 (e.g., running or stopped), and any other configuration options specified when the service 916 was created.

An update method updates a service's configuration. If the service 916 is currently running, the configuration update will be accepted, but the changes will not be realized until the service 916 is restarted.

A delete method removes a service 916 from the NIO platform 900. If the service 916 is currently running, this call will return an error. The service 916 should be stopped before being deleted.

A command method is used to start or stop a service 916. If a problem exists with the configuration of a service 916 (e.g., there are non-existent blocks 918, block instances with an invalid block 918, and/or other validation issues), the call will return an error.

With continued reference to FIGS. 9A and 9B, in the present embodiment, the configuration manager 910 manages configurations 911 for the current instance of the NIO platform 900, loads services 916 and blocks 918 for inspection if needed, and performs auto-discovery. Ideally, the core 902 has no dependency on its functionality (e.g., the blocks 918) or its configuration (e.g., the block instances and services 916). This lack of dependency enables the use of relocatable instance configurations, such as one or more directories specified by a user. Then, when an instance of the NIO platform 900 is launched, the location of the instance configuration will be identified and the NIO platform 900 will load the instance's blocks 918, services 916, and other needed components from that location. This enables a user to version control their configurations, create multiple configurations on the same machine, and easily share and inspect their configurations.

Configurations may be represented within the NIO platform 900 in many different ways. For example, block instances and services 916 may use JSON flat files, SQLite databases, and/or zip files, while blocks 918 may use python files or python module directories. It is understood that these are merely examples and that many different formats may be used to represent configuration information.

The NIO platform 900 may include different types of configurations depending on what part of the NIO platform 900 is being described. Examples include a core configuration, a platform configuration, a core components configuration, a service configuration, and a block configuration. It is understood that these configurations may be stored as separate files or may be combined. Furthermore, any of these configurations may be divided into multiple configurations or combined in many different ways.

The core configuration is directed to settings related to the core 906. These values may be private to the core 906 and visible to the services 902. The platform configuration is directed to settings for the entire NIO platform 900. These include all settings that are visible to the core 906 and to the services 902. The core components configuration is directed to settings related to a specific core component. The service configuration is directed to settings related to a specific service 916. The block configuration is directed to settings related to a specific block 918.

The NIO platform 900 may use a configuration data file that details what is included in the NIO platform 900. This data file may be different from what is actually inside the configuration directory. For example, if a user copies a block file into a block directory, the block file may not be picked up by an instance until the block file is loaded via the block API. At this point, the instance may load that block 918 into the configuration data file. Similarly, block instance configurations may be copied to the directory, but may not be recognized until the instance is restarted. In other embodiments, an instance restart may not be needed in order for the block instance configurations to be recognized.

In some embodiments, the data may reside at a remote location (e.g., in a remote database or a data structure server), which allows definitions to be shared among different platform instances. In such embodiments, the handler to use in loading a particular configuration may be specified through a platform setting. The NIO platform 900 would then instantiate the specified handler and use it to fetch the instance configuration. One example of an instance configuration directory for the NIO platform 900 is illustrated below, with comments in parentheses.

```
/ (The root of the configuration, which can be any directory on a device.)
    /blocks/ (A directory containing the blocks in the instance.)
        /blocks/"specific block name"/ (An example of a directory
        block.)
        /blocks/blockGroup.py
    /instances/ (A directory containing the block instances in the
    instance.)
        /instances/"specific block name".db (An example where the
        blocks are a database.)
        /instances/blockGroup/ (An example where the blocks are
        grouped into a folder.)
            /instances/blockGroup/BigBlockGroup.json
            /instances/blockGroup/LittleBlockGroup.json
    /services/ (A directory containing the services in the instance.)
        /services/EmailNotificationService.json
        /services/WeatherSMSService.db
    config.db (A set of data representing what is configured in the
    instance.)
```

With continued reference to FIGS. 9A and 9B, the core components 912 are modules containing predefined code that the NIO platform 900 may use. The core components 912 provide functionality to the NIO platform 900 and may include modules such as a monitoring module 956, a messaging module 958, a communication manager module 960, and/or an instance distribution module 962.

The core components 912 are somewhat different from core functionality provided by the configuration manager 910 and service manager 914. While core functionality is generally hidden from block writers and required for operation of the NIO platform 900, core components 912 are swappable components (similar to the modules 904) that are positioned within the core 906 and provide functions usable by the core 906. Like the core functionality, the core components 912 are hidden from block writers (unlike the modules 904). Unlike the core functionality, the core components 912 are not required for the NIO platform 900 to run. However, it is understood that certain implementations of the NIO platform 900 may rely on the core components 912 due to the platform's configuration, in which case the functionality of one or more of the core components 912 would be needed to provide the desired functionality. In other words, the NIO platform 900 might run without the needed core components 912, but would be unable to accomplish certain tasks. In other embodiments, the NIO platform 900 may not start without the needed core components 912.

Figure 10:
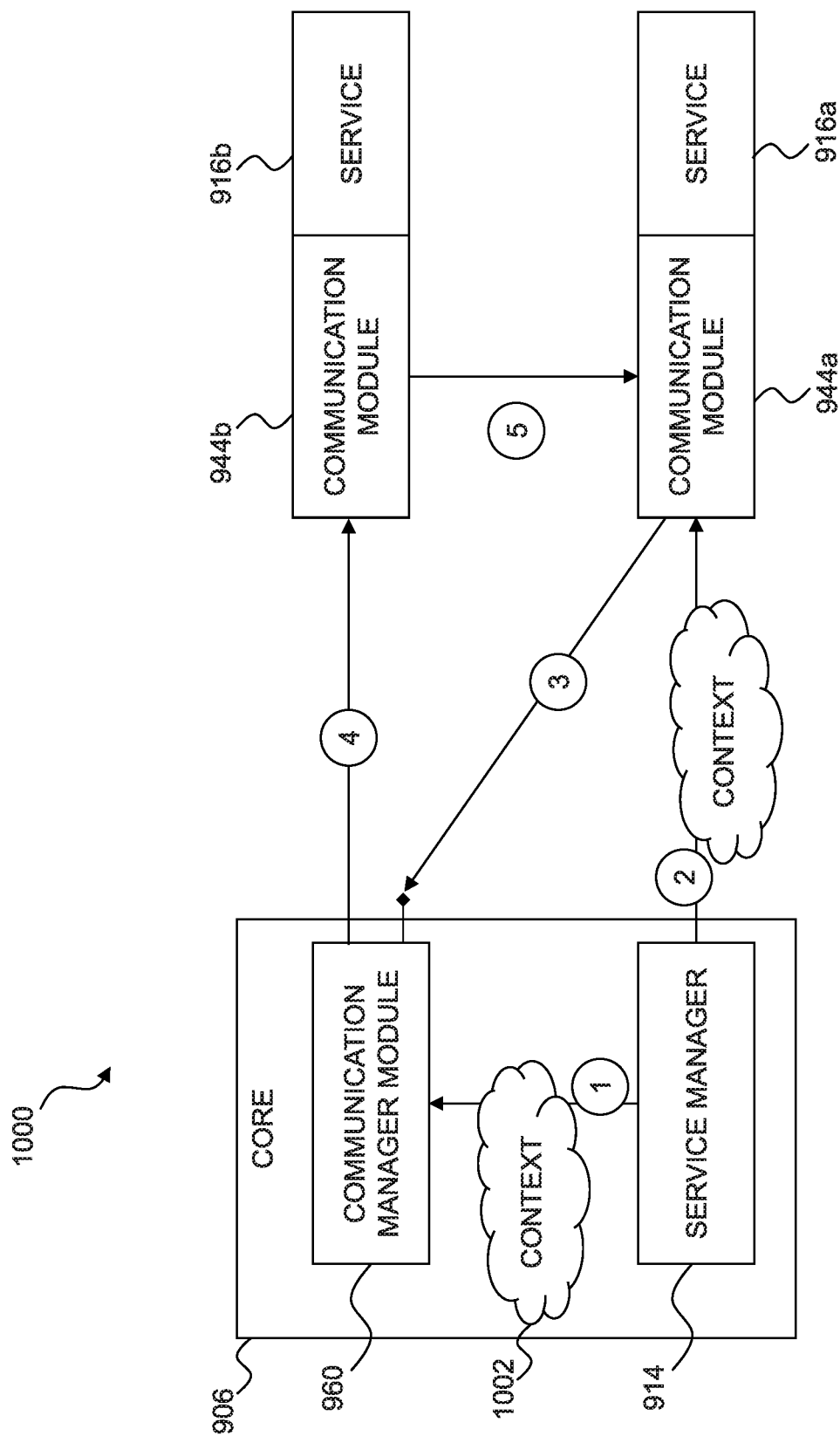
FIG. 10 illustrates one embodiment of communications that may occur within the NIO platform of FIGS. 9A and 9B.

With additional reference to FIG. 10, one embodiment of an environment 1000 that is internal to the NIO platform 900 illustrates the communication manager module 960 serving as a broker for all processes that participate in publish/subscribe operations. To accomplish this, the communication manager module 960 interacts with the previously described communication module 944. When a service 916 containing publishing/subscribing functionality is launched, the communication manager module 960 assigns two ports to the service 916. One port is for subscribing to management data and the other port is for publishing management data. The communication module 944 that is being used by the service 916 tracks these ports for the service.

The communication manager module 960 subscribes to the publisher in the service 916 (e.g., the communication module 944 corresponding to the service). When the communication manager module 960 receives a message from the service 916, the communication manager module 960 broadcasts the message to existing services. This aids in maintaining a synchronized state among all services 916 regarding the publishers in the NIO platform 900. In some embodiments where multiple platform instances are running concurrently, the communication manager modules 960 of the different platform instances may share an internal channel to aid in communications among the various instances. In other embodiments where multiple platform instances are running concurrently, one communication manager module 960 may act as a broker for the other communication manager modules.

The basic communication process provided by the communication module 944 and the communication manager module 960 is illustrated in FIG. 10. For purposes of illustration, each step is labeled in FIG. 10 as a number in a circle. In step 1, the communication manager module 960 populates a service context 1002 received from the service manager 914 with channel information for a new service 916a. This includes the subscribe/publish ports introduced previously. In step 2, the service manager 914 passes the context with the channel information during the initialization of the new service 916a.

In step 3, the new service's communication manager 916a opens a publisher via the communication module 944a that is being used by the service 916a and provides its own information to the communication manager module 960. The new service's communication module 944a also opens a subscriber for receiving information about other services. In step 4, the communication manager module 960 broadcasts the publisher information received in step 3 to the other services, such as a service 916b. In step 5, the other service 916b uses its communication module 944b to open a subscriber to the publisher of the new service 916a. The service 916b can then receive communications to which it is subscribed directly from the service 916b.

It is understood that the described communication process may be accomplished in many different ways. For example, while the present embodiment illustrates a processes that uses the communication manager module 960 to aid in establishing direct communications between the communication modules 944a and 944b, the communication manager module 960 may continue to receive and broadcast messages published by the communication modules 944a and 944b. In other embodiments, the communication modules 944a and 944b may not communicate directly and may subscribe and publish only to the communication manager module 960.

Referring again to FIGS. 9A and 9B, the instance distribution module 962 may be used when more than one platform instance is sharing the services 916. For example, in a distributed system, where multiple platform instances work together with the purpose of sharing the load of running intended services 916, information about the platform instances currently in the distributed system has to be maintained. This information enables each platform instance in the distributed system to be able to find out if the other instances are running. For example, each platform instance may ping the other instances and, when an instance is detected to be non-functioning, may remove any existing dependencies to the non-functioning instance.

The instance distribution module 962 maintains a list of other platform instances in the distributed system, as well as metadata about each platform instance (e.g., how long each instance has been running, how many services 916 are running in each instance, communication ports, and/or other information). In some embodiments, an instance distribution module 962 will reside on every platform instance within the distributed system and self-update when platform instances are added or removed. Whenever this list is updated, relevant information will be published through the communication module 944 for blocks and core components to consume.

To accomplish this, the instance distribution module 962 in each platform instance subscribes to the instance distribution module 962 in each of the other platform instances. When the instance distribution module 962 of an instance detects a change (e.g., a new instance or a dead instance), it publishes that relevant information to the remaining instance distribution modules 962. The instance distribution modules 962 receiving this information then update their respective lists accordingly. Publishing may be centralized or distributed.

Because load balancing tends to be dependent on the way services 916 are built and the metrics of each service 916 (e.g., throughput), the actual balancing process of launching new platform instances and tearing down platform instances may be performed within a service 916. This places the responsibility of load balancing on the services 916. In other embodiments, the core 906 may take a larger role in load balancing.

Referring to FIGS. 11A and 11B, the messaging module 958 provides a way for external systems to send and receive information from the NIO platform 900. It is understood that such communications may be accomplished in many different ways and may vary depending on the implementation of a particular external system. For example, some external systems may inquire about the data available and formulate a request based on the response, while other external systems may know exactly what data to request and what data to provide. In some embodiments, the messaging module 958 may be replaced by using commands in conjunction with the web server module 950.

FIG. 11A illustrates an embodiment where an external system 1102 inquires about the data available and formulates a request based on the response. For purposes of illustration, each step is labeled in FIG. 11A as a number in a circle. An inquiry message (e.g., a request) from the external system 1102 is received by the messaging module 958 via the REST interface 964/API 908 in step 1. The messaging module 958 accepts the inquiry, adds and/or registers the service, and sends the service's information (e.g., a uniform resource locator (URL)) to the external system 1102 in step 2. The external system 1102 uses the received information to send a message (e.g., an HTTP call) to the service manager 914 in step 3. The service manager 914 then places the message in the channel for publication to the service 916 in step 4.

FIG. 11B illustrates an embodiment where an external system 1104 knows exactly what data to request and what data to provide. For purposes of illustration, each step is labeled in FIG. 11B as a number in a circle. A request from the external system 1104 is received by the messaging module 958 via the REST interface 964/API 908 in step 1. The messaging module 958 forwards the request to an external data receiver service (which may be part of or separate from the service manager 914) in step 2. The service manager 914 processes the call to publish a specific message to the service 916 in step 3.

With continued reference to FIGS. 9A and 9B, the service manager 914 handles the interaction of the core 906 with the services 916 running in a platform instance. The service manager 914 handles starting and stopping services 916, and may also manage a service's incoming commands (e.g., commands received via the REST interface 964/API 908). The service manager 914 may use functionality provided by the modules 904 and core components 912. The service manager 914 may be accessed from outside the NIO platform 900 via the API 908.

Figure 12:
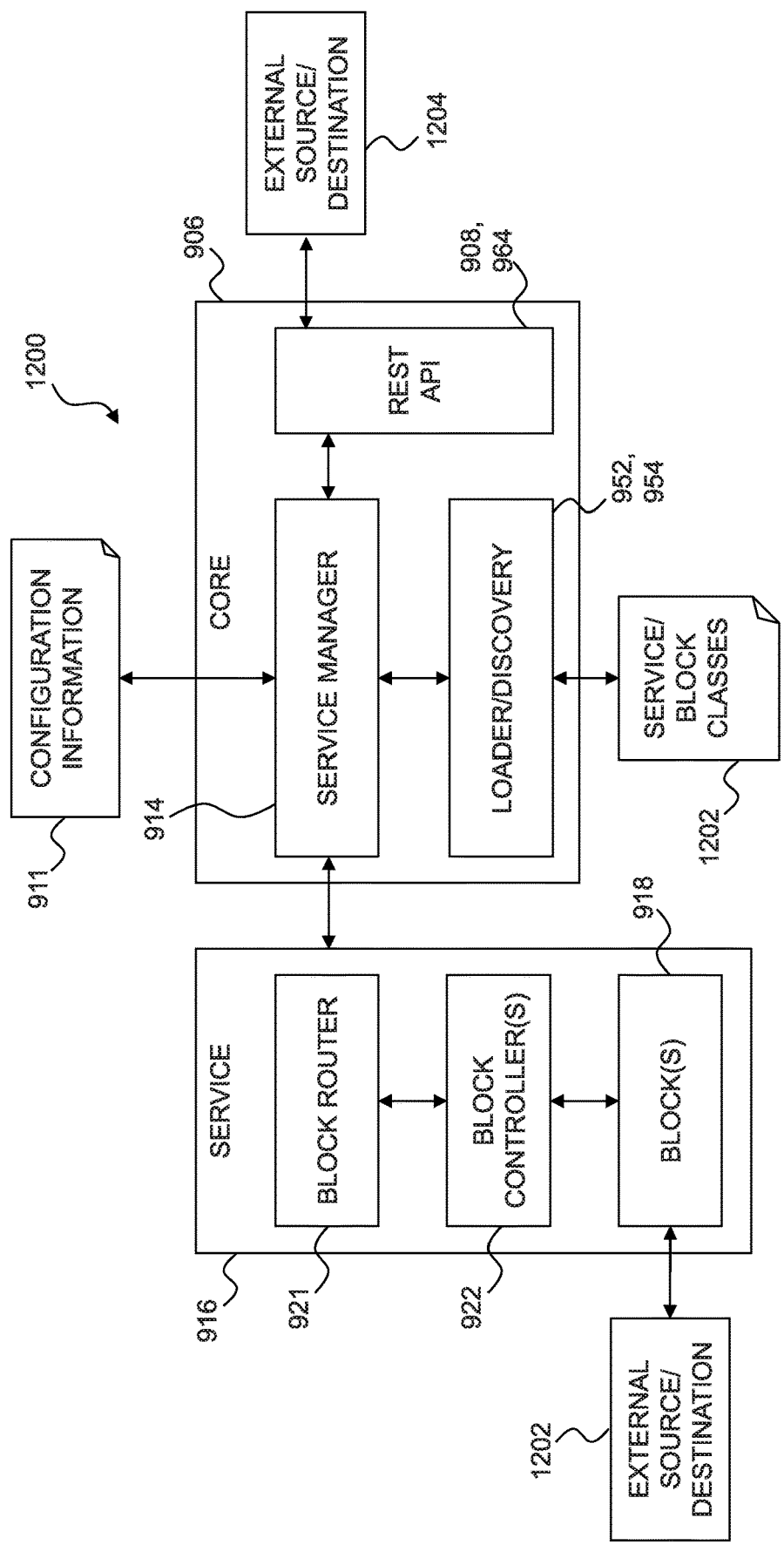
FIG. 12 illustrates one embodiment of the interaction between various components within the NIO platform of FIGS. 9A and 9B.

Referring to FIG. 12, one embodiment of an environment 1200 that is internal to the NIO platform 900 illustrates a service 916 and the core 906. As previously described, the service process handles communications with the service manager 914, such as commands received through the REST API 908. The block router 921 handles intra-service communications between the blocks 918 via the corresponding block controllers 922 (in embodiments where the block controllers 922 are present). The loader 952 and discovery functionality 954 may be used by the service manager 914 to load service and/or block classes for discovery purposes. External sources/destinations 1202 and 1204 can communicate via blocks 918 and/or via the REST API 908.

Figure 13:
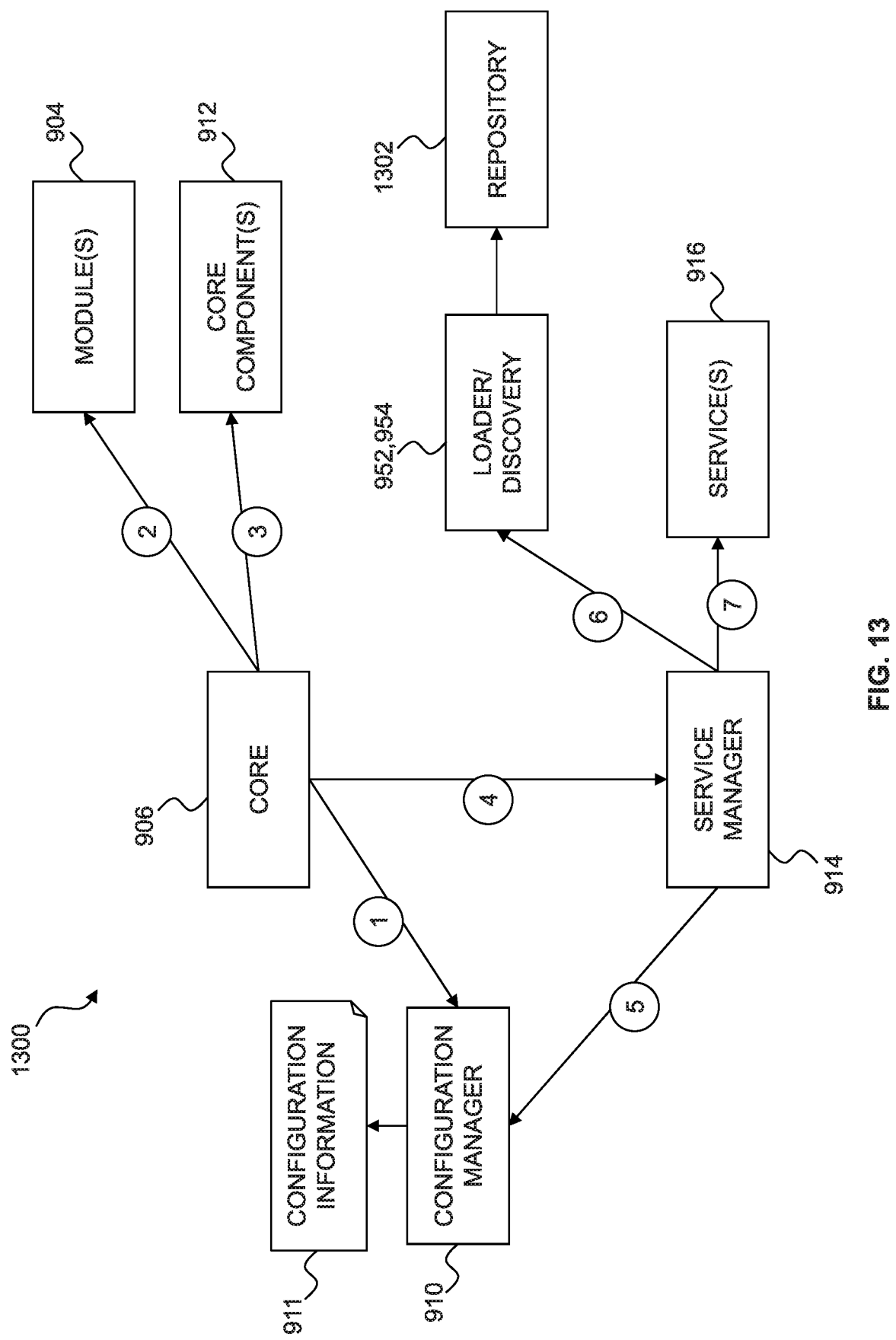
FIG. 13 illustrates one embodiment of interactions among various components of the NIO platform of FIGS. 9A and 9B when an instance is launched.

Referring to FIG. 13, one embodiment of an environment 1300 that is internal to the NIO platform 900 illustrates various components of the NIO platform 900 of FIGS. 9A and 9B interacting to launch a platform instance and a service 916. For purposes of illustration, each step is labeled in FIG. 13 as a number in a circle.

After a new core process 906 is launched, the core process accesses the configuration manager 910 and retrieves one or more configurations 911 in step 1. The configuration provides information as to which, if any, modules 904 and core components 912 are available within the NIO platform 900. The core process 906 then, for each module 904 that is available, creates and initializes the module 904 for use in step 2. In step 3, the core process 906, for each core component 912 that is available, creates and initializes the core component 912.

In step 4, the service manager 914 is started. In step 5, the service manager 914 accesses the service configuration information via the configuration manager 910. In step 6, the service manager 914 then calls the loader 952/discovery functionality 954 to discover all the services 916 and blocks 918 available in the NIO platform 900. The loader 952 may access a repository 1302 in which the services 916 and blocks 918 are stored and, if needed, load each service 916 and/or block 918 to examine them and discover their characteristics. This process may include examining each block 918 to see if the block requires a particular module. For example, a block 918 may explicitly define the module(s) that it needs or the loader may examine the block's code to determine if it uses any modules.

In step 7, for each service 916 configured to be autostarted, the service manager 914 launches the service 916 with the configuration information corresponding to that service. Although not shown, the service manager 914 may also expose the handling for the REST interface 964/API 908 through the web server module 950 during this process.

Referring to FIG. 14, a method 1400 illustrates one embodiment of a process that may be executed by the NIO platform 900 of FIGS. 9A and 9B when an instance of the platform is launched. In the present example, a core process has been launched and is running prior to step 1402, but no modules or services have yet been launched. The method 1400 is a more detailed embodiment of a process that may occur during steps 1-4 of FIG. 13.

In step 1402, the core process accesses the configuration information and, in step 1404, uses the configuration information to identify the available modules 904 and/or core components 912. Step 1404 may use the loader 952/discovery functionality 954 if needed during the discovery process of step 1404, in which case at least part of step 1412 would be executed prior to step 1404. In step 1406, the core process creates a context to store the information for the various modules.

In step 1408, the core process starts and configures each available module 904. It is noted that a module 904 may be instantiated prior to step 1408 or when started, but the configuration occurs when each module is started. During configuration, the configuration information and/or context is passed to the module 904 being configured. The module 904 then updates the context with its own information, such as information that may be needed by the core process and/or another of the modules 904 to call the current module.

In step 1410, the core process starts and configures each available core component 912. It is noted that a core component 912 may be instantiated prior to step 1408 or when started, but the configuration occurs when each module is started. During configuration, the configuration information and/or context is passed to the core component 912 being configured. The core component 912 then updates the context with its own information, such as information that may be needed by the core process, one of the modules 904, and/or another of the core components 912 to call the current module.

It is noted that the current embodiment starts the modules 904 before starting the core components 912. As the modules 904 cannot use the core components 912, but the core components 912 can use the modules 904, this order of steps enables the modules 904 to update the context before the context is passed to the core components 912. As the modules 904 have no need for the context from the core components 912, this is a more efficient process. However, in other embodiments, the steps may be reversed or even mixed, with modules 904 and core components 912 being started in some other order. In such embodiments, all modules may receive the context for all other modules.

In step 1412, the core process starts and configures other core components, such as the service manager 914 and the loader 952/discovery functionality 954. The service manager 914 may then start services, as described in FIG. 15.

Referring to FIG. 15, a method 1500 illustrates one embodiment of a process that may be executed by the NIO platform 900 of FIGS. 9A and 9B after the service manager 914 is started and configured by the core process. In the present example, the modules 904 and core components 912 have been launched and a context exists with the information about those modules. The method 1500 is a more detailed embodiment of a process that may occur during steps 5-7 of FIG. 13.

In step 1502, the service manager 914 accesses the configuration information for the services 916 and, in step 1504, calls the loader 952/discovery functionality 954 to discover the services 916 and blocks 918 available to the NIO platform 900. In step 1506, the service manager 914 may obtain a context (e.g., the context with the information for the modules 904 and core components 912) or may create a new context for use with the services 916.

In step 1508, the service manager 914 starts and configures each available service 916 that is configured to autostart. It is noted that a service 916 may be instantiated prior to step 1508 or when started, but the configuration occurs when each service 916 is started in the present embodiment. In other embodiments, some or all of the configuration may occur when the service 916 is instantiated. During configuration, the configuration information and/or context is passed to the service 916 being configured. The service 916 then updates the context with its own information.

In step 1510, the service manager 914 exposes the handling for the REST interface 964/API 908 through the web server module 950, although this step may occur earlier in the method 1500. In step 1512, the service manager 914 waits for instructions such as stop and start commands for services 916.

Figures 16A, 16B:
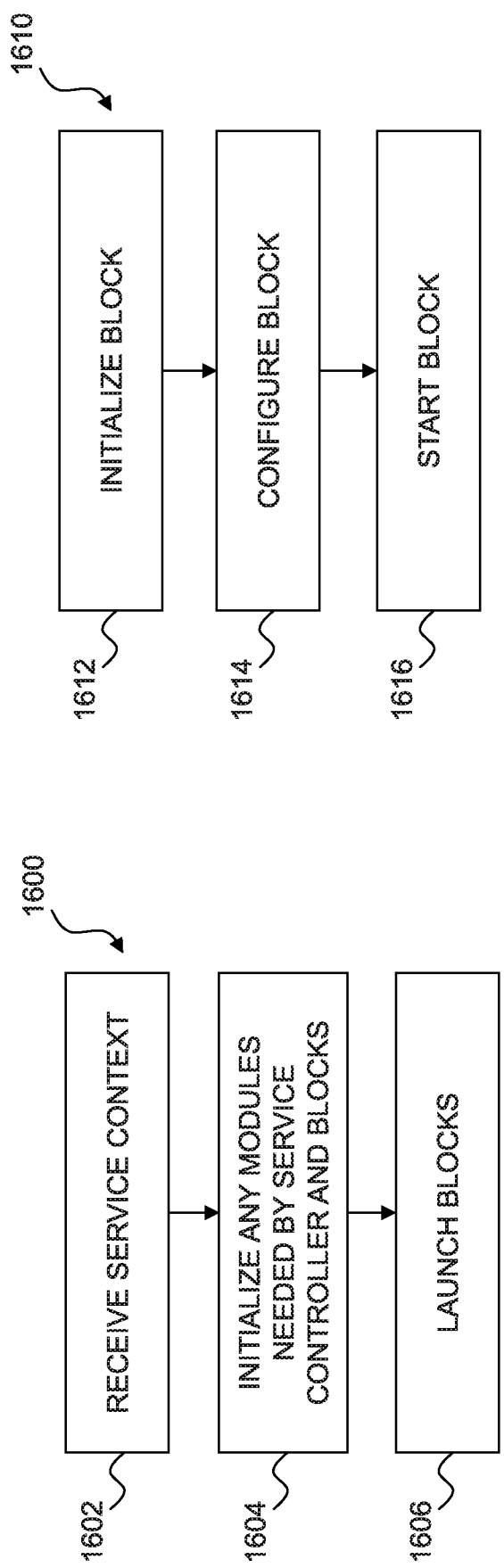

Referring to FIG. 16A, a method 1600 illustrates one embodiment of a process that may be executed by a service process of the NIO platform 900 of FIGS. 9A and 9B after the corresponding service 916 is started. As stated previously, when a service 916 is started, the service context is passed to the service process by the service manager 914.

In step 1602, the service process receives the service context. In step 1604, the service process initializes any modules needed by the service process itself and modules needed by the blocks 918 used in the service 916. The service process may directly use modules such as the logging module 938 and the threading module 942. Some modules, like the communications module 944, may be used by the service process to aid a block 918 in setting up a communications channel. Other modules may be used directly by a block 918. In step 1606, the block router 921 launches the blocks 918 belonging to the service 916.

Referring to FIG. 16B, a method 1610 illustrates one embodiment of a process that may be executed by a service process of the NIO platform 900 of FIGS. 9A and 9B after the corresponding service 916 is started. For example, the method 1610 may be a more detailed embodiment of step 1606 of FIG. 16A and may occur for each block 918. In step 1612, the block 918 is initialized to create a block instance. In step 1618, the block instance is configured, which may include passing information such as module information needed by the block instance to use the module.

In step 1616, the block instance is started. As previously described, starting a block instance may include notifying the block instance that the corresponding service 916 has been started. If configured to do so, the block instance can then execute instructions using the notification as a trigger. Without this notification, the block instance may remain idle until called by processSignals( ).

Referring to FIG. 16C, a method 1620 illustrates one embodiment of a process that may be executed by the block router 921 of the NIO platform 900 of FIGS. 9A and 9B. In step 1622, the block router 921 receives an output notification from a block 918. In step 1624, the block router 921 looks up the next block(s) in the routing table and, in step 1626, calls the next block(s) to process the output. As described previously, this process may involve calls such as Blockrouter.notifySignals( ) and processSignals( ).

As described previously, due to the asynchronous nature of the blocks 918, some or all of the blocks 918 in the service 916 can process niograms concurrently. Furthermore, a single block 918 may process multiple niograms concurrently by using threading to execute the block's functionality in multiple concurrent threads. The method 1620 does not need to be changed for this process, as each processSignals( ) call launches a new thread. In the present example, the thread may spawn with a target of block.processSignals( ). If needed, the blocks 918 may include instructions for acquiring and releasing locks to prevent problems between concurrently executing threads. These instructions may be included on a block by block basis, as race conditions or other thread collision issues may not be a concern for some blocks.

Referring to FIG. 16D, a method 1630 illustrates one embodiment of a process that may be executed by the block router 921 of the NIO platform 900 of FIGS. 9A and 9B. In step 1632, the block router 921 receives a message. The message may be from a block 918 and intended for the REST API 908/964, or may be from the REST API and directed to the block. In step 1634, the block router 921 passes the message on to the destination (e.g., via the REST API 908/964, by publishing the message to a channel, or via another transfer mechanism).

Referring to FIG. 16E, a method 1640 illustrates one embodiment of a process that may be executed by a block 918 of the NIO platform 900 of FIGS. 9A and 9B. In step 1642, the block 918 receives one or more signals and/or niograms. The block 918 may receive signals if the block is directly coupled to an external source and may receive niograms from another block (directly or via the block router 921 depending on the particular implementation). It is understood that receiving includes active processes through which the block 918 may obtain data, such as pulling data from an external source.

In step 1644, the block 918 performs processing based on the block's internal instructions. As described previously, such instructions may range from simple to complex, depending on the particular configuration of the block 918. In step 1646, once the processing of step 1644 produces an output, the block 918 may issue a notification that there is output (e.g., by notifying the block router 921) and/or may send the output directly to an external source, depending on the block's internal instructions.

Referring again to FIGS. 9A and 9B, the NIO platform 900 includes a REST interface 964 that may be part of the API 908. The REST interface 964 aids in communicating with external tools and systems, such as a console 972, enterprise monitoring tools 974, enterprise applications 976, and external devices 978 (e.g., mobile devices, servers, databases, machinery, manufacturing equipment, and/or any other device, system, and/or application with which the NIO platform 900 is configured to communicate).

The NIO platform 900 may use a runtime environment 966 for a particular language (e.g., Python) and also interacts with an operating system 968 on whatever device is running the NIO platform 900.

Figure 17:
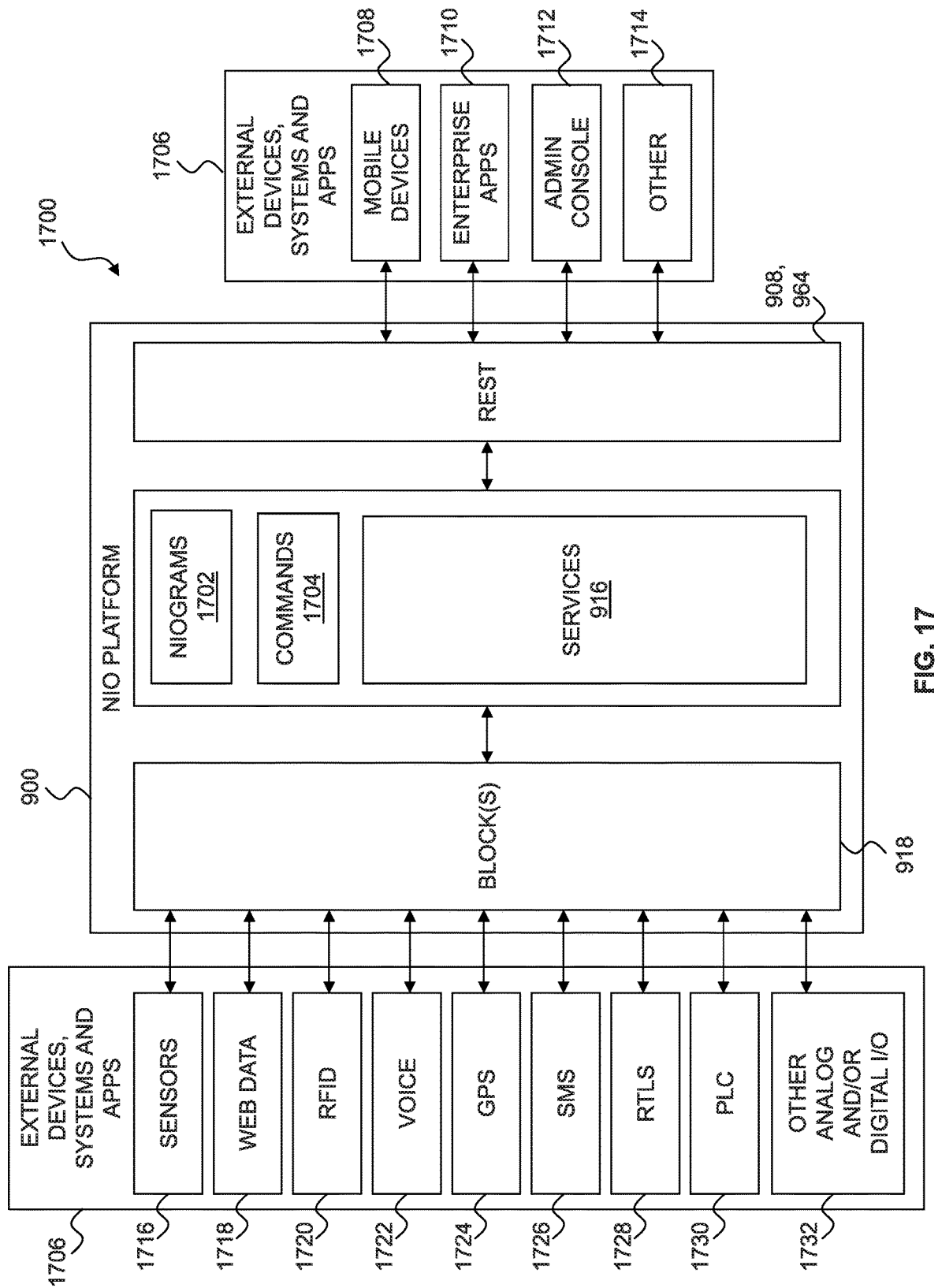
FIG. 17 illustrates one embodiment of an environment showing a user's perspective of the NIO platform 900 of FIGS. 9A and 9B.

Referring to FIG. 17, one embodiment of an environment 1700 illustrates a user's perspective of the NIO platform 900 of FIGS. 9A and 9B with external devices, systems, and applications 1706. For example, the external devices, systems, and applications 1706 may be similar or identical to the external source(s)/destination(s) 132 of FIGS. 1E-1G and 1I.

From the user's perspective, much of the core's functionality (not shown) is hidden. The user has access to some components of the NIO platform 900 from external systems and applications 1706 via the REST API 908, 964. The external devices, systems, and applications 1706 may include mobile devices 1708, enterprise applications 1710, an administration console 1712 for the NIO platform 900, and/or any other external systems and applications 1714 that may access the NIO platform 900 via the REST API.

Using the external devices, systems, and applications 1706, the user can issue commands 1704 (e.g., start and stop commands) to services 916, which in turn either process or stop processing niograms 1702. As described above, the services 916 use blocks 918, which may receive information from and send information to various external devices, systems, and applications 1706. The external devices, systems, and applications 1706 may serve as signal sources that produce signals using sensors (e.g., motion sensors, vibration sensors, thermal sensors, electromagnetic sensors, and/or any other type of sensor) 1716, the web 1718. RFID 1720, voice 1722, GPS 1724, SMS 1726, RTLS 1728, PLC 1730, and/or any other analog and/or digital signal source 1732 as input for the blocks 918. The external devices, systems, and applications 1706 may serve as signal destinations for any type of signal produced by the blocks 918, including actuation signals. It is understood that the term "signals" as used herein includes data.

Figure 18:
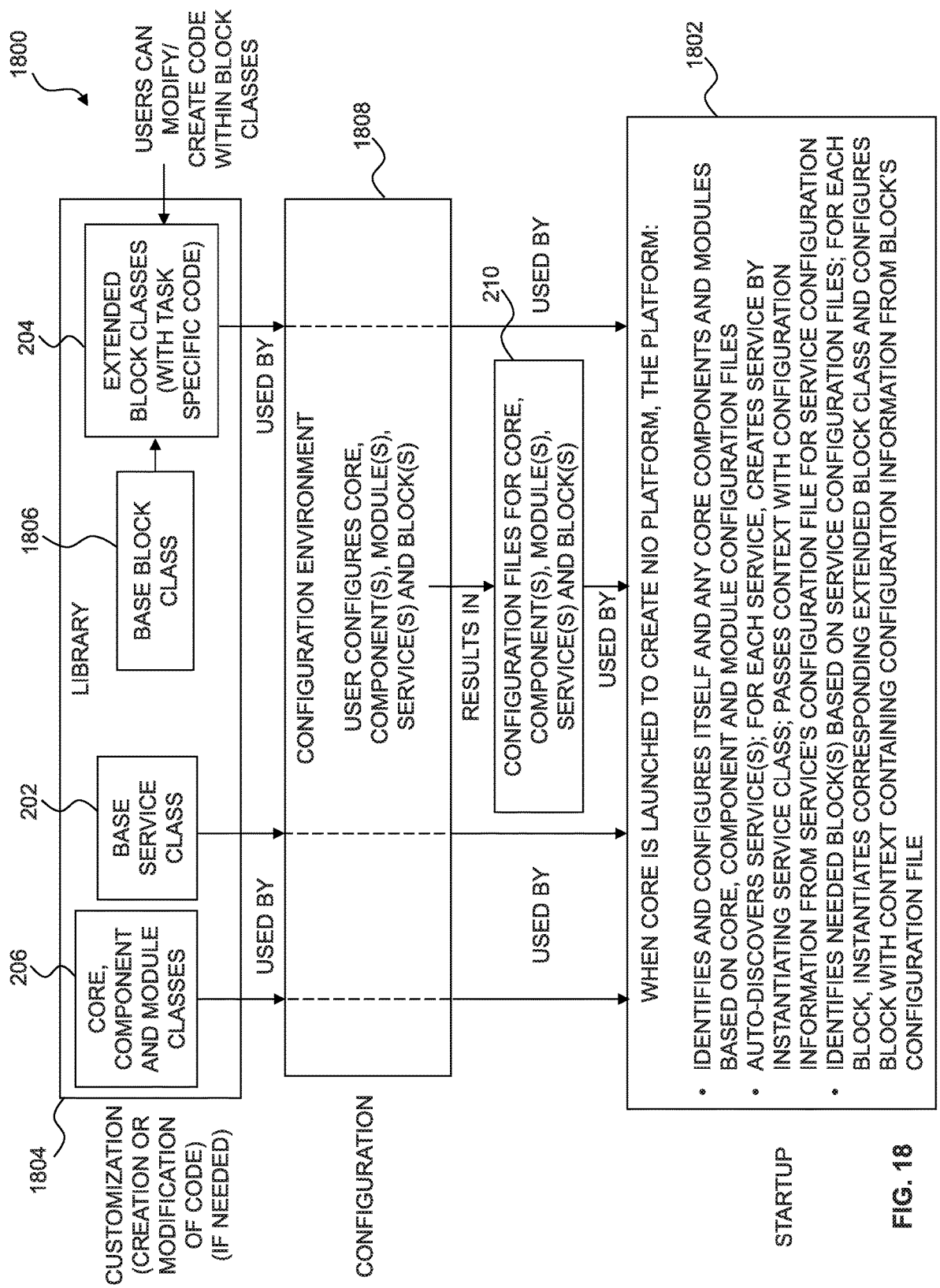
FIG. 18 illustrates one embodiment of a workflow that may be used to create and configure a NIO platform.

Referring to FIG. 18, a diagram 1800 illustrates one embodiment of a workflow that runs from creation to launch of a NIO platform 1802 (which may be similar or identical to the NIO platform 100 of FIG. 1A, 200 of FIG. 2A. 400 of FIG. 4A, and/or 900 of FIGS. 9A and 9B). The workflow begins with a library 1804. The library 1804 includes core classes 206 (that include the classes for any core components and modules in the present example), a base service class 202, a base block class 1806, and block classes 204 that are extended from the base block class 1806. Each extended block class 204 includes task specific code. A user can modify and/or create code for existing blocks classes 204 in the library 1804 and/or create new block classes 204 with desired task specific functionality. Although not shown, the base service class 202 can also be customized and various extended service classes may exist in the library 1804.

The configuration environment 1808 enables a user to define configurations for the core classes 206, the service class 202, and the block classes 204 that have been selected from the library 1804 in order to define the platform specific behavior of the objects that will be instantiated from the classes within the NIO platform 1802. The NIO platform 1802 will run the objects as defined by the architecture of the platform itself, but the configuration process enables the user to define various task specific operational aspects of the NIO platform 1802. The operational aspects include which core components, modules, services and blocks will be run, what properties the core components, modules, services and blocks will have (as permitted by the architecture), and when the services will be run. This configuration process results in configuration files 210 that are used to configure the objects that will be instantiated from the core classes 206, the service class 202, and the block classes 204 by the NIO platform 1802.

In some embodiments, the configuration environment 1808 may be a graphical user interface environment that produces configuration files that are loaded into the NIO platform 1802. In other embodiments, the configuration environment 1808 may use the REST interface 908, 964 (FIGS. 9A and 9B) of the NIO platform 1802 to issue configuration commands to the NIO platform 1802. Accordingly, it is understood that there are various ways in which configuration information may be created and produced for use by the NIO platform 1802.

When the NIO platform 1802 is launched, each of the core classes 206 are identified and corresponding objects are instantiated and configured using the appropriate configuration files 210 for the core, core components, and modules. For each service that is to be run when the NIO platform 1802 is started, the service class 202 and corresponding block classes 204 are identified and the services and blocks are instantiated and configured using the appropriate configuration files 210. The NIO platform 1802 is then configured and begins running to perform the task specific functions provided by the services.

Referring to FIG. 19A, one embodiment of a service configuration environment 1900 within which a service 230 is configured at runtime is illustrated. Within the NIO platform 1802, each service 230 is created using a class file 202 and configuration information 1902. The configuration information includes predefined information that exists before runtime (e.g., as part of the platform configuration information 210 of FIG. 2A) and information that is dynamically generated at runtime. The dynamically generated information is not known until the NIO platform 1802 is launched and may include information described with respect to the environment 1300 of FIG. 13.

The class file 202 may be used by multiple services, but the configuration information 1902 is unique to the particular service 230 being created. The configuration information 1902 may be in a separate file for each service 230 or may be in a larger file from which a particular service's configuration information is extracted. At runtime, the class file 202 is instantiated and then the configuration information 1902 is applied to the instantiated service object.

Referring to FIG. 19B, one embodiment of a block configuration environment 1904 within which a block 232 is configured at runtime is illustrated. Within the NIO platform 1802, each block 232 is created using a class file 204 and configuration information 1906. The configuration information includes predefined information that exists before runtime (e.g., as part of the platform configuration information 210 of FIG. 2A) and information that is dynamically generated at runtime. The dynamically generated information is not known until the NIO platform 1802 is launched and may include information described with respect to the environment 1300 of FIG. 13.

The class file 204 may be used by multiple blocks, but the configuration information 1906 is unique to the particular block 232 being created. The configuration information 1906 may be in a separate file for each block 232 or may be in a larger file from which a particular block's configuration information is extracted. At runtime, the class file 204 is instantiated and then the configuration information 1906 is applied to the instantiated block object.

Referring to FIGS. 20A and 20B, embodiments of class files 204a and 204b for blocks 232a and 232b (not shown), respectively, are illustrated. Within the NIO platform 1802, the service class files 202 and block class files 204 are based on a base service template (for services 230) and a base block template (for blocks 232), respectively. These base templates include NIO platform specific behavior that is inherited by any class that extends them. This means that each service class 202 and block class 204 inherits NIO platform specific behavior that allows the corresponding service 230 or block 232 to work within the NIO platform architecture. Without this NIO platform specific behavior, the class files 202 and 204 would not be recognized within the NIO platform architecture and so the corresponding services 230 and classes 232 could not be created. In addition to the NIO platform specific behavior, each block class 204 contains executable instructions that provide particular task specific functionality.

Referring specifically to FIG. 20A, the class file 204a for Block Class I includes the standard base block code for the NIO platform and also contains custom code for connecting to an external signal source, which is Twitter for purposes of example. Referring specifically to FIG. 20B, the class file 204b for Block Class 2 includes the standard base block code for the NIO platform and also contains custom code for sending email.

If there is not an existing block class that contains the code needed to perform a particular task, either a new block class can be created using the base block template or an existing block class 204 can be modified. While service classes 202 can also include custom code, they rarely do so because the base service template generally provides all the functionality needed for a service 230. However, it is understood that service classes 202 can also be customized.

Figure 21:
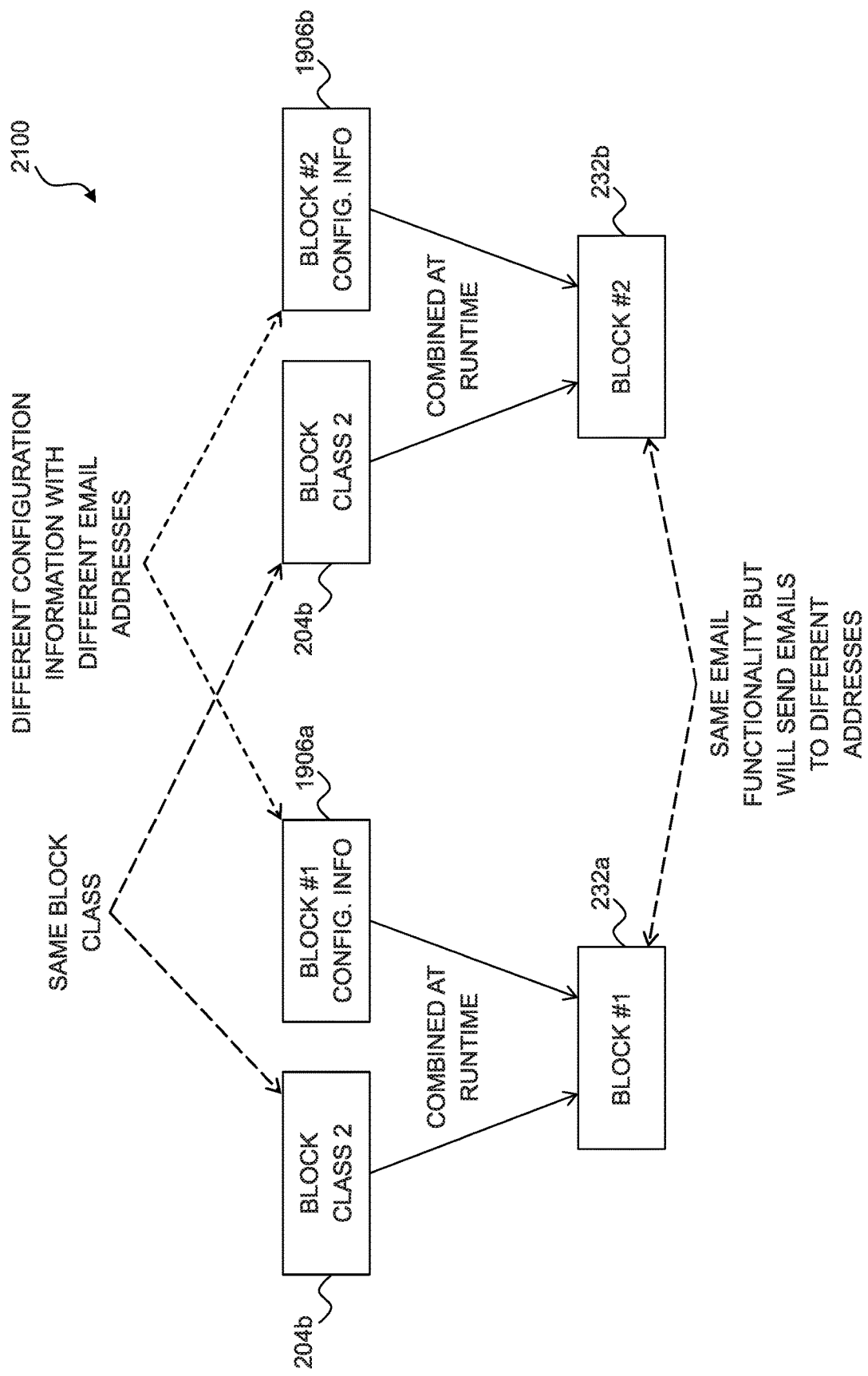
FIG. 21 illustrates one embodiment of an environment within which configuration information is used to configure two blocks based on the same block class in different ways.

Referring to FIG. 21, one embodiment of an environment 2100 within which configuration information is used to configure two blocks 232 based on the same block class 204 in different ways is illustrated. The configuration information 1906 (FIG. 19B) allows configuration of a particular block 232 at runtime by setting the values of configurable parameters defined within the block class 204. This means that the same block 232 can be configured in different ways depending on the values in the configuration information 1906 that is used to configure the block 232.

The block class 204b (as shown in FIG. 20B) contains custom code to send any information received by the block 232 to a destination email address. The code includes a configurable parameter for the destination email address to avoid having to change the underlying block class 204 each time a different email address is used. This allows the email address to be defined in the configuration information 1906, which means that the same block class 204 can be used to create multiple blocks that send their emails to different addresses.

Accordingly, in the present example, the block class 204b is to be used to instantiate two blocks 232a (also referred to as Block #1) and 232b (also referred to as Block #2). The blocks 232a and 232b are to be configured to send email to two different addresses using configuration information 1906a (also referred to as Block #1 configuration information) and 1906b (also referred to as Block configuration information #2), respectively. When the blocks 232a and 232b are instantiated and configured, the two blocks will have the same email sending functionality, but will send their emails to different email addresses.

Figure 22:
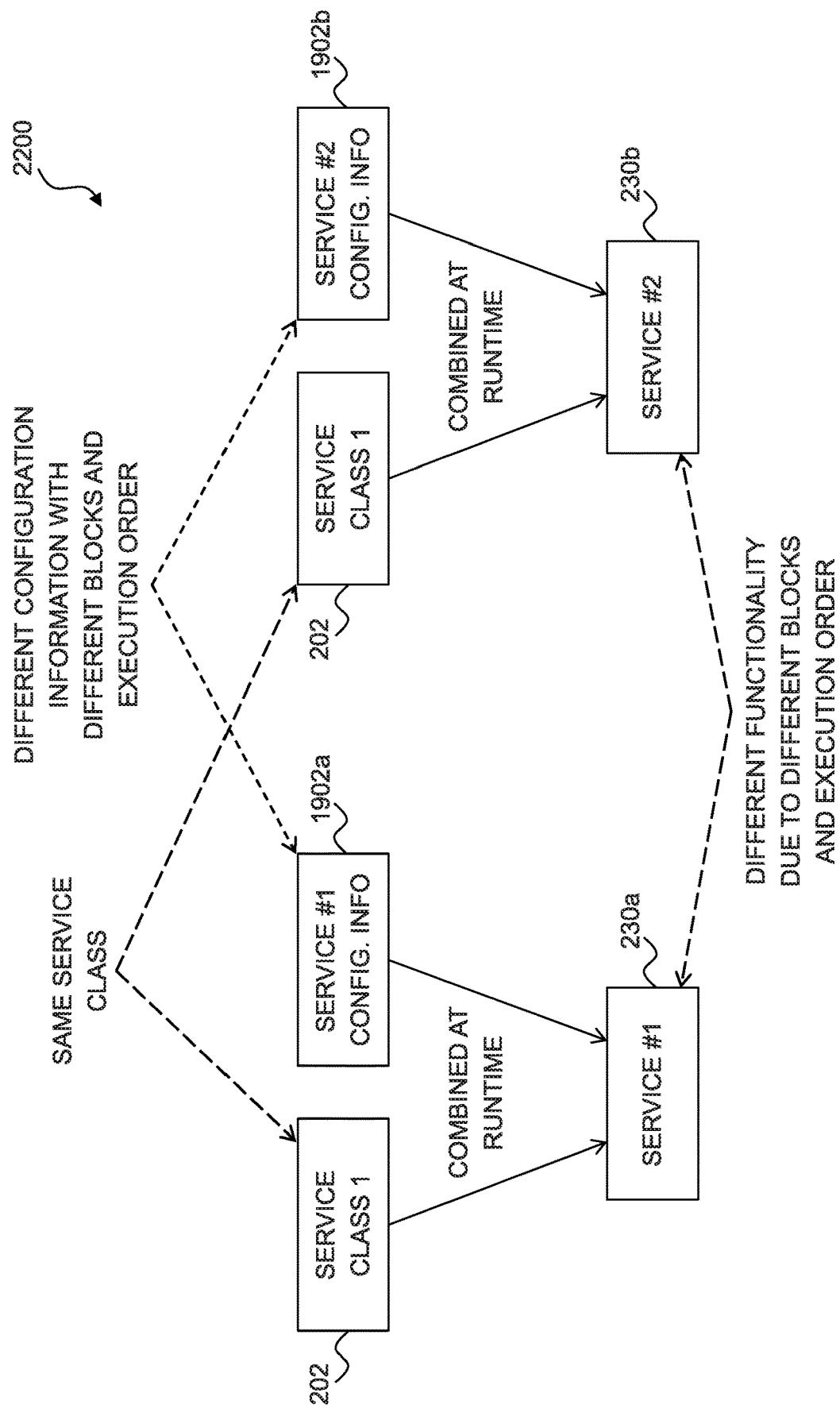
FIG. 22 illustrates one embodiment of an environment within which configuration information is used to configure two services based on the same service class in different ways.

Referring to FIG. 22, one embodiment of an environment 2200 within which configuration information is used to configure two services 230 based on the same service class 202 in different ways is illustrated. The configuration information 1902 (FIG. 19A) allows limited configuration of a particular service 230 at runtime by defining which blocks 232 are to be executed by the service and the order of execution of the blocks 232. The configuration information 1902 may also be used to set the values of configurable parameters defined within the service class 202. This means that the same service 230 can be configured in different ways depending on the blocks 232, the order of execution, and the values in the configuration information 1902 that is used to configure the service 230.

In the present example, the configuration information 1902 for a service 230 includes source blocks and destination blocks needed to build a routing table when the service 230 is instantiated. Because the blocks 232 do not have any connection to each other except through the service 230, the service 230 uses the routing table to direct information from one block (a source block) to the next block (a destination block). The service 230 receives the source and destination blocks as configuration information after the service 230 is instantiated, so the same underlying service class 202 can be used for different services 230. This means that the services 230 can have different functionality based on the particular blocks 232 and block execution order defined in their configuration information 1902.

Accordingly, in the present example, a service class 202 is to be used to instantiate two services 230a (also referred to as Service #1) and 230b (also referred to as Service #2). The services 230a and 230b are to be configured using different blocks and different orders of execution using configuration information 1902a (also referred to as Service #1 configuration information) and 1902b (also referred to as Service configuration information #2), respectively. When the services 230a and 230b are instantiated and configured, the two services will have different functionality.

In the present example, the fact that a service 230 is made up of a service class 202 and configuration information 1902 means that, prior to instantiation, there is no service class 202 that can be examined to determine the execution order of blocks 232, or even the blocks 232 that are to be used, within the service 230. To determine the behavior of the service 230, the configuration information 1902 would have to be examined.

Figure 23:
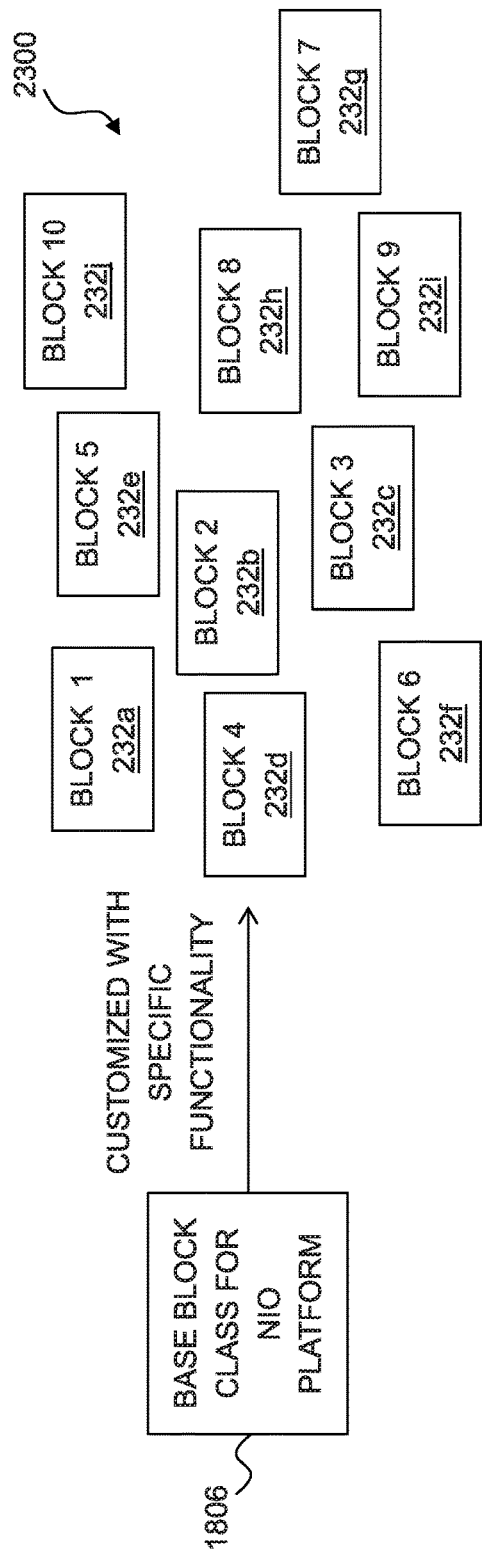
FIG. 23 illustrates one embodiment of an environment with a base block class and multiple blocks based on the base block class.

Referring to FIG. 23, one embodiment of an environment 2300 is illustrated with a base block class 1806 that is extended to create various customized block classes (not shown), such as those in the library 1804 of FIG. 18. The customized block classes can then be instantiated as described previously to form various blocks 232a-232j. As described above, a NIO platform operates by using a service 230 to organize the appropriate blocks 232 to perform a particular task. In the present example, the blocks 232 do not have any connection to each other except through the service 230. This organizational structure provides benefits such as asynchronicity in block execution, dynamic expansion and retraction of block resources in response to input changes, and the ability to modify services 230 and blocks 232 without having to restart the NIO platform 1802.

For example, as shown in FIG. 23, the environment 2300 includes a block library that contains the ten blocks 232a-232j. Each of the blocks 232a-232j is built from the base block template, so each block is compatible with the NIO platform architecture. The blocks 232a-232j have no connection to each other except that all of them can operate within the NIO platform architecture. Each block 232a-232j contains task specific code that allows that block to perform a particular function. For example, the block 232a connects to Twitter, the block 232b sends an email containing any information received from another block, the block 232c connects to a machine in an assembly line, the block 232d filters any input received from another block for one or more defined text strings, the block 232e sends a signal to turn off the machine on the assembly line, and so on.

Assume that a user wants to create two different services 230a and 230b using the ten blocks 232a-232j. Service 230a is to monitor an external source (e.g., Twitter) Twitter for the words "company name" and send an email to user1@companyname.com if such a tweet is detected. Service 230b will monitor an assembly line machine for the occurrence of certain error codes and send an email to user2@companyname.com if an error is detected. Service 230b will also shut the machine down if an error is detected. Services 230a and 230b are to run simultaneously on a single NIO platform and perform their tasks asynchronously and in real time without any data storage.

Figure 24:
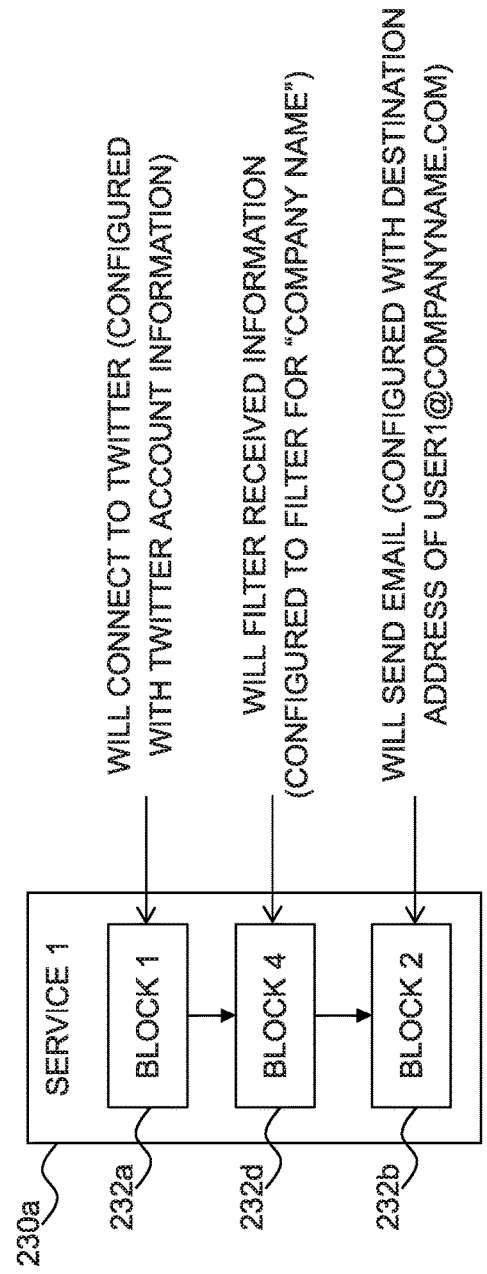
FIG. 24 illustrates one embodiment of a service built using blocks from the environment of FIG. 23.

With additional reference to FIG. 24, one embodiment of the service 230a is illustrated using blocks from the environment 2300 of FIG. 23. Service 230a is created by identifying the needed block classes and defining their order of execution. For example, the block 232a (connecting to Twitter) will be followed by the block 232d (filtering for "company name"), and then the block 232b will send an email to user1@companyname if block 232d identifies any tweets with "company name." The block classes include configurable parameters that allow them to be customized without needing to open the block classes and change their code. FIG. 24 illustrates the configured appearance of the service 230a from a functional perspective.

The routing table for the service 230a defines the destination block for any output from a source block. If a block does not send output to another block (i.e., the block 232b), there is no entry in the routing table. There is no source block for block 232a because block 232a is connecting directly to Twitter. Table 3 illustrates an example of a routing table for the service 230a.

TABLE 3

| Service 230a | |
|---|---|
| Source Block | Destination Block |
| Block 232a | Block 232d |
| Block 232d | Block 232b |

The decoupled nature of the blocks and the flexibility provided by the routing table allow the service 230a to be modified or blocks swapped for other blocks relatively easily. It is understood that any configuration changes and any new blocks must be loaded into the NIO platform (assuming the new blocks are not already there) and then the service 230a must be restarted for changes to take effect. For example, if a user wants to swap the email block 232b for a text message block, block 232b can be replaced with a suitably configured block for sending texts. If the block's name remains the same, the routing table may not even change in some embodiments. If the block's name is different, the routing table needs to be updated, but no other change may be needed. Table 4 illustrates an example of the routing table for the service 230a with the block 232b replaced by a text message block 232g.

TABLE 4

| Service 230a | |
|---|---|
| Source Block | Destination Block |
| Block 232a | Block 232d |
| Block 232d | Block 232g |

If the user wants to send both the text message and the email, then the text message block 232g can be added so that it exists within the service 230a alongside the email block 232b. In this case, the routing table can be updated to include the new block 232g as another destination for source block 232d. Table 5 illustrates an example of the routing table for the service 230a with both block 232a and block 232g.

TABLE 5

| Service 230a | |
|---|---|
| Source Block | Destination Block |
| Block 232a | Block 232d |
| Block 232d | Block 232b, 232g |

Figure 25:
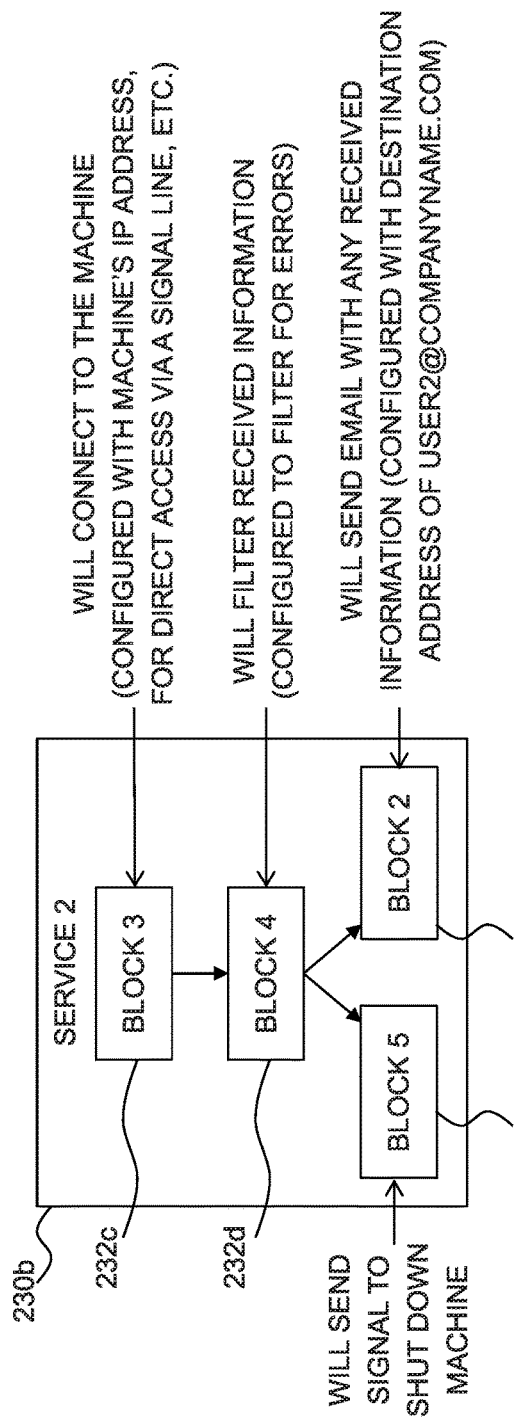
FIG. 25 illustrates another embodiment of a service built using blocks from the environment of FIG. 23.

With additional reference to FIG. 25, one embodiment of the service 230b is illustrated using blocks from the environment 2300 of FIG. 23. Service 230b is created by identifying the needed block classes and defining their order of execution. For example, the block 232c (connecting to the machine) will be followed by the block 232d (filtering against an error list). If an error is detected, the block 232b will send an email to user2@companyname and the block 232e will shut down the machine. The block classes include configurable parameters that allow them to be customized without needing to open the block classes and change their code. FIG. 25 illustrates the configured appearance of the service 230b from a functional perspective. Table 6 illustrates an example of a routing table for the service 230b.

TABLE 6

| Service 230b | |
|---|---|
| Source Block | Destination Block |
| Block 232c | Block 232d |
| Block 232d | Block 232b, 232e |

Figure 26:
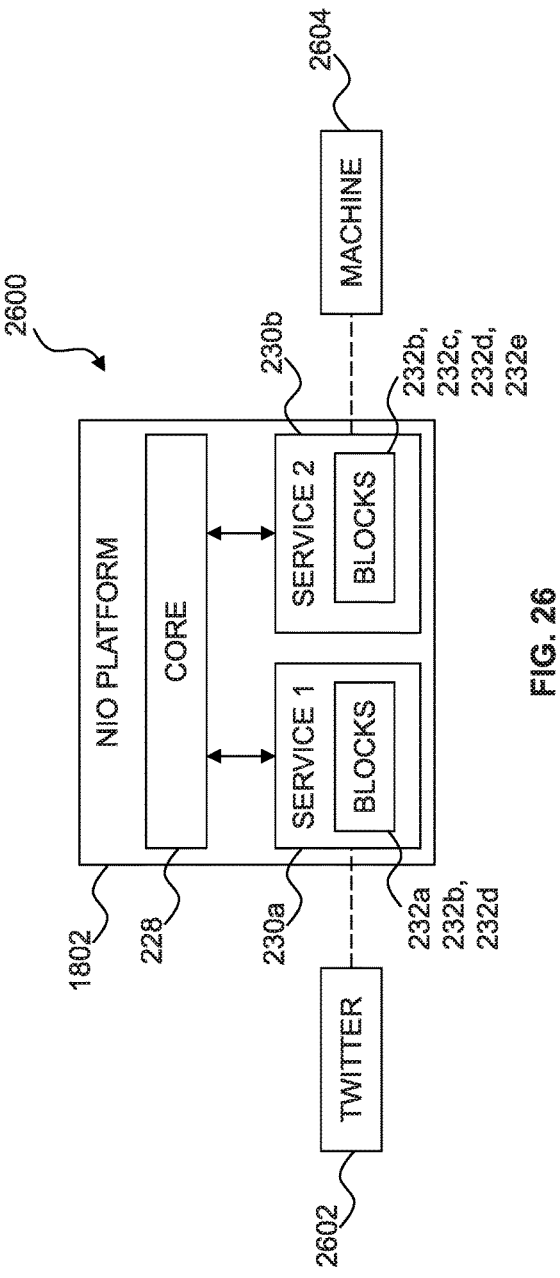
FIG. 26 illustrates an embodiment of an environment in which a NIO platform running the services of FIGS. 24 and 25 is coupled to external sources and/or destinations.

Referring to FIG. 26, one embodiment of the NIO platform 1802 is shown within an environment 2600. The environment 2600 includes access to Twitter 2602 and a machine 2604. As shown, the NIO platform 1802 includes a core 228 and is running the two services 230a and 230b simultaneously. Each service 230a and 230b performs its configured functions independently of the other service.

Figures 27A, 27B:
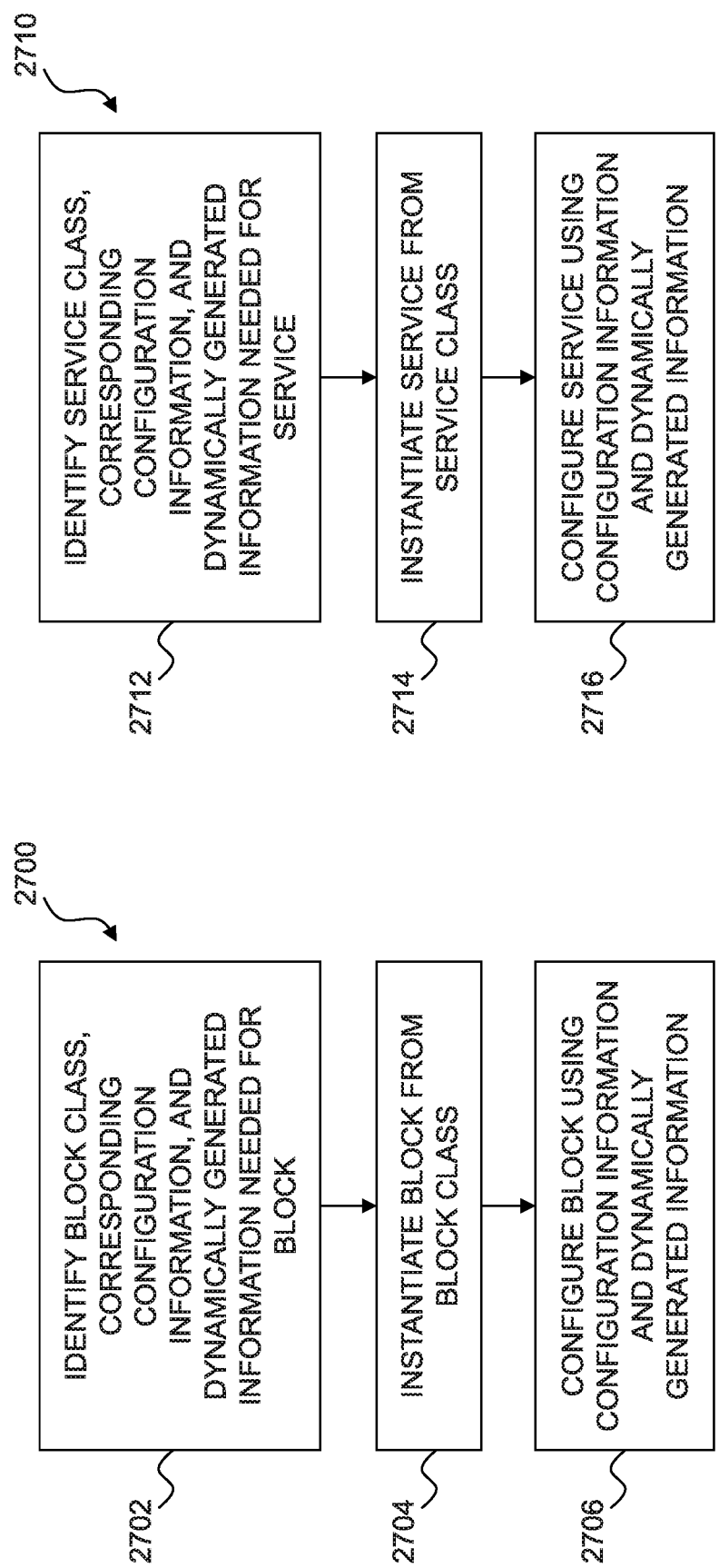
FIG. 27A illustrates one embodiment of a method that may be executed by the NIO platform of FIG. 26 to create and configure a block.
FIG. 27B illustrates one embodiment of a method that may be executed by the NIO platform of FIG. 26 to create and configure a service.

Referring to FIG. 27A, a method 2700 illustrates one embodiment of a process that may be executed by the NIO platform of FIG. 26 to create and configure a block 232. In step 2702, a block class 204 is identified along with the block's corresponding configuration information and dynamically generated information needed for the block 232. In step 2704, the block 232 is instantiated from the block class 204. In step 2706, the block 232 is configured using the corresponding configuration information and dynamically generated information.

Referring to FIG. 27B, a method 2710 illustrates one embodiment of a process that may be executed by the NIO platform of FIG. 26 to create and configure a service 230. In step 2712, a service class 202 is identified along with the service's corresponding configuration information and dynamically generated information needed for the service 230. In step 2714, the service 230 is instantiated from the service class 202. In step 2716, the service 230 is configured using the corresponding configuration information and dynamically generated information.

Referring to FIGS. 28A-28C, various embodiments of development environments 2800, 2810, and 2820 are illustrated. Each development environment 2800, 2810, and 2820 includes the configuration environment 1808 of FIG. 18. The configuration environment 1808 enables users to configure the NIO platform 1802 on a device 124. Accordingly, the configuration environment 1808 provides one or more command line and/or GUI interfaces that may be used to configure the NIO platform 1802 with services and blocks.

The configuration environment 1808 may interact with the NIO platform 1802 using an API such as the API 908 of FIGS. 9A and 9B. As described previously, the API 908 includes a block API, a block configuration API, and a service API. These APIs can be used to create, read, update and delete blocks and services. Accordingly, the configuration environment 1808 may be used to configure the NIO platform 1802 via the API 908 while the NIO platform is running.

In other embodiments, the configuration environment 1808 may enable a user to define a configuration of blocks and services for the NIO platform 1802 without accessing the NIO platform 1802 while the configuration is being defined. The configuration can then be loaded into the NIO platform 1802 at a later time, either through the API 908 when the NIO platform 1802 is running or directly into a memory for later use by the NIO platform 1802 (e.g., when the NIO platform is started or restarted). The memory may be a memory of the device 124, or may be a memory that is remote from the device 124 (e.g., a server or the cloud) but accessible to the NIO platform 1802 for later use.

Referring specifically to FIG. 28A, one embodiment of the development environment 2800 is illustrated. The development environment 2800 includes the configuration environment 1808 of FIG. 18 that can be used to configure the NIO platform 1802 on the device 124. In the present example, the configuration environment 1808 is provided as an API client 2802 that is running within a browser or other application 2804. The API client 2802 is able to interact directly with the NIO platform 1802 and can either configure the NIO platform 1802 while the instance is running (e.g., via the REST interface 908) or before the instance is launched (e.g., by saving the configuration into a memory accessible to the NIO platform 1802). The direct interaction via the API client 2802 enables the NIO platform 1802 to be directly configured any time the NIO platform can be accessed.

Referring specifically to FIG. 28B, one embodiment of the development environment 2810 is illustrated. The development environment 2810 includes the configuration environment 1808 of FIG. 18 that can be used to configure the NIO platform 1802 on the device 124. In the present example, the configuration environment 1808 is part of the NIO platform 1802 and enables a user to configure the NIO platform 1802 any time the NIO platform can be accessed.

Referring specifically to FIG. 28C, one embodiment of the development environment 2820 is illustrated. The development environment 2820 includes the configuration environment 1808 of FIG. 18 that can be used to configure the NIO platform 1802 on the device 124. In the present example, the configuration environment 1808 is provided as a server/cloud application or service. The configuration environment 1808 may be configured to interact directly with the NIO platform 1802 or may be configured to enable a platform configuration to be created/modified and then later transferred to the NIO platform 1802.

Figure 29:
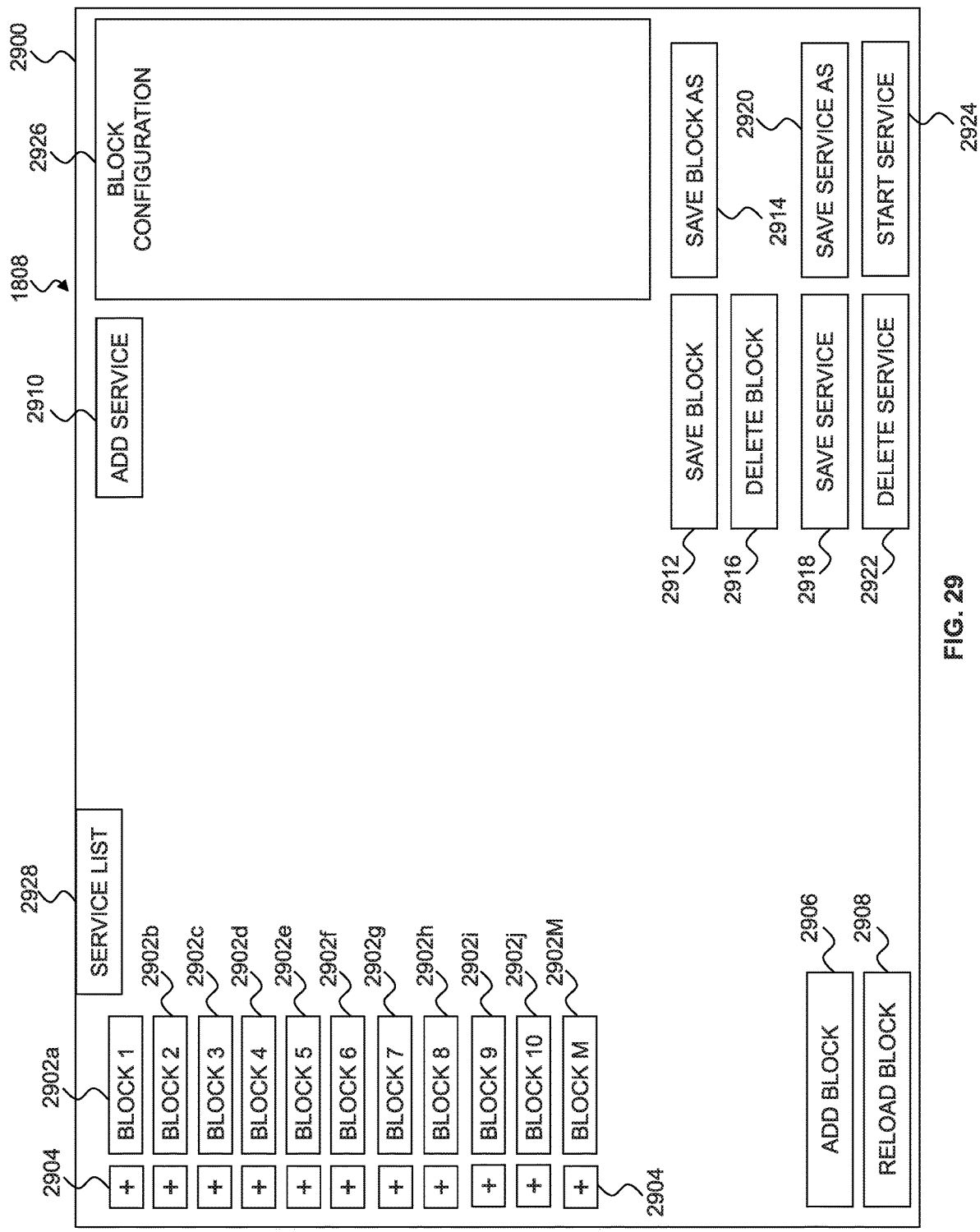
FIGS. 29-40 illustrate embodiments of a graphical user interface (GUI) that may be provided by the development environment of FIGS. 28A-28C.

Referring to FIG. 29, one embodiment of the configuration environment 1808 is illustrated. The configuration environment 1808 includes a GUI 2900 that enables a user to create and/or edit services 230 and blocks 232 (not shown). The configuration environment 1808 produces configuration files that are used by services 230 and blocks 232 as previously described. For purposes of example, the configuration environment 1808 is accessing the NIO platform 1802 as illustrated in FIG. 28A and the NIO platform 1802 is running. However, similar or identical steps may be used when creating a configuration for a NIO platform that is not running or is not currently accessible by the configuration environment 1808. In such embodiments, the output of the configuration environment 1808 may be saved and later transferred to or otherwise accessed by the NIO platform 1802.

The GUI 2900 includes block buttons 2902a-2902M that correspond to various blocks in a library (e.g., the library 1804 of FIG. 18). For purposes of example, the block buttons 2902a-2902j correspond to blocks 232a-232j of FIG. 23. Additional blocks are represented by block button 2902M. Some or all of the block buttons 2902a-2902M correspond to toggles 2904, which will be described later in greater detail.

An "Add Block" button 2906 enables a user to add a block to the NIO platform 1802 without restarting the platform instance. A "Reload Block" button 2908 enables a user to reload a block in the platform instance without restarting the platform instance. An "Add Service" button 2910 enables a user to add a service to a platform configuration. A "Save Block" button 2912 enables a user to save a block configuration. A "Save Block As" button 2914 enables a user to save a block configuration under a different name. A "Delete Block" button 2916 enables a user to delete a block from a service.

A "Save Service" button 2912 enables a user to save a service configuration. A "Save Service As" button 2914 enables a user to save a service configuration under a different name. A "Delete Service" button 2916 enables a user to delete a service from a platform configuration. A "Start Service" button 2924 enables a user to start a service on the NIO platform 1802. In embodiments where the configuration environment 1808 is not interacting directly with a running NIO platform instance, the "Start Service" button 2924 may not be present, may be deactivated so that a user cannot interact with it, or may be used to set a configuration value that is later used to start the service when the NIO platform 1802 is accessible.

A block configuration pane 2926 provides a display area within which configuration values can be assigned to block parameters, as will be described later in greater detail. A "Service List" button 2928 provides a "home" button that can be used to return to a list of services that the platform instance is configured to run.

Figure 30:
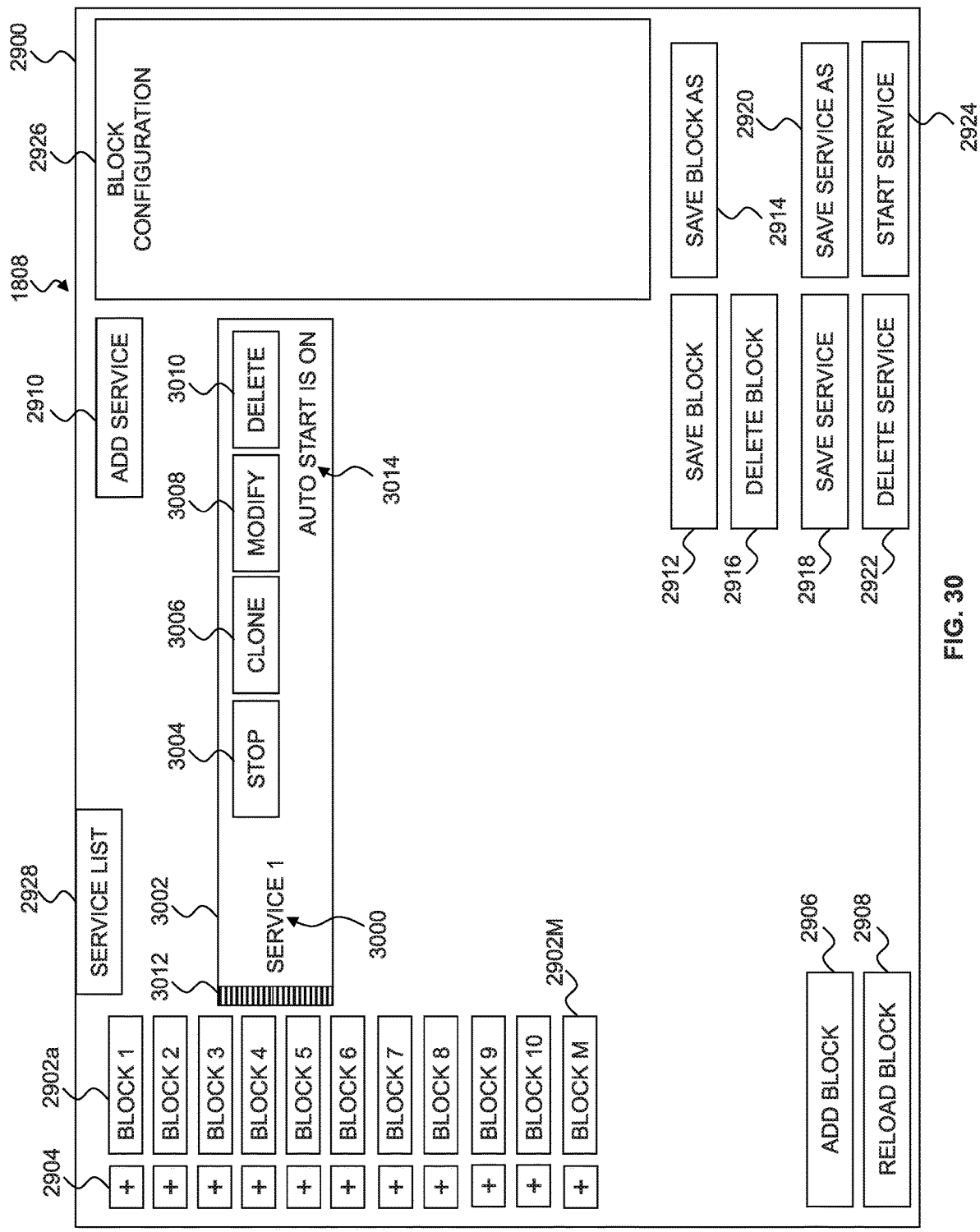

Referring to FIG. 30, one embodiment of the GUI 2900 is illustrated after the "Add Service" button 2910 has been selected to create a new service. A service pane 3002 represents the new service that has been created. As indicated by the service pane 3002, the new service is named "Service 1" (denoted by reference number 3000) and for purposes of example is the service 230a of FIG. 22. The service pane 3002 includes multiple buttons that can be used to affect the service 230a. A "Stop" button 3004 enables a user to stop the service 230a when the service is running. A "Clone" button 3006 enables a user to create a duplicate of the service 230a. A "Modify" button 3008 enables a user to edit the service 230a. A "Delete" button 3010 enables a user to remove the service 230a from the NIO platform 1802.

An indicator 3012 may be used visually indicate a current status (e.g., running or stopped) of the service 230a. For example, in FIG. 30, the indicator 3012 may be red in color to indicate that the service 230a is currently stopped. If the service 230a is started, the indicator 3012 may change color (e.g., to green) to indicate that the service 230a is currently running. The service pane 3002 may also indicate via text or in another manner whether the service 230a is set to auto start. In the current example, the text (denoted by reference number 3014) indicates that the service 230a is set to auto start.

Figure 31:
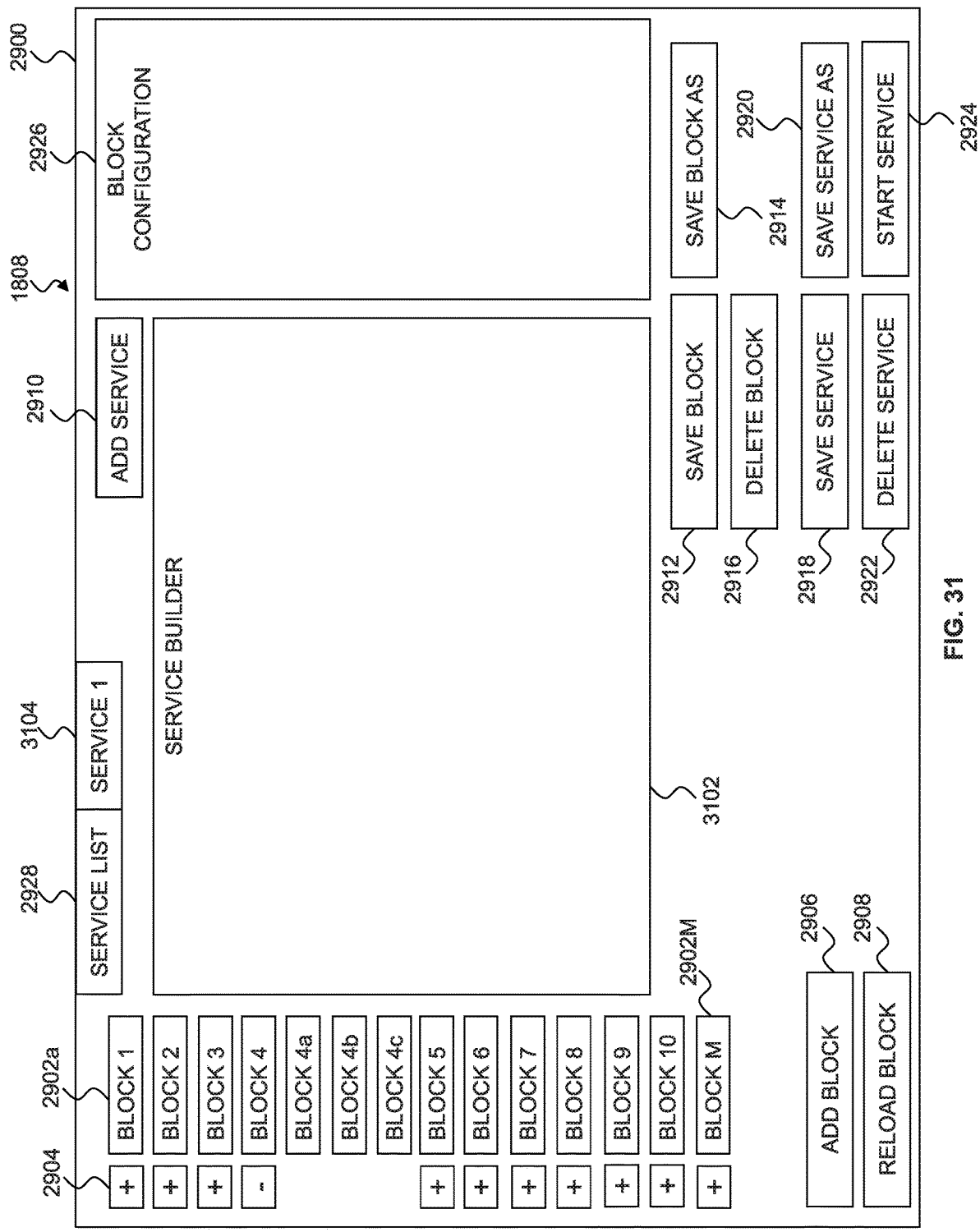

Referring to FIG. 31, one embodiment of the GUI 2900 is illustrated after the "Modify" button 3008 has been selected to edit the service 230a. A service builder pane 3102 is now visible. In addition, a selectable tab 3104 for "Service 1" may be added to indicate the current service for which the service builder pane 3102 is being viewed and/or to enable a user to return to the service builder pane 3102 for the service 230a if at another location in the configuration environment 1808.

Also illustrated in FIG. 31 is the function of the toggles 2904 that correspond to the block buttons 2902a-2902M. Each block button 2902a-2902M represents a block that is based on a particular block class. For example, the block button 2902d corresponds to a Block 4 (as described with respect to the service 230a in FIGS. 23 and 24). However, there may be different configurations saved for that Block 4. Continuing the example of FIGS. 23 and 24, the filter block 232d is configured to filter for the term "companyname," which is defined as a value for a configurable parameter. Other filter configurations for Block 4 may contain other values for the same configurable parameter.

Accordingly, actuating the toggle 2904 next to the Block 4 reveals the various configurations that are available for Block 4. The present example includes three configurations for Block 4: Block 4a, Block 4b, and Block 4c. For purposes of illustration, Block 4b is the configuration that corresponds to the desired functionality for block 232d. In other words, Block 4b is already configured to filter for "companyname." It is understood that a block button 2902a-2902M corresponding to a block that has no configuration or only a single configuration may not have a corresponding toggle 2904 or, if there is a corresponding toggle 2904, actuating the toggle 2904 may have no affect (e.g., no configurations would be displayed).

Figure 32:
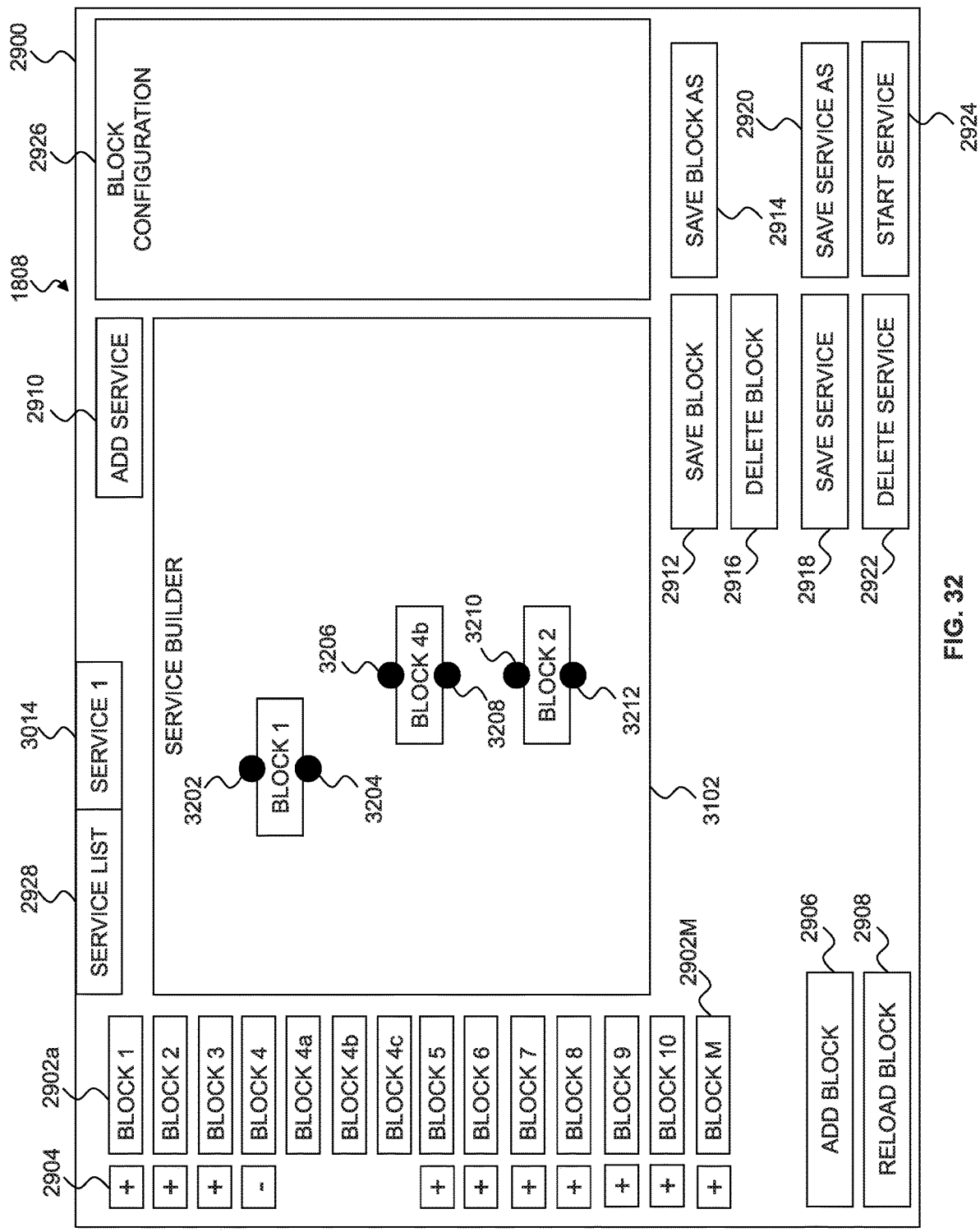

Referring to FIG. 32, one embodiment of the GUI 2900 is illustrated after Block 1, Block 4b, and Block 2 have been selected for the service 230a. Block 1, Block 4b, and Block 2 correspond to blocks 232a, 232d, and 232b of FIG. 24, respectively. As a result of being selected, Block 1, Block 4b, and Block 2 are now visible in the service builder pane 3102.

In the GUI 2900, each Block 1, Block 4b, and Block 2 is illustrated with at least one entry point and at least one exit point. For example, Block 1 includes an entry point 3202 and an exit point 3204. Block 4b includes an entry point 3206 and an exit point 3208. Block 2 includes an entry point 3210 and an exit point 3212. Although not shown, a block with multiple entry and/or exit points may display the multiple points and, in some embodiments, mark them so that a user can distinguish between the points if needed.

Figure 33:
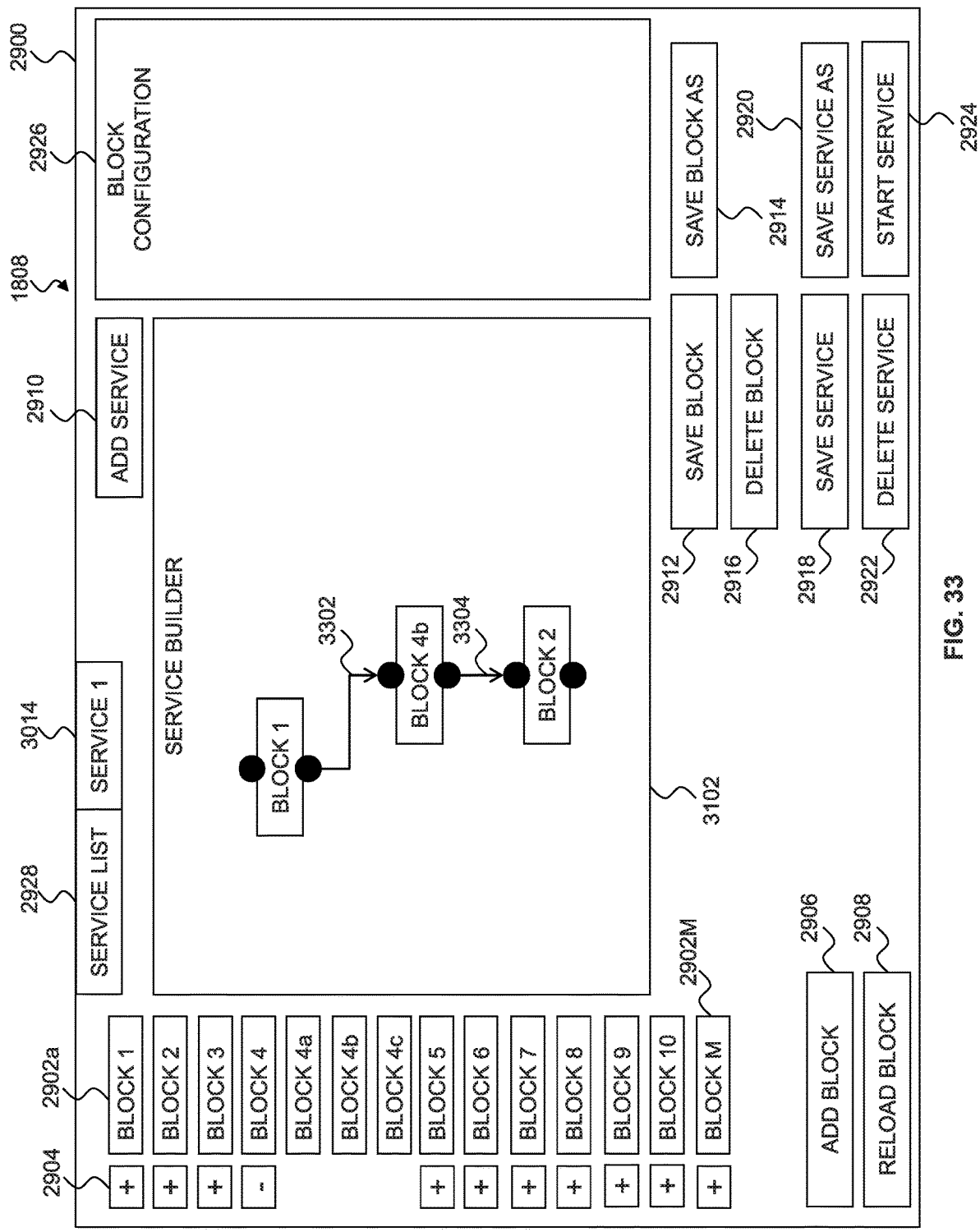

Referring to FIG. 33, one embodiment of the GUI 2900 is illustrated after Block 1. Block 4b, and Block 2 have been connected. More specifically, the exit point 3204 of Block 1 is connected to the entry point 3206 of Block 4b by a line 3302, with an arrow indicating the direction of flow. Accordingly, any niograms output by Block 1 are to flow to Block 4b. Similarly, the exit point 3208 of Block 4b is connected to the entry point 3210 of Block 2 by a line 3304, with an arrow indicating the direction of flow. Accordingly, any niograms output by Block 4b are to flow to Block 2.

To create these connections, a user may interact with the service builder pane 3102, dragging a line from an exit point to an entry point or using other processes to create a flow between various blocks. The configuration environment 1808 then creates the needed logic for the service 230a. This logic defines the source and destination blocks for the service 230a, such as are illustrated in the routing table of Table 3.

Figure 34:
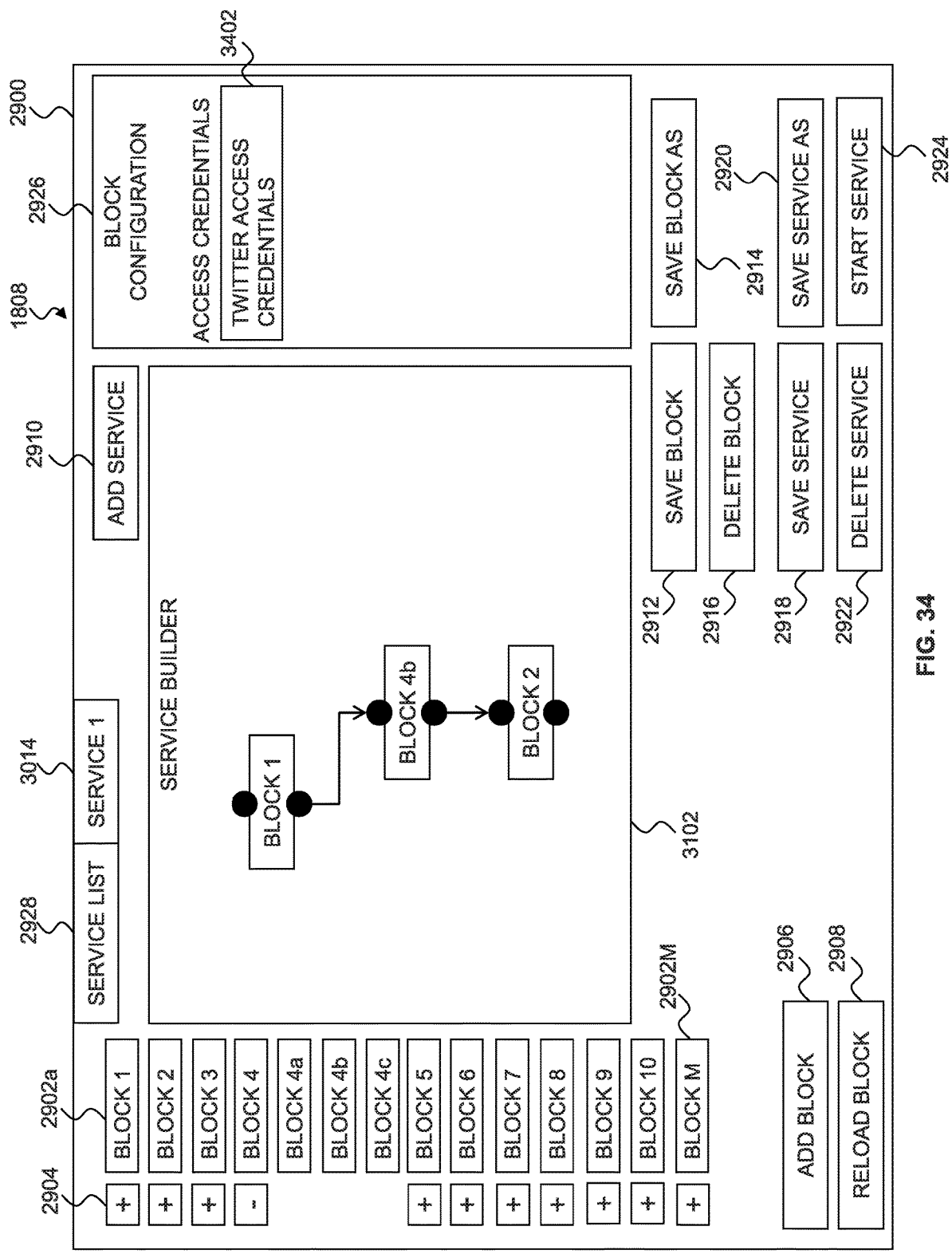

Referring to FIG. 34, one embodiment of the GUI 2900 is illustrated after Block 1 has been selected. As shown in the block configuration pane 2926, Block 1 (which corresponds to block 232a of FIG. 24), has a configuration parameter 3402 for access credentials needed to access Twitter. Any needed access credential values are entered, which enables the block 232a to access Twitter. The "Save Block" button 2912 may then be selected to save the configuration for Block 1. In the present example, this will save a configuration file for Block 1 that includes the configuration information and the name of the service 230a to which the block belongs.

Figure 35:
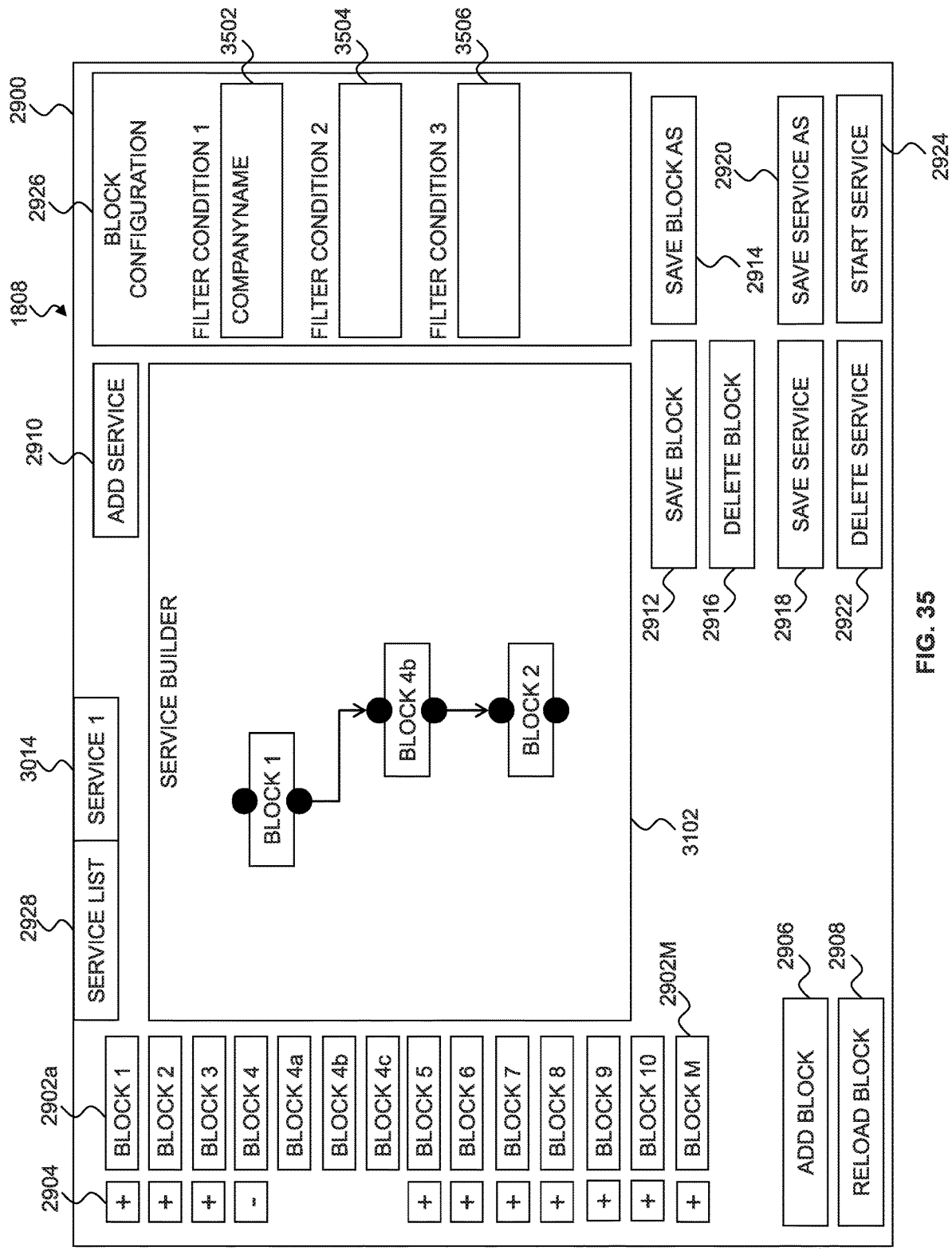

Referring to FIG. 35, one embodiment of the GUI 2900 is illustrated after Block 4b has been selected. As shown in the block configuration pane 2926. Block 4b (which corresponds to block 232d of FIG. 24), has a configuration parameter 3502 that is set with the configuration value of "companyname." Other filter conditions may be set if desired as illustrated by configuration parameter fields 3504 and 3506, but these fields are empty as default values in the present example. The "Save Block" button 2912 may then be selected to save the configuration for Block 4b. In the present example, this will save a configuration file for Block 4b that includes the configuration information and the name of the service 230a to which the block belongs.

Figure 36:
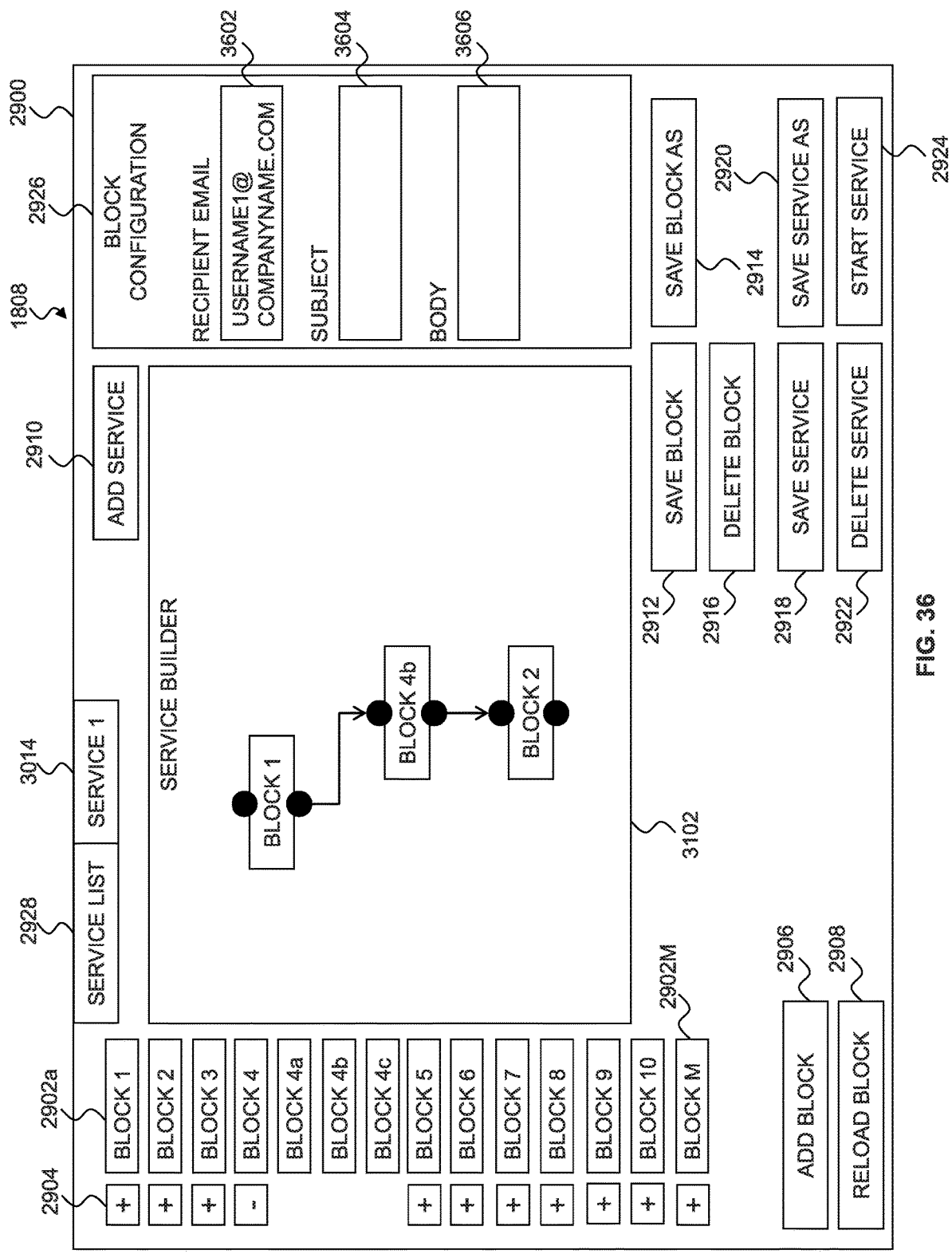

Referring to FIG. 36, one embodiment of the GUI 2900 is illustrated after Block 2 has been selected. As shown in the block configuration pane 2926. Block 2 (which corresponds to block 232b of FIG. 24), has a configuration parameter 3602 for a recipient email address. The value "usemame1@company.com" has been entered into this field. Other configurable parameters available as indicated by a field 3604 for a subject of the email and a field 3606 for a body of the email. These additional fields are empty as default values in the present example. The "Save Block" button 2912 may then be selected to save the configuration for Block 2. In the present example, this will save a configuration file for Block 2 that includes the configuration information and the name of the service 230a to which the block belongs.

After the configuration of the Blocks 1, 4b, and 2 or at any time during the configuration, the service 230a may be saved by selecting the "Save Service" button 2918. This will save the configuration of the service 230a, including the blocks used by the service and their order of execution. In the present example, a configuration file containing this information will be saved for the service 230a. The service 230a may also be started at this time by selecting the "Start Service" button 2924.

Figure 37:
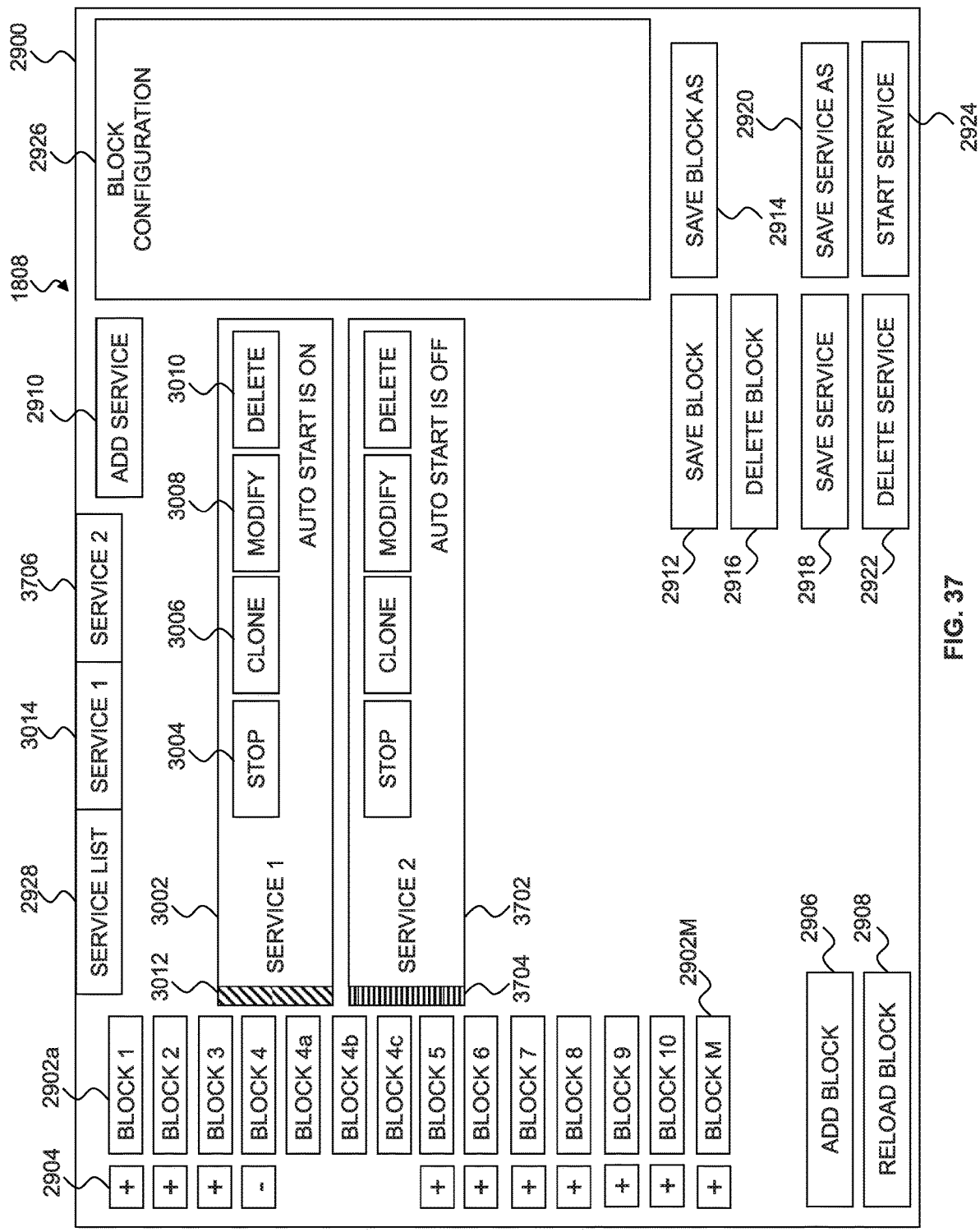

Referring to FIG. 37, one embodiment of the GUI 2900 is illustrated with the service pane 3002 and a new service pane 3702 for a Service 2. For purposes of example, Service 2 corresponds to the service 230b of FIG. 25. It is noted that the service 230a is now running and the indicator 3012 has changed color to green. The service pane 3702 includes an indicator 3704 that is currently red because the service 230b is not running. A tab 3706 has been added for Service 2.

Figure 38:
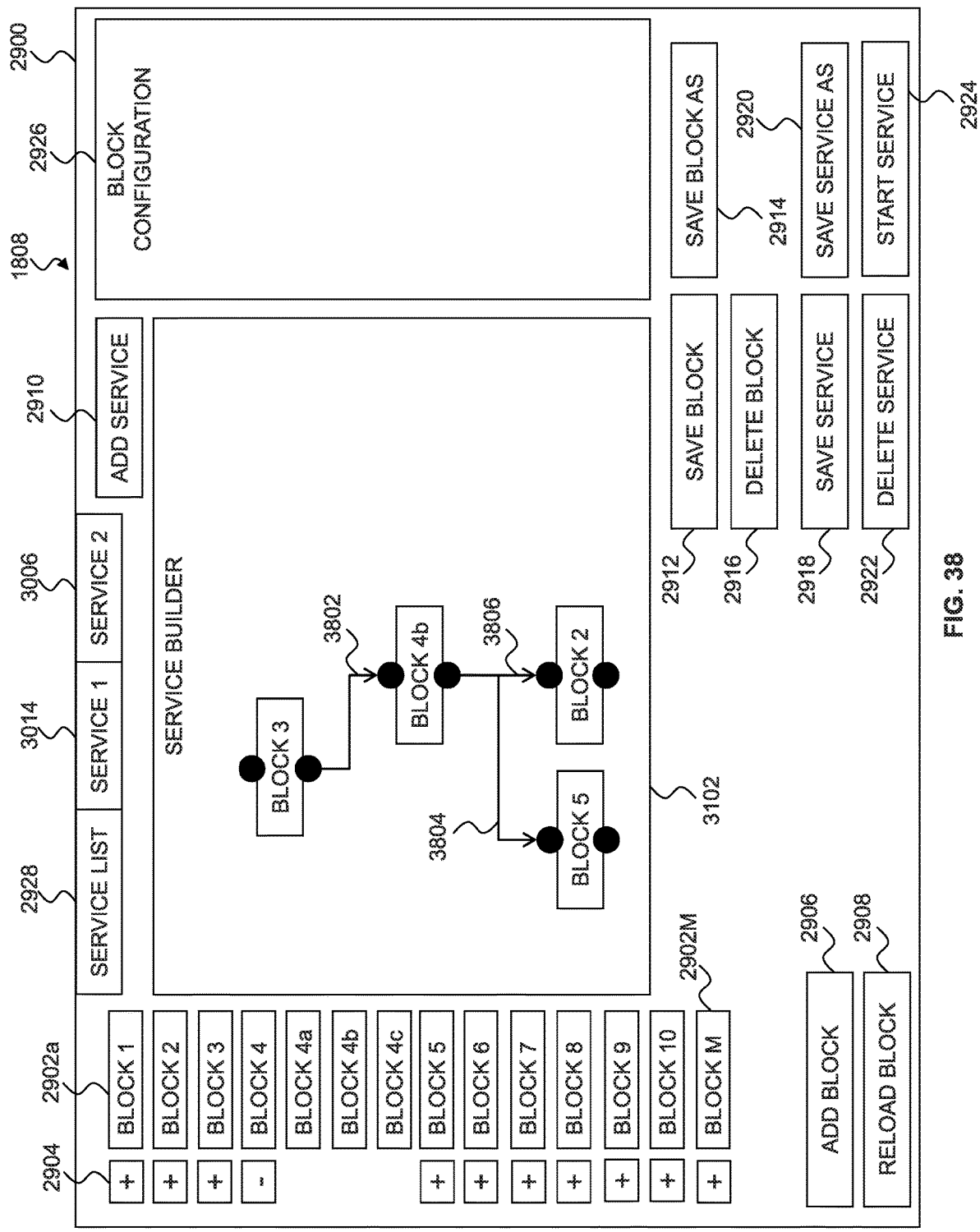

Referring to FIG. 38, one embodiment of the GUI 2900 is illustrated after the service 230b has been configured. More specifically, after being created, the service 230b can be configured using a similar process to that described previously for the service 230a. Accordingly, following this configuration process, the service builder pane 3102 illustrates that Block 3 (corresponding to block 232c). Block 4b (corresponding to block 232d). Block 5 (corresponding to block 232e), and Block 2 (corresponding to block 232b) have been selected and connected.

Block 3 is connected to Block 4b by a line 3802, with an arrow indicating the direction of flow. Block 4b is connected to Block 5 by a line 3804, with an arrow indicating the direction of flow. Block 4b is also connected to Block 2 by a line 3806, with an arrow indicating the direction of flow.

Figure 39:
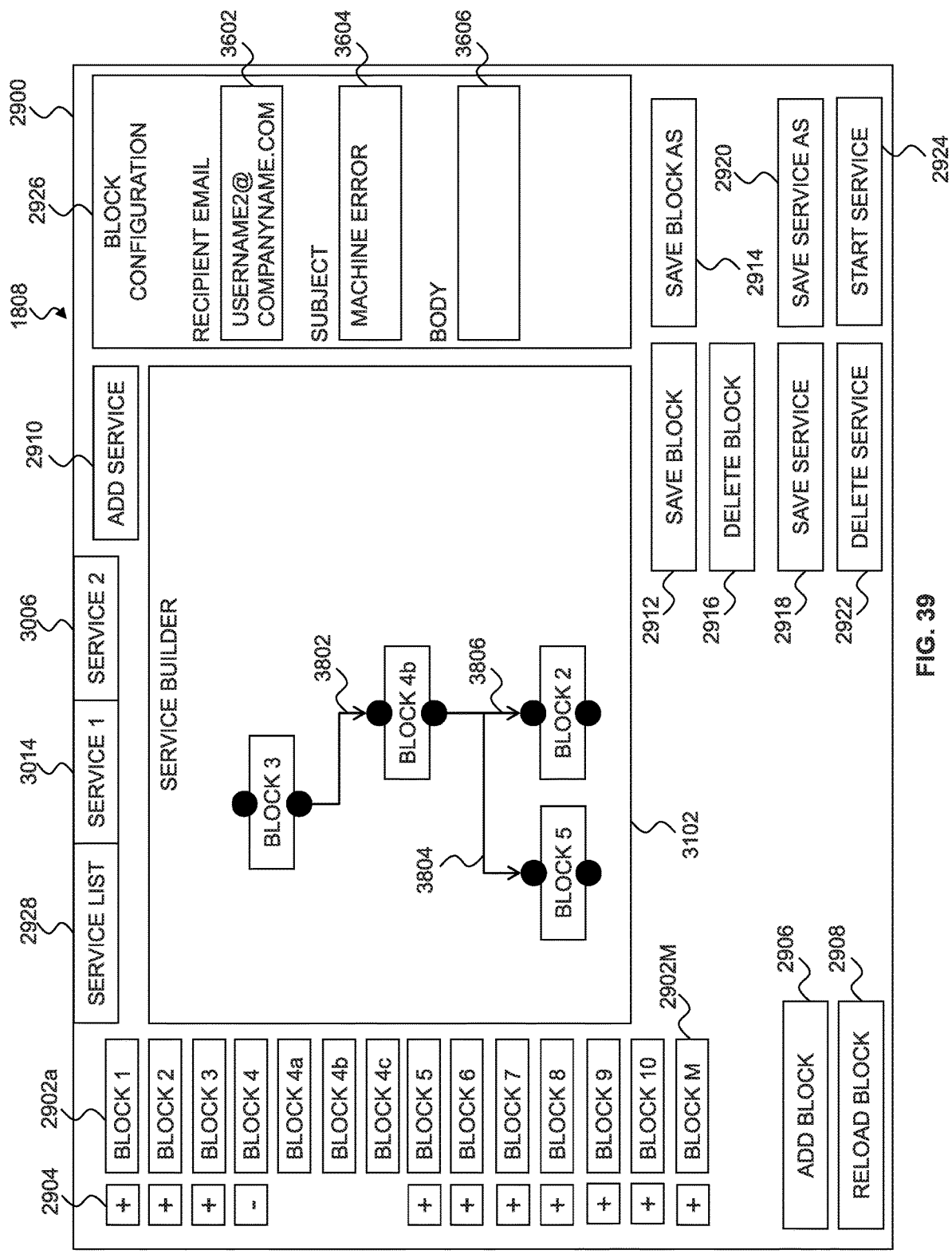

Referring to FIG. 39, one embodiment of the GUI 2900 is illustrated after Block 2 has been selected for service 230b. As described with respect to FIGS. 24 and 25, block 232b is to send an email to the address for which it is configured. In the service 230a, the destination address is usemame1@companyname.com. However, in the service 230b, the destination address is username2@companyname.com. Accordingly, for the service 230b, the value "username2@company.com" has been entered into the field for the configuration parameter 3602. In addition, the text "Machine Error" has been entered into the subject field 3604, so that any email sent by the service 230b to the address username2@companyname.com will contain the words "Machine Error" in the email's subject line.

Figure 40:
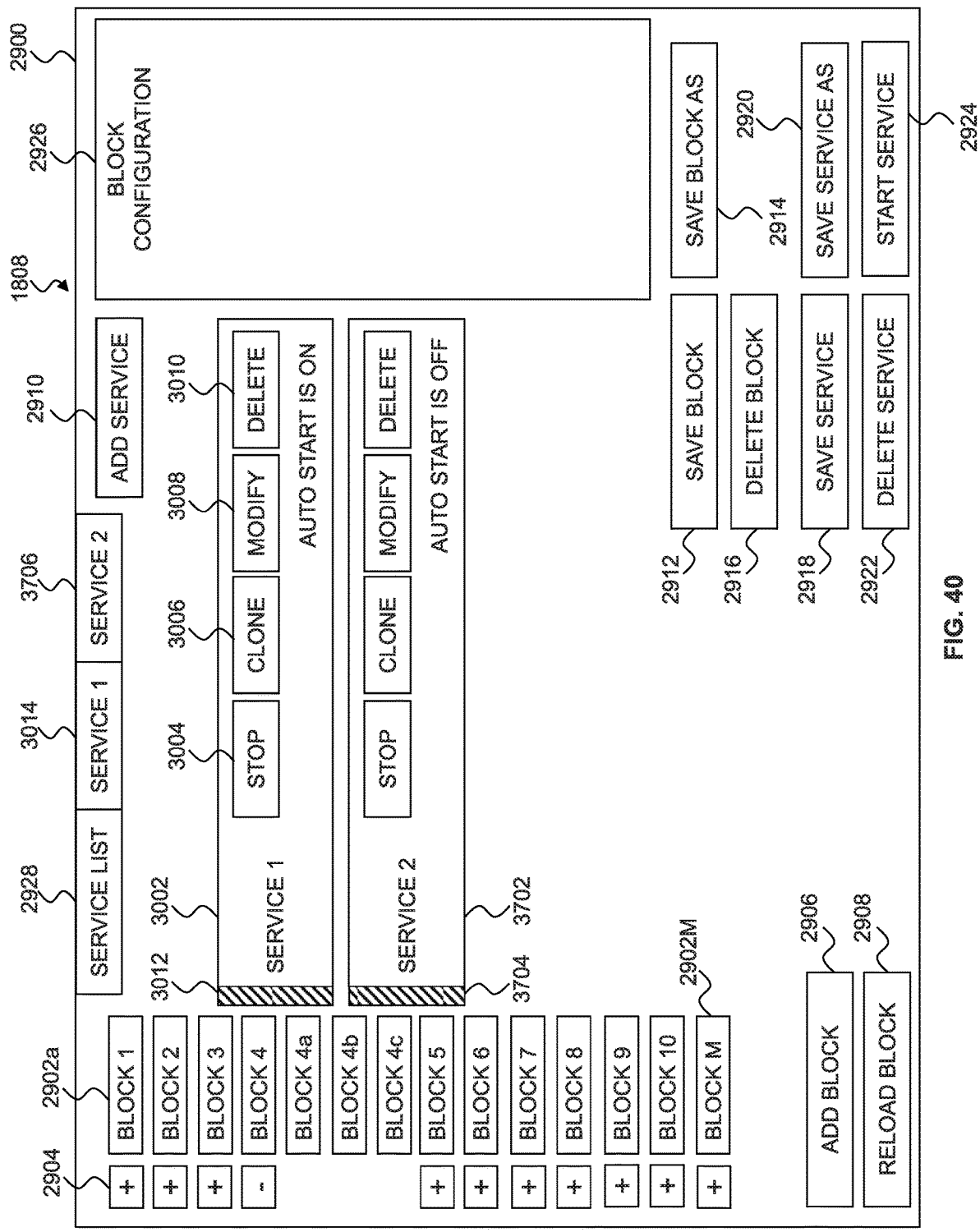

Referring to FIG. 40, one embodiment of the GUI 2900 is illustrated after the service 230b has been configured and saved. The service 230b can now be started, which will change the indicator 3704 to green as shown. This will result in both services 232a and 232b running as shown in FIG. 26.

If the GUI 2900 is closed and reopened for the NIO platform 1802, any services loaded onto the NIO platform may be displayed. For example, in FIG. 29, no services are initially displayed when the GUI 2900 is opened because the NIO platform 1802 has not yet been configured to run any services. However, after the services 232a and 232b have been configured as described, opening the GUI 2900 will display the services 232a and 232b as illustrated in FIG. 40, along with the current status of each service as running or stopped. In embodiments where the configuration environment 1808 is not connected directly to a running NIO platform, an existing configuration may need to be selected and opened before any services will be shown.

Figure 41:
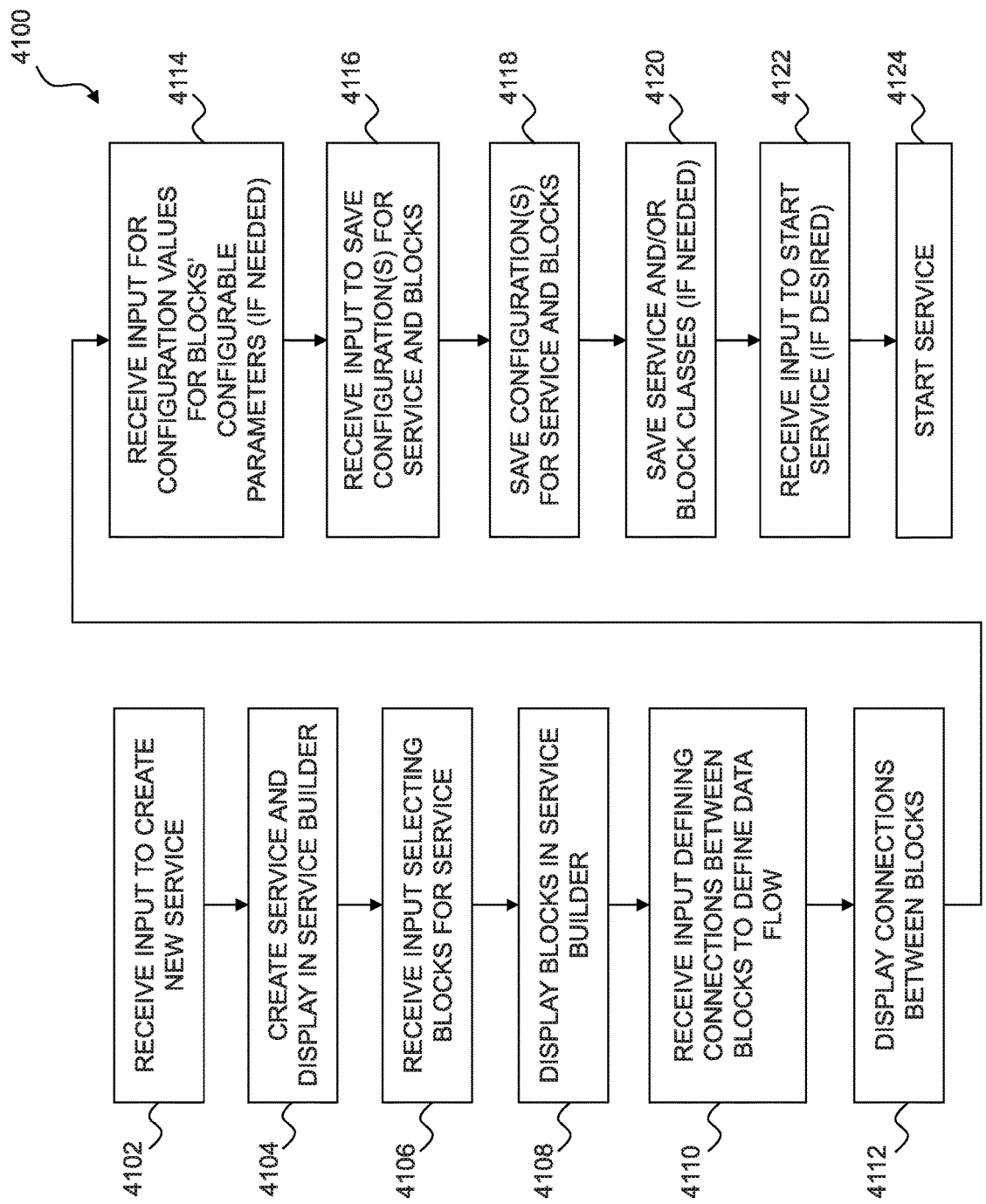

Referring to FIG. 41, a method 4100 illustrates one embodiment of a process that may be executed within a development environment, such as one of the development environments 2800 of FIG. 28A. 2810 of FIG. 28B, and 2820 of FIG. 28C. The method 4100 may be used to create and configure a new service on the NIO platform 1802 using a GUI, such as the GUI 2900 of FIG. 29, that is part of the configuration environment 1808 of FIG. 18.

In step 4102, input is received via the GUI 2900 to create a new service. In step 4104, the configuration environment 1808 creates the new service and displays the new service in the service builder. In step 4106, input is received via the GUI 2900 selecting blocks to be used in the service. In step 4108, the configuration environment 1808 displays the blocks in the service builder. In step 4110, input is received defining connections between the blocks to define one or more data flow paths through the service. In step 4112, the configuration environment 1808 displays the connections in the service builder.

In step 4114, input may be received for configuration values to be assigned to the configuration parameters for one or more of the blocks. In step 4116, input is received to save the service and block configurations. In step 4118, the configuration environment 1808 saves the service and block configurations. In step 4120, the configuration environment 1808 saves the service and/or block classes if needed. For example, the configuration environment 1808 may load the service and/or block classes into the NIO platform 1802 using the REST API 908, or may save the service and/or block classes to a defined memory location for later use by the NIO platform 1802.

In step 4122, input may be received to start the service. For example, if the NIO platform 1802 is running and the configuration environment 1808 is communicating via the REST API 908, the GUI 2900 may be used to start the service. Accordingly, in step 4124, the configuration environment 1808 may start the service on the NIO platform 1802.

It is understood that, although not shown, steps may be repeated during the execution of the method 4100 and/or steps may be performed in an order different from that shown. For example, a single block may be added, configured, and saved (steps 4106, 4108, 4114, 4116, and 4118), and then another block may be added, configured, and saved (repeating steps 4106, 4108, 4114, 4116, and 4118). The blocks may then be connected (steps 4110 and 4112). Accordingly, it is understood that many variations of the illustrated steps of the method 4100 may be used.

Figure 42:
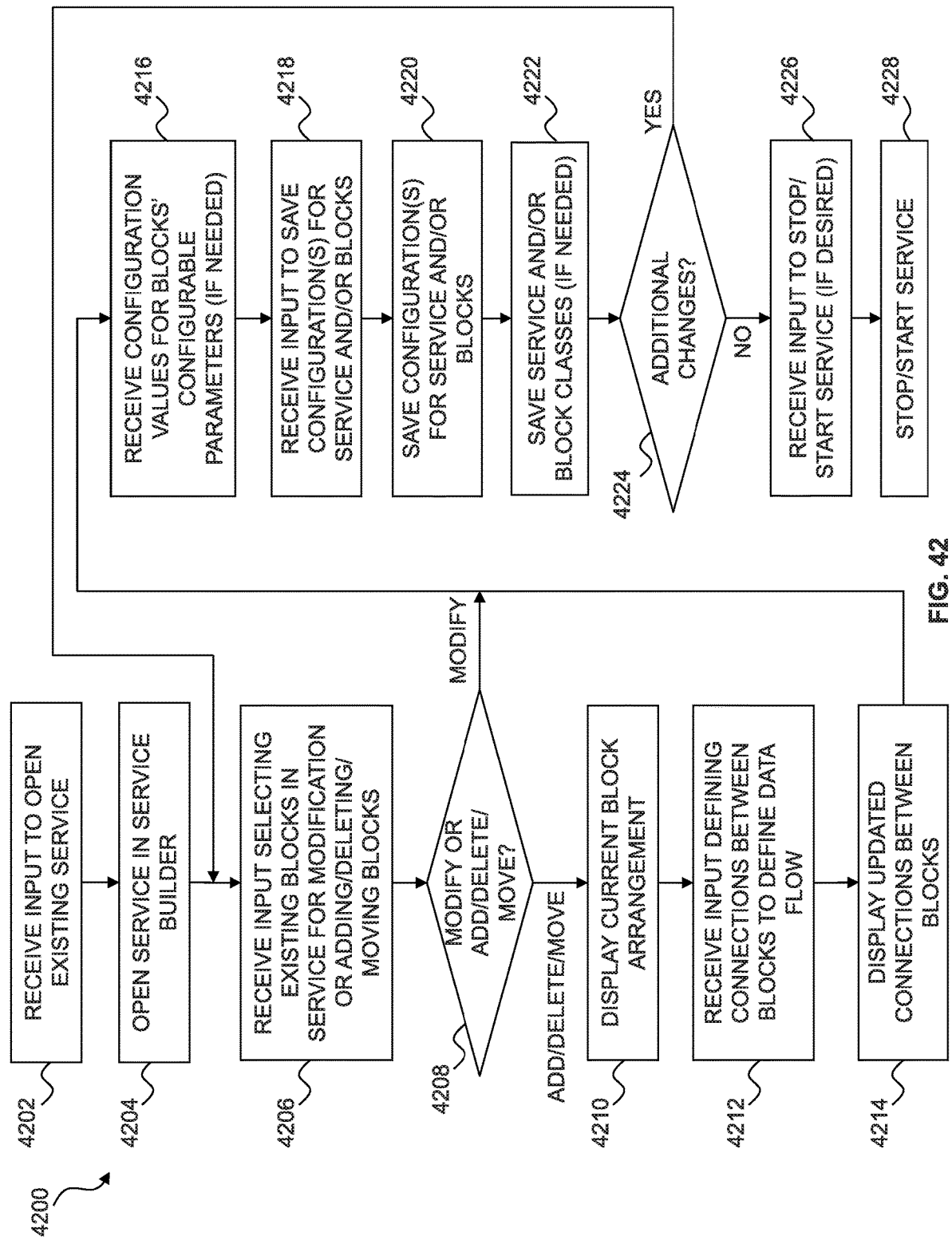

Referring to FIG. 42, a method 4200 illustrates one embodiment of a process that may be executed within a development environment, such as one of the development environments 2800 of FIG. 28A, 2810 of FIG. 28B, and 2820 of FIG. 28C. The method 4200 may be used to modify an existing service on the NIO platform 1802 using a GUI, such as the GUI 2900 of FIG. 29, that is part of the configuration environment 1808 of FIG. 18.

In step 4202, input is received via the GUI 2900 to open an existing service. The existing service may be opened via the REST API 908 of the NIO platform 1802, or may be opened from a saved configuration that is accessed at a defined memory location (e.g., a hard drive on which the existing service configuration is stored). In step 4204, the configuration environment 1808 opens the service and displays the service in the service builder. In step 4206, input is received via the GUI 2900 selecting one or more existing blocks to be modified, deleted, or moved. The input may also be for adding one or more new blocks. In step 4208, a determination is made as to the input received in step 4206.

If the determination of step 4208 indicates that a new block was added or an existing block was deleted or moved, the method 4200 moves to step 4210. In step 4210, the configuration environment 1808 displays the current arrangement of blocks in the service builder. In step 4212, input is received defining connections between the blocks to define one or more data flow paths through the service. In step 4214, the configuration environment 1808 displays the updated connections in the service builder. The method 4200 then moves to step 4216, where the blocks can be configured if desired.

If the determination of step 4208 indicates that an existing block was modified, the method 4200 moves to step 4216. In step 4216, input is received for configuration values to be assigned to the configuration parameters for one or more of the blocks. In step 4218, input is received to save the service and/or block configurations. In step 4220, the configuration environment 1808 saves the service and/or block configurations. In step 4222, the configuration environment 1808 save the service and/or block classes if needed. For example, the configuration environment 1808 may load the service and/or block classes into the NIO platform 1802 using the REST API 908, or may save the service and/or block classes to a defined memory location for later use by the NIO platform 1802.

In step 4224, a determination is made as to whether additional changes are to be made to the service. For example, input may be received indicating another block is to be modified, added, deleted, or moved. If the determination of step 4224 indicates that an additional change is to be made, the method 4200 returns to step 4206 to handle the change. If the determination of step 4224 indicates that no additional changes are to be made, the method 4200 moves to step 4226.

In step 4226, input may be received to stop and/or start the service. For example, if the NIO platform 1802 is running and the configuration environment 1808 is communicating via the REST API 908, the GUI 2900 may be used to stop the service (if the service is running) or start the service (if the service is stopped). As described previously, changes to the service may not take effect until the service is stopped and restarted. Accordingly, if the method 4200 was executed while the service was still running on the NIO platform 1802, the service needs to be stopped and restarted. If the service is already stopped, the service can be started. Although not shown, it is understood that the service can be stopped at any time before or during the method 4200. Accordingly, in step 4228, the configuration environment 1808 may stop and/or start the service on the NIO platform 1802.

As with the method 4100 of FIG. 41, it is understood that, although not shown, steps may be repeated during the execution of the method 4200 and/or steps may be performed in an order different from that shown. Accordingly, it is understood that many variations of the illustrated steps of the method 4200 may be used.

Referring to FIG. 43, a method 4300 illustrates one embodiment of a process that may be executed within a development environment, such as one of the development environments 2800 of FIG. 28A, 2810 of FIG. 28B, and 2820 of FIG. 28C. The method 4300 may be used to save service and/or block configurations to the NIO platform 1802 using a GUI, such as the GUI 2900 of FIG. 29, that is part of the configuration environment 1808 of FIG. 18.

In step 4302, input is received to save the service and/or block configurations. In the present example, the NIO platform 1802 is running and the configuration environment 1808 is communicating with the NIO platform 1802 via the REST API 908. Accordingly, in step 4304, the configuration environment 1808 saves the service and/or block configurations to the NIO platform 1802 via the REST API 908. In step 4306, the configuration environment 1808 saves the service and/or block classes if needed. In the present example, the configuration environment 1808 would load the service and/or block classes into the NIO platform 1802 using the REST API 908.

Referring to FIG. 44, a method 4400 illustrates one embodiment of a process that may be executed within a development environment, such as one of the development environments 2800 of FIG. 28A, 2810 of FIG. 28B, and 2820 of FIG. 28C. The method 4400 may be used to save service and/or block configurations to the NIO platform 1802 using a GUI, such as the GUI 2900 of FIG. 29, that is part of the configuration environment 1808 of FIG. 18.

In step 4402, input is received to save the service and/or block configurations. In the present example, the configuration environment 1808 is not communicating with the NIO platform 1802. Accordingly, in step 4404, the configuration environment 1808 saves the service and/or block configurations to a defined memory location. In step 4406, the configuration environment 1808 saves the service and/or block classes if needed. In the present example, the configuration environment 1808 would save the service and/or block classes to a defined memory location for later use by the NIO platform 1802.

Referring to FIG. 45, a method 4500 illustrates one embodiment of a process that may be executed within a development environment, such as one of the development environments 2800 of FIG. 28A, 2810 of FIG. 28B, and 2820 of FIG. 28C. The method 4500 may be used to configure the NIO platform 1802 using a GUI, such as the GUI 2900 of FIG. 29, that is part of the configuration environment 1808 of FIG. 18.

In step 4502, the configuration environment 1808 is provided with the GUI 2900 and library 1804 of FIG. 18. In step 4504, input is received via the GUI 2900 for configuration information for the NIO platform 1802. In step 4506, the configuration environment 1808 converts the configuration information into service and/or block configurations usable by the NIO platform 1802. In step 4508, the configuration environment 1808 saves the service and/or block configurations. For example, the configuration environment 1808 may load the service and/or block classes into the NIO platform 1802 using the REST API 908, or may save the service and/or block classes to a defined memory location for later use by the NIO platform 1802.

While the preceding description shows and describes one or more embodiments, it will be understood by those skilled in the art that various changes in form and detail may be made therein without departing from the spirit and scope of the present disclosure. For example, various steps illustrated within a particular flow chart may be combined or further divided. In addition, steps described in one diagram or flow chart may be incorporated into another diagram or flow chart. Furthermore, the described functionality may be provided by hardware and/or software, and may be distributed or combined into a single platform. Additionally, functionality described in a particular example may be achieved in a manner different than that illustrated, but is still encompassed within the present disclosure. Therefore, the claims should be interpreted in a broad manner, consistent with the present disclosure.

For example, in one embodiment, a method for creating a configuration for a platform instance that is to be used on a digital device includes creating, within a development environment having a graphical user interface (GUI), a service to be run by the platform instance; providing, via the GUI, a graphical representation of a block library containing a plurality of available blocks that are available for use by the service, wherein each available block contains first executable code that provides task specific functionality and second executable code that enables the block to function within the platform instance; receiving, via the GUI, input identifying at least some of the available blocks as selected blocks, wherein the selected blocks are to be run by the service; receiving, via the GUI, input arranging the selected blocks into an order of execution that defines which of the selected blocks are to receive output produced by others of the selected blocks when run by the service; generating, by the development environment, at least one configuration file for use by the platform instance, wherein the configuration file includes information that represents the order of execution so that output produced by the selected blocks can be correctly directed to others of the selected blocks when the platform instance runs the service; and storing the configuration file for use by the platform instance.

In some embodiments, the platform instance is configured to run the selected blocks in a decoupled manner within the service with each selected block having no awareness of the other selected blocks, and the configuration file is generated as a service configuration file for configuring the service to direct the output of the selected blocks according to the order of execution.

In some embodiments, generating the service configuration file further includes identifying a service class in the service configuration file, wherein the service class is to be used by the platform instance to instantiate the service.

In some embodiments, the method further includes generating, by the development environment, a block configuration file for the plurality of selected blocks.

In some embodiments, the method further includes generating, by the development environment, a unique block configuration file for each of the selected blocks.

In some embodiments, generating the unique block configuration file for each of the selected blocks further includes identifying one of a plurality of available block classes in each of the unique block configuration files, wherein the identified block class is to be used by the platform instance to instantiate the selected block corresponding to the unique block configuration file.

In some embodiments, the configuration file is generated as a service configuration file for configuring the service to configure each selected block that produces output for another selected block to direct the output to the other selected block.

In some embodiments, the configuration file is generated as a block configuration file for configuring each selected block that produces output for another selected block to direct the output to the other selected block.

In some embodiments, the method further includes receiving, via the GUI, input selecting a first block of the selected blocks, wherein the first block includes a plurality of configurable parameters; receiving, via the GUI, at least one configuration value to assign to at least one of the configurable parameters, wherein the configuration value will be used when the first block is run within the platform instance; generating, by the development environment, a block configuration file for the first block, wherein the block configuration file contains the configuration value; and storing the block configuration file for use by the platform instance.

In some embodiments, generating the block configuration file further includes identifying a name of the service within the block configuration file.

In some embodiments, the configuration value defines a destination outside of the service for output produced by the first block.

In some embodiments, generating the at least one configuration file includes generating a platform instance configuration file that identifies the service and any other services that are to be run by the platform instance, a service configuration file for the service and for each of the other services, and a block configuration file for the selected blocks and for any other blocks used by the other services.

In some embodiments, storing the configuration file for use by the platform instance includes storing the configuration file in a memory of a device containing the platform instance.

In some embodiments, storing the configuration file for use by the platform instance includes storing the configuration file in a memory for download by a device containing the platform instance.

In some embodiments, the method further includes loading the selected blocks into a memory accessible to the platform instance, wherein the available blocks that were not selected are not loaded into the memory.

In some embodiments, the method further includes providing, by the GUI, a user selectable actuator for deleting the service from the platform instance.

In some embodiments, the method further includes providing, by the GUI, a user selectable actuator for starting and stopping the service on the platform instance.

In another embodiment, a system for creating a configuration for a platform instance that is to be used on a digital device includes a processor and a memory coupled to the processor, the memory including instructions executable by the processor for creating, within a development environment having a graphical user interface (GUI), a service to be run by the platform instance; providing, via the GUI, a graphical representation of a block library containing a plurality of available blocks that are available for use by the service, wherein each available block contains first executable code that provides task specific functionality and second executable code that enables the block to function within the platform instance; receiving, via the GUI, input identifying at least some of the available blocks as selected blocks, wherein the selected blocks are to be run by the service; receiving, via the GUI, input arranging the selected blocks into an order of execution that defines which of the selected blocks are to receive output produced by others of the selected blocks when run by the service; generating, by the development environment, at least one configuration file for use by the platform instance, wherein the configuration file includes information that represents the order of execution so that output produced by the selected blocks can be correctly directed to others of the selected blocks when the platform instance runs the service; and storing the configuration file for use by the platform instance.

In some embodiments, the platform instance is configured to run the selected blocks in a decoupled manner within the service with each selected block having no awareness of the other selected blocks, and the configuration file is generated as a service configuration file for configuring the service to direct the output of the selected blocks according to the order of execution.

In some embodiments, the instructions for generating the service configuration file further include identifying a service class in the service configuration file, wherein the service class is to be used by the platform instance to instantiate the service.

In some embodiments, the instructions further include generating, by the development environment, a block configuration file for the plurality of selected blocks.

In some embodiments, the instructions further include generating, by the development environment, a unique block configuration file for each of the selected blocks.

In some embodiments, the instructions for generating the unique block configuration file for each of the selected blocks further include identifying one of a plurality of available block classes in each of the unique block configuration files, wherein the identified block class is to be used by the platform instance to instantiate the selected block corresponding to the unique block configuration file.

In some embodiments, the configuration file is generated as a service configuration file for configuring the service to configure each selected block that produces output for another selected block to direct the output to the other selected block.

In some embodiments, the configuration file is generated as a block configuration file for configuring each selected block that produces output for another selected block to direct the output to the other selected block.

In some embodiments, the instructions further include receiving, via the GUI, input selecting a first block of the selected blocks, wherein the first block includes a plurality of configurable parameters; receiving, via the GUI, at least one configuration value to assign to at least one of the configurable parameters, wherein the configuration value will be used when the first block is run within the platform instance; generating, by the development environment, a block configuration file for the first block, wherein the block configuration file contains the configuration value; and storing the block configuration file for use by the platform instance.

In some embodiments, the instructions for generating the block configuration file further include identifying a name of the service within the block configuration file.

In some embodiments, the configuration value defines a destination outside of the service for output produced by the first block.

In some embodiments, the instructions for generating the at least one configuration file include generating a platform instance configuration file that identifies the service and any other services that are to be run by the platform instance, a service configuration file for the service and for each of the other services, and a block configuration file for the selected blocks and for any other blocks used by the other services.

In some embodiments, storing the configuration file for use by the platform instance includes storing the configuration file in a memory of a device containing the platform instance.

In some embodiments, storing the configuration file for use by the platform instance includes storing the configuration file in a memory for download by a device containing the platform instance.

In some embodiments, the instructions further include loading the selected blocks into a memory accessible to the platform instance, wherein the available blocks that were not selected are not loaded into the memory.

In some embodiments, the instructions further include providing, by the GUI, a user selectable actuator for deleting the service from the platform instance.

In some embodiments, the instructions further include providing, by the GUI, a user selectable actuator for starting and stopping the service on the platform instance.

In another embodiment, a method for creating a configuration for a platform instance that is to be used on a digital device includes creating, within a development environment having a graphical user interface (GUI), a first service and a second service to be run simultaneously by the platform instance, wherein the platform instance is configured to run on the digital device; providing, via the GUI, a graphical representation of a block library containing a plurality of available blocks that are available for use by the first service and the second service, wherein each available block contains executable code that provides task specific functionality; receiving, via the GUI, input arranging a first set of the available blocks into a first order of execution for the first service, wherein the first order of execution defines which of the available blocks in the first set are to receive output produced by others of the available blocks in the first set when run by the first service; receiving, via the GUI, input arranging a second set of the available blocks into a second order of execution for the second service, wherein the second order of execution defines which of the available blocks in the second set are to receive output produced by others of the available blocks in the second set when run by the second service; and generating, by the development environment, at least a first configuration file for use with the first service and a second configuration file for use by the second service, wherein the first configuration file and the second configuration files include source/destination information that represents the order of execution for the first and second services, respectively, when the platform instance runs the first service and the second service.

In some embodiments, the first configuration file contains communication information defining that at least a first block of the available blocks in the first set is configured to send information to a second block of the available blocks in the second set.

In some embodiments, the communication information defines a publication channel of the platform instance to be used by the first block and the second block.

In some embodiments, the first configuration file contains a first configuration value indicating that the first service is to be autostarted when the platform instance is launched.

In some embodiments, the first and second configuration files are a single configuration file.

In another embodiment, a system for creating a configuration for a platform instance that is to be used on a digital device includes a processor and a memory coupled to the processor, the memory including instructions executable by the processor for creating, within a development environment having a graphical user interface (GUI), a first service and a second service to be run simultaneously by the platform instance, wherein the platform instance is configured to run on the digital device; providing, via the GUI, a graphical representation of a block library containing a plurality of available blocks that are available for use by the first service and the second service, wherein each available block contains executable code that provides task specific functionality; receiving, via the GUI, input arranging a first set of the available blocks into a first order of execution for the first service, wherein the first order of execution defines which of the available blocks in the first set are to receive output produced by others of the available blocks in the first set when run by the first service; receiving, via the GUI, input arranging a second set of the available blocks into a second order of execution for the second service, wherein the second order of execution defines which of the available blocks in the second set are to receive output produced by others of the available blocks in the second set when run by the second service; and generating, by the development environment, at least a first configuration file for use with the first service and a second configuration file for use by the second service, wherein the first configuration file and the second configuration files include source/destination information that represents the order of execution for the first and second services, respectively, when the platform instance runs the first service and the second service.

In some embodiments, the first configuration file contains communication information defining that at least a first block of the available blocks in the first set is configured to send information to a second block of the available blocks in the second set.

In some embodiments, the communication information defines a publication channel of the platform instance to be used by the first block and the second block.

In some embodiments, the first configuration file contains a first configuration value indicating that the first service is to be autostarted when the platform instance is launched.

In some embodiments, the first and second configuration files are a single configuration file.

In another embodiment, a development environment includes a processor and a memory coupled to the processor, the memory including instructions executable by the processor for providing a graphical user interface (GUI): providing a block library containing a plurality of available blocks that are available for use by a service that is to be run by a platform instance, wherein each available block contains first executable code that provides task specific functionality and second executable code that enables the block to function within the platform instance; receiving first user input via the GUI selecting at least a first block and a second block from the available blocks; receiving second user input linking the first block to the second block to define an order of execution between the first and second blocks; and generating at least one configuration file for the platform instance, wherein the configuration file includes the order of execution.

In some embodiments, the development environment further includes a block editor that enables a user to edit the first executable code of one of the available blocks.

In some embodiments, the development environment further includes a configuration file editor that enables a user to edit configurable parameters used by a core of the platform instance.

In some embodiments, the development environment further includes instructions for receiving third user input creating a service that is to run the first block and the second block.

In some embodiments, the development environment is located on a device having access to the platform instance via an application programming interface (API).

In some embodiments, the development environment is part of the platform instance.

In some embodiments, the development environment is located on a server that is separate from a device on which the platform instance is located.

In some embodiments, the development environment interacts with the platform instance via a Representational State Transfer (REST) application programming interface (API) of the platform instance.

In some embodiments, the development environment is an application programming interface (API) client.

In some embodiments, the API client is based on a hypertext transfer protocol (HTTP) and javascript code.

In some embodiments, the API client is accessible using a browser.

What is claimed is:

1. A method for creating a configuration for a platform instance that is to be used on a digital device, the method comprising:
   creating, within a development environment having a graphical user interface (GUI), a service to be run by the platform instance;
   providing, via the GUI, a graphical representation of a block library containing a plurality of available blocks that are available for use by the service, wherein each available block contains first executable code that provides task specific functionality and second executable code that enables the block to function within the platform instance;
   receiving, via the GUI, input identifying at least some of the available blocks as selected blocks, wherein the selected blocks are to be run by the service;
   receiving, via the GUI, input arranging the selected blocks into an order of execution that defines which of the selected blocks are to receive output produced by others of the selected blocks when run by the service;
   generating, by the development environment, at least one configuration file for use by the platform instance, wherein the configuration file includes information that represents the order of execution so that output produced by the selected blocks can be correctly directed to others of the selected blocks when the platform instance runs the service; and
   storing the configuration file for use by the platform instance.

2. The method of claim 1 wherein the platform instance is configured to run the selected blocks in a decoupled manner within the service with each selected block having no awareness of the other selected blocks, and wherein the configuration file is generated as a service configuration file for configuring the service to direct the output of the selected blocks according to the order of execution.

3. The method of claim 2 wherein generating the service configuration file further includes identifying a service class in the service configuration file, wherein the service class is to be used by the platform instance to instantiate the service.

4. The method of claim 2 further comprising generating, by the development environment, a block configuration file for the plurality of selected blocks.

5. The method of claim 2 further comprising generating, by the development environment, a unique block configuration file for each of the selected blocks.

6. The method of claim 5 wherein generating the unique block configuration file for each of the selected blocks further includes identifying one of a plurality of available block classes in each of the unique block configuration files, wherein the identified block class is to be used by the platform instance to instantiate the selected block corresponding to the unique block configuration file.

7. The method of claim 1 wherein the configuration file is generated as a service configuration file for configuring the service to configure each selected block that produces output for another selected block to direct the output to the other selected block.

8. The method of claim 1 wherein the configuration file is generated as a block configuration file for configuring each selected block that produces output for another selected block to direct the output to the other selected block.

9. The method of claim 1 further comprising:
receiving, via the GUI, input selecting a first block of the selected blocks, wherein the first block includes a plurality of configurable parameters;
receiving, via the GUI, at least one configuration value to assign to at least one of the configurable parameters, wherein the configuration value will be used when the first block is run within the platform instance;
generating, by the development environment, a block configuration file for the first block, wherein the block configuration file contains the configuration value; and
storing the block configuration file for use by the platform instance.

10. The method of claim 9 wherein generating the block configuration file further includes identifying a name of the service within the block configuration file.

11. The method of claim 9 wherein the configuration value defines a destination outside of the service for output produced by the first block.

12. The method of claim 1 wherein generating the at least one configuration file includes generating a platform instance configuration file that identifies the service and any other services that are to be run by the platform instance, a service configuration file for the service and for each of the other services, and a block configuration file for the selected blocks and for any other blocks used by the other services.

13. The method of claim 1 wherein storing the configuration file for use by the platform instance includes storing the configuration file in a memory of a device containing the platform instance.

14. The method of claim 1 wherein storing the configuration file for use by the platform instance includes storing the configuration file in a memory for download by a device containing the platform instance.

15. The method of claim 1 further comprising loading the selected blocks into a memory accessible to the platform instance, wherein the available blocks that were not selected are not loaded into the memory.

16. The method of claim 1 further comprising providing, by the GUI, a user selectable actuator for deleting the service from the platform instance.

17. The method of claim 1 further comprising providing, by the GUI, a user selectable actuator for starting and stopping the service on the platform instance.

18. A development environment comprising:
a processor; and
a memory coupled to the processor, the memory including instructions executable by the processor for
providing a graphical user interface (GUI);
providing a block library containing a plurality of available blocks that are available for use by a service that is to be run by a platform instance, wherein each available block contains first executable code that provides task specific functionality and second executable code that enables the block to function within the platform instance;
receiving first user input via the GUI selecting at least a first block and a second block from the available blocks;
receiving second user input linking the first block to the second block to define an order of execution between the first and second blocks; and
generating at least one configuration file for the platform instance, wherein the configuration file includes the order of execution.

19. The development environment of claim 18 further comprising a block editor that enables a user to edit the first executable code of one of the available blocks.

20. The development environment of claim 18 further comprising a configuration file editor that enables a user to edit configurable parameters used by a core of the platform instance.

21. The development environment of claim 18 further comprising instructions for receiving third user input creating a service that is to run the first block and the second block.

22. The development environment of claim 18 wherein the development environment is located on a device having access to the platform instance via an application programming interface (API).

23. The development environment of claim 18 wherein the development environment is part of the platform instance.

24. The development environment of claim 18 wherein the development environment is located on a server that is separate from a device on which the platform instance is located.

25. The development environment of claim 18 wherein the development environment interacts with the platform instance via a Representational State Transfer (REST) application programming interface (API) of the platform instance.

26. The development environment of claim 18 wherein the development environment is an application programming interface (API) client.

* * * * *